United States Patent
Ohmori et al.

(10) Patent No.: US 6,459,792 B2
(45) Date of Patent: *Oct. 1, 2002

(54) BLOCK CIPHER USING KEY DATA MERGED WITH AN INTERMEDIATE BLOCK GENERATED FROM A PREVIOUS BLOCK

(75) Inventors: Motoji Ohmori, Hirakata; Natsume Matsuzaki, Minou; Makoto Tatebayashi, Takarazuka; Masakatsu Maruyama, Hirakata, all of (JP)

(73) Assignee: Matsushita Electric Industrial Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/064,469

(22) Filed: Apr. 22, 1998

(30) Foreign Application Priority Data

Apr. 23, 1997 (JP) .............................................. 9-105609

(51) Int. Cl.[7] ................................................. H04L 9/37
(52) U.S. Cl. ........................................................ 380/37
(58) Field of Search .......................................... 380/37

(56) References Cited

U.S. PATENT DOCUMENTS

| | | | |
|---|---|---|---|
| 4,074,066 A | | 2/1978 | Ehrsam et al. |
| 4,078,152 A | * | 3/1978 | Tuckerman .................. 178/22 |
| 4,157,454 A | * | 6/1979 | Becker ......................... 380/37 |
| 4,229,818 A | * | 10/1980 | Matyas .......................... 375/2 |
| 4,447,672 A | * | 5/1984 | Nakamura .................... 380/37 |
| 4,944,006 A | * | 7/1990 | Citta ............................ 380/20 |
| 5,442,705 A | * | 8/1995 | Miyano ........................ 380/29 |

FOREIGN PATENT DOCUMENTS

| | | |
|---|---|---|
| DE | 4016203 | 11/1991 |
| EP | 012974 | 7/1980 |
| EP | 752770 | 1/1997 |
| WO | 9118460 | 11/1991 |

OTHER PUBLICATIONS

Schneier, Applied Cryptography, John Wiley, Oct. 1995.*

Denning, Cryoptographic and Data Security, 1982.*

Handbook of Applied Cryptography, CRC Press, 1997.*

Cryptanalysis of Multiple Modes of Operation, by E. Biham, Processings of the Conference on the Theory and Applications of Cryptology, DE, Berlin, Springer, vol. CONF. 4, 1994, pp. 278–292.

* cited by examiner

Primary Examiner—Gail Hayes
Assistant Examiner—James Seal
(74) Attorney, Agent, or Firm—Price and Gess

(57) ABSTRACT

A cryptographic processing apparatus for performing cryptographic processing using input data to generate output data is provided. The cryptographic processing apparatus includes a storage unit for storing chain data which is used for reflecting present cryptographic processing on next cryptographic processing, and for renewing the chain data each time cryptographic processing is performed, a merging unit for merging the chain data stored in the storage unit with the input data to generate merged data, and a main cryptographic processing unit for performing main cryptographic processing using the merged data to generate output data and for outputting intermediate data generated during a generation of the output data, wherein the storage unit renews the chain data by storing the intermediate data outputted by the main cryptographic processing unit as the new chain data, which is used for the next cryptographic processing.

14 Claims, 50 Drawing Sheets

( ) = NUMBER OF BITS ( ) = NUMBER OF BITS

BLOCK CIPHER USING KEY DATA MERGED WITH AN INTERMEDIATE BLOCK GENERATED FROM A PREVIOUS BLOCK

BACKGROUND OF THE INVENTION

1. Field of the Invention

The present invention relates to a cryptographic processing apparatus, a cryptographic processing method, and a storage medium storing a cryptographic processing program for encrypting or decrypting data which is to be subjected to cryptographic processing in units of blocks using secret keys, and especially to a cryptographic processing apparatus, a cryptographic processing program for improving security without greatly increasing hardware scale and processing time.

2. Description of the Prior Art

In recent years, as transferring of a variety of types of information and remittance by digital communication become widespread, there have been increasing needs for techniques which can improve security for protecting important information against attacks by third parties such as eavesdropping and information alteration. One technique for improving security is cryptography.

In communication systems using cryptography, an original communication text is referred to as "plaintext", while a text converted from the plaintext, from which it is difficult for third parties to derive the plaintext, is referred to as "ciphertext". Conversion from the plaintext to the ciphertext is referred to as "encryption", while inverse conversion for restoring the original plaintext from the ciphertext is referred to as "decryption".

The cryptographic content of ciphertext/plaintext is determined by an algorithm and a key which is a parameter of the algorithm. The algorithm specifies a conversion family composed of a plurality of conversions, while the key specifies one conversion out of the plurality of conversions in the conversion family. Generally, the algorithm corresponds to a fixed part in the apparatus, where the key is occasionally changed.

It is assumed that ciphertexts are apt to suffer from eavesdropping. An act by an unauthorized party such as an eavesdropper of decrypting a stolen ciphertext to obtain an original plaintext without the algorithm or the key is called "cryptanalysis".

A third party who attempts to decrypt a ciphertext (hereinafter, "cryptanalyst") does so in the assumption that the ciphertext is known.

A cryptanalysis method in which a secret plaintext or key is derived only from a ciphertext is called "ciphertext-only attack". On the other hand, a cryptanalysis method in which a plurality of unspecified pairs of a ciphertext and a plaintext are used to determine a secret key, which is then used to obtain a plaintext corresponding to an arbitrary ciphertext, is called "known plaintext attack".

The pseudo-random-number-sum-type cryptography is described below as an example.

In this cryptographic processing method, a transmitter and a receiver share the same secret key which is used by each device as a seed to generate a random number of a predetermined number of bits (hereinafter, "block") in a random number generator, where the random number generators of both devices have the same algorithm. Then the transmitter generates a ciphertext by performing an exclusive-OR operation on the random number and a plaintext for each corresponding bit in units of blocks. On receiving thee ciphertext, the receiver generates the original plaintext by performing the an exclusive-OR operation on the random number and the ciphertext for each corresponding bit in units of blocks.

Here, when a block in the plaintext is represented as "M" a block in the ciphertext as "C", the random number as "R", and the exclusive-OR operation for each corresponding bit as "(+)", the encryption can be described as the following "Formula 1", the decryption as the following "Formula 2":

$$C=M(+)R \qquad \text{(Formula 1)}$$

$$M=C(+)R \qquad \text{(Formula 2)}$$

A drawback with this cryptographic processing method is that, it is vulnerable against the "known-plaintext attack".

For instance, when a pair of a plaintext and a ciphertext is known concerning one block, the random number R can be obtained by the following "Formula 3", and as a result the whole plaintext can be obtained:

$$R-M(+)C \qquad \text{(Formula 3)}$$

Accordingly, the cryptanalyst can decrypt the pseudo-random-number-sum-type ciphertext without difficulty by the known-plaintext attack.

Cryptographic processing methods which are relatively secure against the known-plaintext attack include Data Encryption Standard (DES) and Fast Data Encipherment Algorithm (FEAL). These methods are explained in detail in Eiji Okamoto *An Introduction to Encryption Theory*, published by Kyoritsu.

In these cryptography methods, data is intensely shuttled in units of block (64 bits per block). For example, in the DES algorithm, a process which combines transposition with substitution is repeated for sixteen stages.

Cipher Block Chaining mode (hereinafter, CBC mode) has been proposed in order to improve security or the DES methods against cryptanalysis and other unauthorized acts. The CBC mode is explained in detail in Nobuichi Ikeno and Kenji Koyama *Modern Encryption Theory*, published by Institute of Electronic Information and Communication (pp. 66–67).

FIG. 1 shows the construction of an encryption apparatus 30 which realizes the CBC mode.

The encryption apparatus 30 includes an exclusive-OR unit 301, a data encryption unit 302, and a register 303.

The register 303 stores one ciphertext block which was obtained immediately before processing a present plaintext block. It should be noted that an initial value IV of one block is set in advance for encrypting a first plaintext block.

The exclusive-OR unit 301 performs, for each corresponding bit, an exclusive-OR operation on the immediately preceding ciphertext block which is stored in the register 303 and the present plaintext block to be encrypted, and sends the obtained data to the data encryption unit 302. When encrypting the first plaintext block, an exclusive-OR operation is performed on the initial value IV and the first plaintext block for each corresponding bit.

The data encryption unit 302 encrypts the 64-bit data sent from the exclusive-OR unit 301 using the DES algorithm 64-bit key data.

Thus, the encryption apparatus 30 first performs an exclusive-OR operation on the initial value IV and the first plaintext block for each corresponding bit and encrypts the result using the 64-bit key data to obtain one ciphertext block. The encryption apparatus 30 then performs an exclusive-OR operation on the ciphertext block and a next plaintext block for each corresponding bit and encrypts the result to obtain another ciphertext block.

When a block in the plaintext is represented as "Mi", a block in the ciphertext as "Ci" (i is a block number 2, 3, . . . ), the 64-bit key data as "K", the encryption using the key data K as "Ek", and the exclusive-OR operation for each corresponding bit as "(+)", the CBC mode can be described by the following "Formula 4" and "Formula 5":

$$C1 = Ek(M1(+)IV) \quad \text{(Formula 4)}$$

$$Ci = Ek(Mi(+)Ci-1)(i=2, 3) \quad \text{(Formula 5)}$$

In the CBC mode, each Ci depends un all ciphertext data preceding Ci, so that statistical characteristics of the plaintext are disturbed. As a result, the CBC mode is relatively secure against cryptanalysis and other unauthorized acts.

A drawback with the DES methods, the FEAL methods, the CBC mode in the DES methods and the like is that an algorithm is known and the length of a key is limited, so that it is possible to discovery the proper key by performing decryption using every possible key in the known plaintext attack. It should be noted here that each key of 64 bits in the DES methods includes 8 parity bits, so that the valid key length is 56 bits. Accordingly, the number of possible keys is 2.

When, as in DES methods, the key is around 56 bits long, it is believed that it would be possible with current technology to succeed in decoding by trying all possible keys, though this would require a tremendous cost. However, if encryption is performed in a multilevel manner using a plurality of separate keys, it would be impossible with the current technology to succeed in decoding by trying all possible keys.

On the other hand, in view of rapid improvement in the processing ability of computers in recent years, it is not unthinkable that in the future it may become possible to succeed in decoding by trying all possible keys despite the multilevel encryption.

Also, though the larger the scale of the multilevel encryption, the further the security of the system will improve, it is not desirable to simply make conventional encryption apparatuses perform encryption in multilevel, as it causes profound increases in hardware scale and processing time.

Conventional techniques which can improve the security of the CBC mode and the like without performing multilevel encryption are taught in JPN. 52-130504 (cryptographic apparatus) and JPN. 8-12537 (encryption apparatus). In the former reference, key data is renewed based on an immediately preceding cryptographic processing result such as a ciphertext and the renewed key is used for present cryptographic processing. In the latter reference, on the other hand, a plurality of intermediate keys which have been generated from an encryption key beforehand are each used for performing bit conversion in order to generate intermediate key renewal information, based on which each of the plurality of intermediate keys is renewed.

However, apparatuses such as the conventional cryptographic processing apparatuses described above are still not definitely secure against unauthorized attacks, thus leaving more room for improvement in the security of such systems.

SUMMARY OF THE INVENTION

In view of the above stated problems, it is an object of the present invention to provide a cryptographic processing apparatus, a cryptographic processing method, and a storage medium storing a cryptographic processing program, which can improve security without greatly increasing hardware scale and processing time.

The above object can be fulfilled by a cryptographic processing apparatus for performing cryptographic processing using input data to generate output data, including: a storage unit for storing chain data which in used for reflecting present cryptographic processing on the next cryptographic processing, and for renewing the chain data each time cryptographic processing is performed; a merging unit for merging the chain data stored in the storage unit with the input data to generate merged data; and a main cryptographic processing unit for performing main cryptographic processing using the merged data to generate the output data and for outputting intermediate data which is generated during a generation of the output data, wherein the storage unit renews the chain data by storing the intermediate data outputted by the main cryptographic processing unit as the new chain data, which is used for the next cryptographic processing.

With the stated construction, the intermediate data generated during the cryptographic processing is stored as the chain data, which is merged with the input data such as key data or cryptographic-processing object data which is to be subjected to the cryptographic processing next time the cryptographic processing is performed. By doing so, the chain data is renewed each time the cryptographic processing is performed, so that each set of output data will depend on all preceding data. Accordingly, statistical characteristics of the plaintext are disturbed by each chain data, making the cryptanalysis difficult without greatly increasing the hardware scale and the processing time. Also, even if a cryptanalyst obtains a pair of a ciphertext and a plaintext, it will practically be impossible to obtain chain data used for the cryptographic processing. In addition, since an algorithm for generating the chain data and an initial value of the chain data are secret, the cryptanalysis by the known-plaintext attack becomes further difficult, and so does cryptanalysis by trying all possible keys.

As a result, it is possible to improve security of the cryptography without greatly increasing the hardware scale and the processing time.

BRIEF DESCRIPTION OF THE DRAWINGS

These and other objects, advantages and features of the invention will become apparent from the following description thereof taken in conjunction with the accompanying drawings that illustrate a specific embodiment of the invention. In the drawings:

FIG. 6 shows the substitution table of the choice functions S1–S8;

DESCRIPTION OF THE PREFERRED EMBODIMENT

First Embodiment

First Embodiment of the present invention is composed of an encryption apparatus which generates ciphertext data from plaintext data and a decryption apparatus which generates the plaintext data from the ciphertext data (the encryption apparatus and the decryption apparatus are both referred to as "cryptographic processing apparatus which generates output data from cryptographic-processing object data which is to be subjected to cryptographic processing") by performing encryption processing and decryption processing which are specified by key data (the encryption processing and the decryption processing are both referred to as "cryptographic processing"). In this cryptographic processing apparatus of First Embodiment, each time the cryptographic processing is performed on one block, an intermediate block which is generated during the cryptographic processing is stored as a chain block, which is then merged with the key data next time the cryptographic processing is performed.

Construction

Construction of Encrypted Communication System

Figure 2:
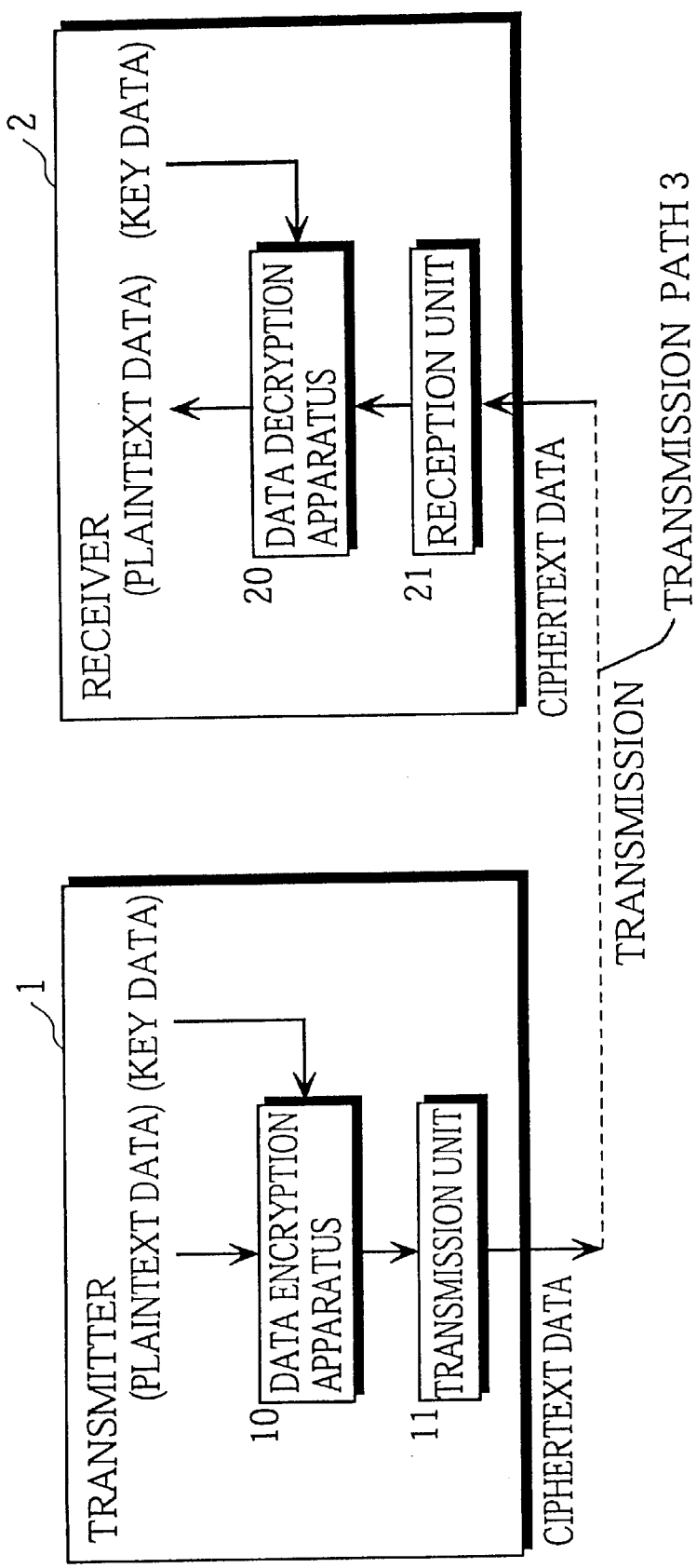
FIG. 2 shows the construction of the encrypted communication system of First Embodiment of the present invention.

FIG. 2 shows the construction of an encrypted communication system of First Embodiment of the present invention.

This encrypted communication system includes a transmitter 1 which encrypts plaintext data and transmits the obtained ciphertext data and a receiver 2 which decrypts the received ciphertext data. A transmission path 3 via which the ciphertext data is transmitted from the transmitter 1 to the receiver 2 is also shown in the figure.

As shown in the figure, the transmitter 1 is equipped with a data encryption apparatus 10 and a transmission unit 11.

The data encryption apparatus 10 encrypts input plaintext data in units of blocks, which are each composed of a predetermined number of bits, using key data which has been determined in advance and a predetermined algorithm, in order to obtain ciphertext data from the input plaintext data. The key data has been secretly shared by the transmitter 1 and the receiver 2 in advance, while the predetermined algorithm, which specifies a conversion family, is unique to each apparatus. The key data specifies one conversion out of the conversions included in the conversion family. The plaintext data is digital information which is obtained by digitally coding audio and image information, graphic character codes, or the like. In the present explanation, one block which is composed of a predetermined number of bits is, for instance, set as 64 bits.

The transmission unit 11 outputs transmission data which is generated by performing processing such as modulation and amplification on the ciphertext data onto the transmission path 3.

As shown in FIG. 2, the receiver 2 is equipped with a data decryption apparatus 20 and a reception unit 21.

The reception unit 21 receives the transmission data via the transmission path 3, and after performing processing such as demodulation on the transmission data, sends the ciphertext data to the data decryption apparatus 20.

The data decryption apparatus 20 decrypts the ciphertext data in units of blocks using the key data and a predetermined algorithm to obtain the plaintext data.

Construction of Data Encryption Apparatus 10

Figure 3:
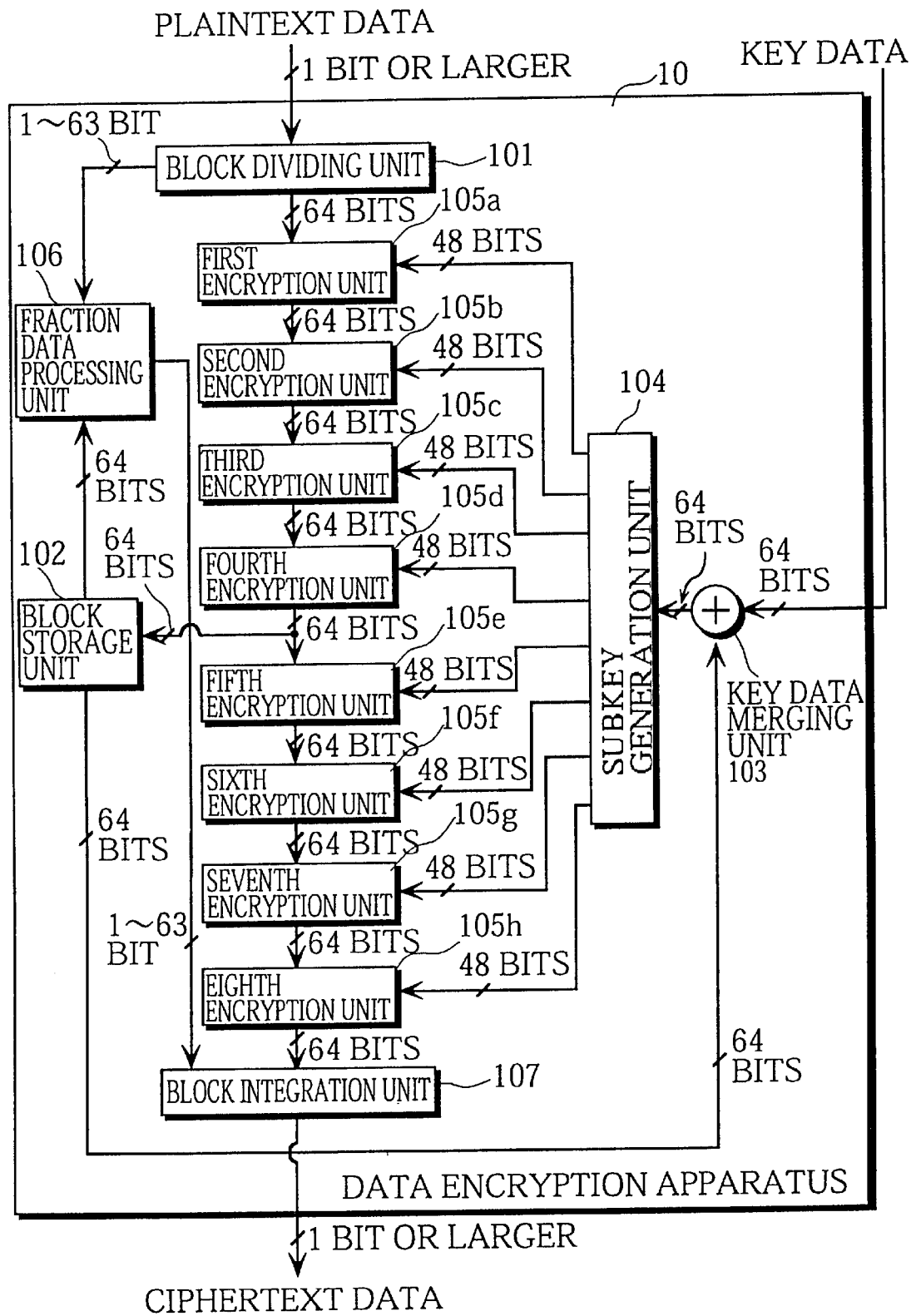
FIG. 3 shows the detailed construction of the data encryption apparatus 10 of First Embodiment of the present invention.

FIG. 3 shows the detailed construction of the data encryption apparatus 10, which is shown in FIG. 2, of First Embodiment of the present invention.

The data encryption apparatus 10 includes a block dividing unit 101, a block storage unit 102, a key data merging unit 103, a subkey generation unit 104, first to eighth encryption units 105$a$–105$h$, a fraction data processing unit 106, and a block integration unit 107.

Figure 1:
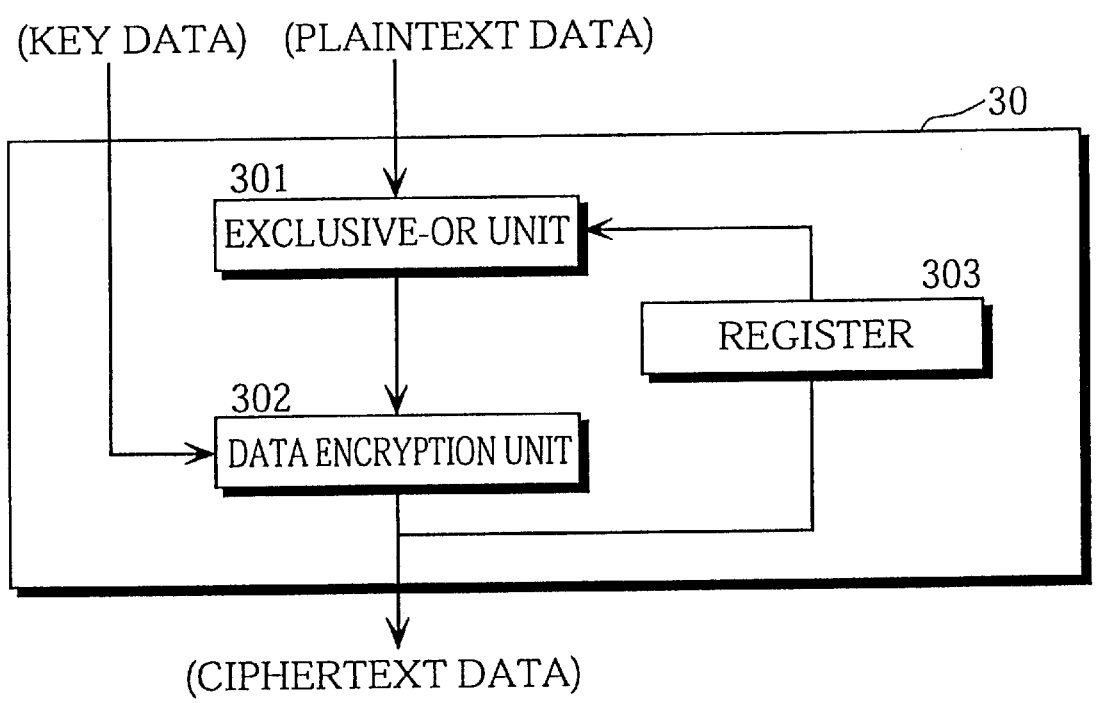
FIG. 1 shows the construction of the encryption apparatus 30 which realizes the CBC mode.

When comparing the conventional encryption apparatus 30 shown in FIG. 1 and the data encryption apparatus 10 of First Embodiment of the present invention, the exclusive-OR unit 301 corresponds to the key data merging unit 103, the data encryption unit 302 corresponds to the block dividing unit 101, the subkey generation unit 104, the first to eighth encryption units 105$a$–105$h$, the fraction data processing unit 106, and the block integration unit 107, and the register 303 corresponds to the block storage unit 102.

The block dividing unit 101 divides input plaintext data into 64-bit blocks of plaintext data (hereinafter, "plaintext block"), which are then sent in turn to the first encryption unit 105$a$. When fraction plaintext data which is smaller than 64 bits is left behind after the plaintext data is divided into plaintext blocks, the fraction plaintext data is sent to the fraction data processing unit 106. In the present example, plaintext data of 200 bits is inputted and divided into a first plaintext block composed of the first to 64th bits, a second plaintext block composed of the 65th to 128th bits, a third plaintext block composed of the 129th to 192th bits, and fraction plaintext data composed of the 193th to 200th bits. The block dividing unit 101 then sends in turn the first to third plaintext blocks to the first encryption unit 105$a$, and the fraction plaintext data to the fraction data processing unit 106.

When each plaintext block is processed, the block storage unit 102 stores a chain block which is used for reflecting a present block on a next block. It should be noted that an initial value IV of the chain block is stored in the block storage unit 102 in advance for processing the first plaintext block.

The key data merging unit 103 merges the chain block stored in the block storage unit 102 with key data to generate merged key data. In the present example, for processing the first plaintext block, an exclusive OR operation is performed on the initial value IV of the 64-bit chain block and 64-bit input key data which has been determined in advance for each corresponding bit. For processing the second and third plaintext blocks, an exclusive-OR operation is performed, for each corresponding bit, on the 64-bit key data and a 64-bit chain block generated during the processing of the immediately preceding plaintext block.

The subkey generation unit 104 generates a number of subkeys corresponding to a number of encryption units from the merged key data which has been generated by the key data merging unit 103. In the present example, eight 48-bit subkeys are generated from the 64-bit merged key data.

The first encryption unit 105$a$ generates a first intermediate block from a plaintext block using a first subkey.

The second to seventh encryption units 105$b$–105$g$ generate second to seventh intermediate blocks from the first to sixth intermediate blocks using second to seventh subkeys, respectively.

The eighth encryption unit 105$h$ generates one block of ciphertext data (hereinafter, "ciphertext block") from the seventh intermediate block using an eighth subkey.

The first to eighth encryption units 105$a$–105$h$ have the same construction, in which conversion processing is performed in eight stages, the conversion processing being composed of a process of converting higher 32 bits of a 64 bit input block using lower 32 bits of the 64-bit input block based on a conversion specified by a 48-bit subkey and a process of replacing the converted higher 32 bits with the lower 32 bits in series. In the present example, first to seventh intermediate blocks are progressively generated for each of the first to third plaintext blocks, with first to third ciphertext blocks being generated from the resulting intermediate blocks.

Figure 4:
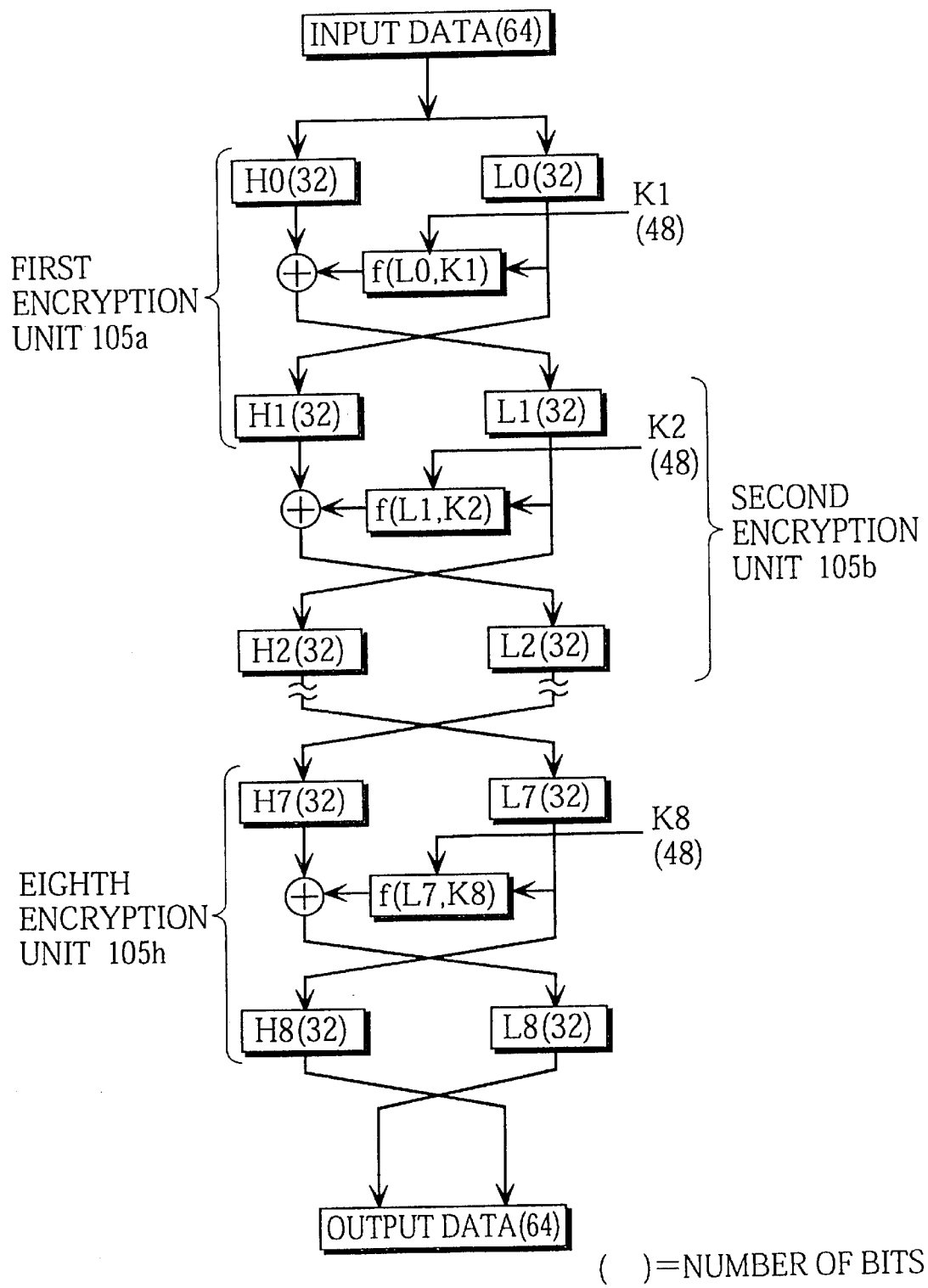
FIG. 4 shows the detailed construction of the first to eighth encryption units $105a$–$105h$.

FIG. 4 shows the detailed construction of the first to eighth encryption units 105a–105h.

A 64-bit plaintext block is divided into higher 32 bits and lower 32 bits. When the higher 32-bit is represented as "H0", the lower 32-bit as "L0", input of an "n"th encryption unit as "{H(n−1), L(n−1)}", and output as "(Hn, Ln)", Hn and Ln are described by the following "Formula 6" and "Formula 7":

$$Hn=L(n-1) \quad \text{(Formula 6)}$$

$$Ln=H(n-1)(+)f\{L(n-1), Kn\} \quad \text{(Formula 7)}$$

Here, "(1)" represents the exclusive-OR operation for each corresponding bit, "Kn" represents a 48 bit subkey inputted into the "n"th encryption unit, and "f" represents a function for outputting 32-bit data using "L(n−1)" and "Kn".

Figure 5:
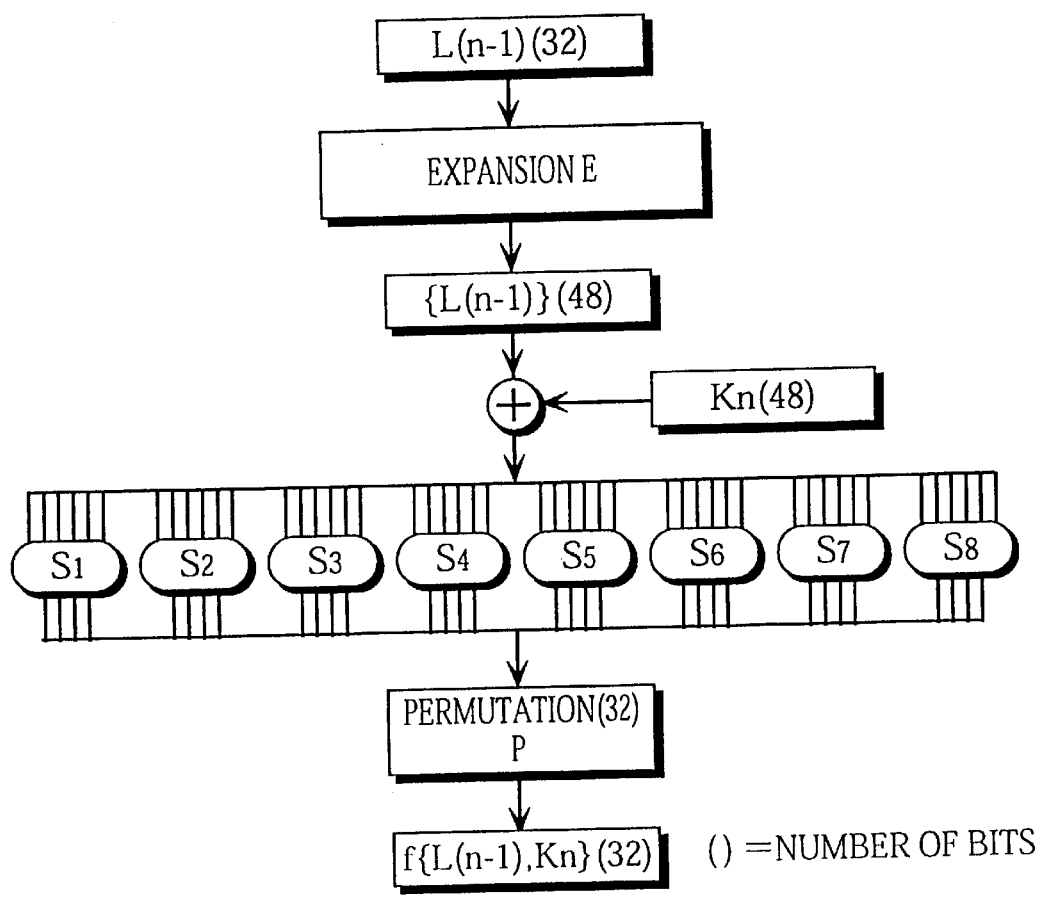
FIG. 5 shows the detailed construction of a unit which calculates the function "f"

FIG. 5 shows the detailed construction of a unit which calculates the function "f", 32 bits of L(n−1) are expanded to 48 bits and rearranged according to expansion E shown in the following table (Table 1).

TABLE 1

| 32 | 1  | 2  | 3  | 4  | 5  |
|----|----|----|----|----|----|
| 4  | 5  | 6  | 7  | 8  | 9  |
| 8  | 9  | 10 | 11 | 12 | 13 |
| 12 | 13 | 14 | 15 | 16 | 17 |
| 16 | 17 | 18 | 19 | 20 | 21 |
| 20 | 21 | 22 | 23 | 24 | 25 |
| 24 | 25 | 26 | 27 | 28 | 29 |
| 28 | 29 | 30 | 31 | 32 | 1  |

The table shows new bit positions to which input bits are transposed. For example, the 32th bit of the input bits is transposed to the first bit and the 47th bit of the output bits, while the first bit of the input bits is transposed to the second bit and the 48th bit of the output bits.

Then an exclusive-OR operation is performed on the obtained 48 bits and 48 bits of the subkey Kn for each corresponding bit, and the result is divided into eight 6-bit groups which are then inputted into eight choice functions S1–S8.

The choice functions S1–S8 (also referred to as S boxes) are functions which input 6 bits and output 4 bits. The processing of the choice functions is described with corresponding substitution tables.

Figure 6:
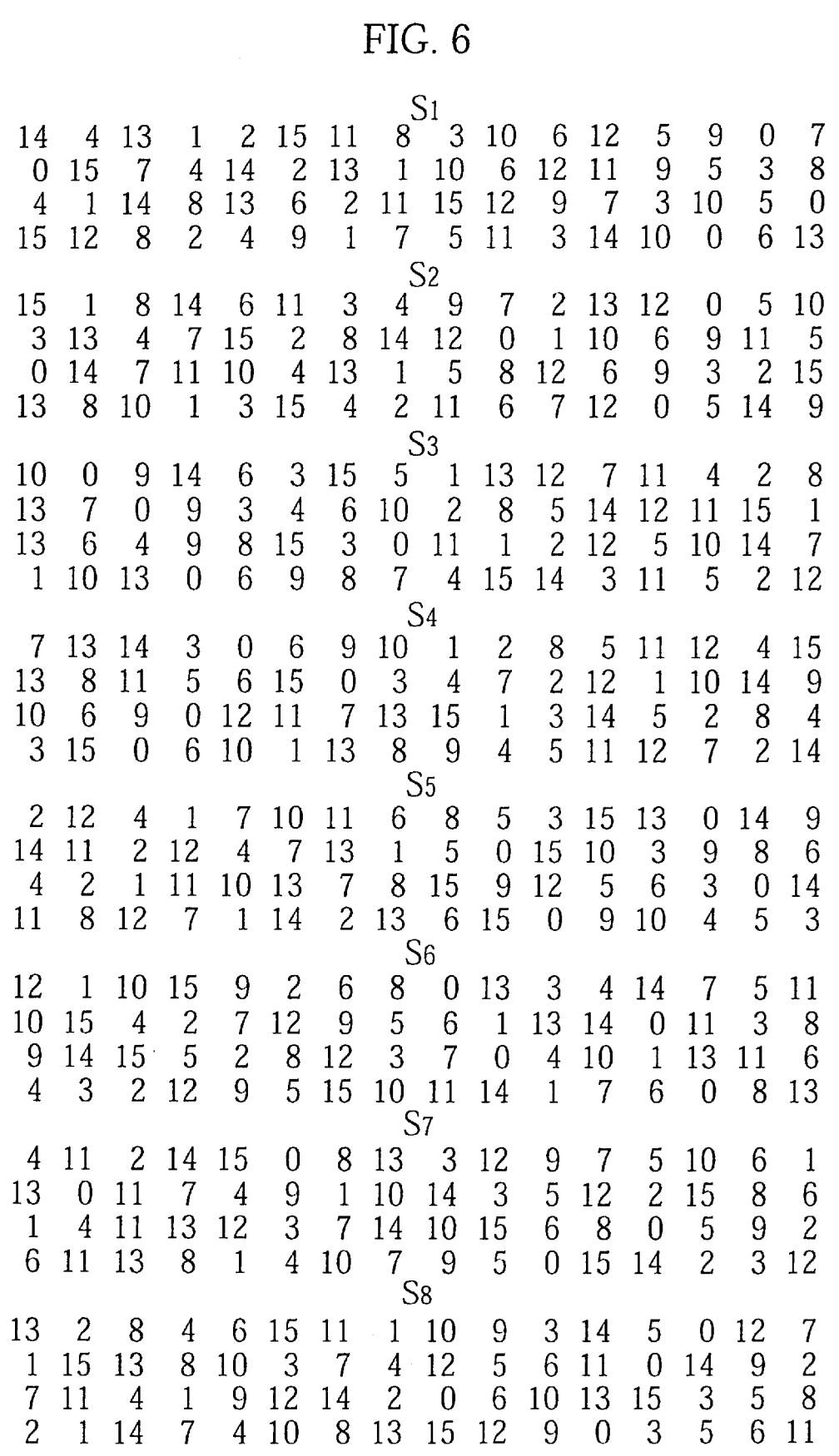

FIG. 6 shows the substitution tables of the choice functions S1–S8.

Each choice function is provided with 64 numbers each in a range of 0–15, which are arranged in 4 lines and 16 columns.

The first bit and the last bit out of input six bits specify a line in the substitution table, and the other 4 bits specify a column in the table.

For instance, when "011011" is inputted in the choice function 31, the first bit "0" and the last bit "1" specify the second line, and the other 4 bits "1101" specify the 14th column. As "5" is given in an intersection box of the second line and the 14th column in the substitution table of the choice function S1, "0101" is outputted.

The total of 32 bits (4 bits×8=32 bits) outputted from the eight choice functions S1–S8 is arranged according to permutation P shown in the following table (Table 2), and as a result outputted as "f{L(n−1), kn}".

TABLE 2

| 16 | 7  | 20 | 21 |
|----|----|----|----|
| 29 | 12 | 28 | 17 |
| 1  | 15 | 23 | 26 |
| 5  | 18 | 31 | 10 |
| 2  | 8  | 24 | 14 |
| 32 | 27 | 3  | 9  |
| 19 | 13 | 30 | 6  |
| 22 | 11 | 4  | 25 |

The table shows new bit positions to which input bits are transposed. For example, the 16th bit of the input bits is transposed to the first bit of the output bits, while the seventh bit of the input bits is transposed to the second bit of the output bits.

The block storage unit 102 is equipped with a block renewal function. Each time the fourth encryption unit 105d generates a fourth intermediate block, the block storage unit 102 renews the chain block by storing the fourth intermediate block as the new chain block, which is used for processing a next block.

In the present example, the block storage unit 102 stores the 64-bit initial value IV in advance, which is used for processing the first plaintext block. The block storage unit 102 renews the chain block by storing a fourth intermediate block which was generated during the processing of the first plaintext block. The renewed chain block is then used for processing the second plaintext block, and the block storage unit 102 renews the chain block by storing a fourth intermediated block generated during the processing of the second plaintext block. Next, the renewed chain block is used for processing the third plaintext block, and the block storage unit 102 renews the chain block by storing a fourth intermediate block generated during the processing of the third plaintext block. The renewed chain block is then used for processing the fraction plaintext data.

The fraction data processing unit 106 receives the fraction plaintext data from the block dividing unit 101, and generates fraction ciphertext data whose number of bits is the same as the fraction plaintext data using the chain block stored in the block storage unit 102. The fraction data processing unit 106 includes a data matching unit 106a and a fraction data merging unit 106b.

Figure 7:
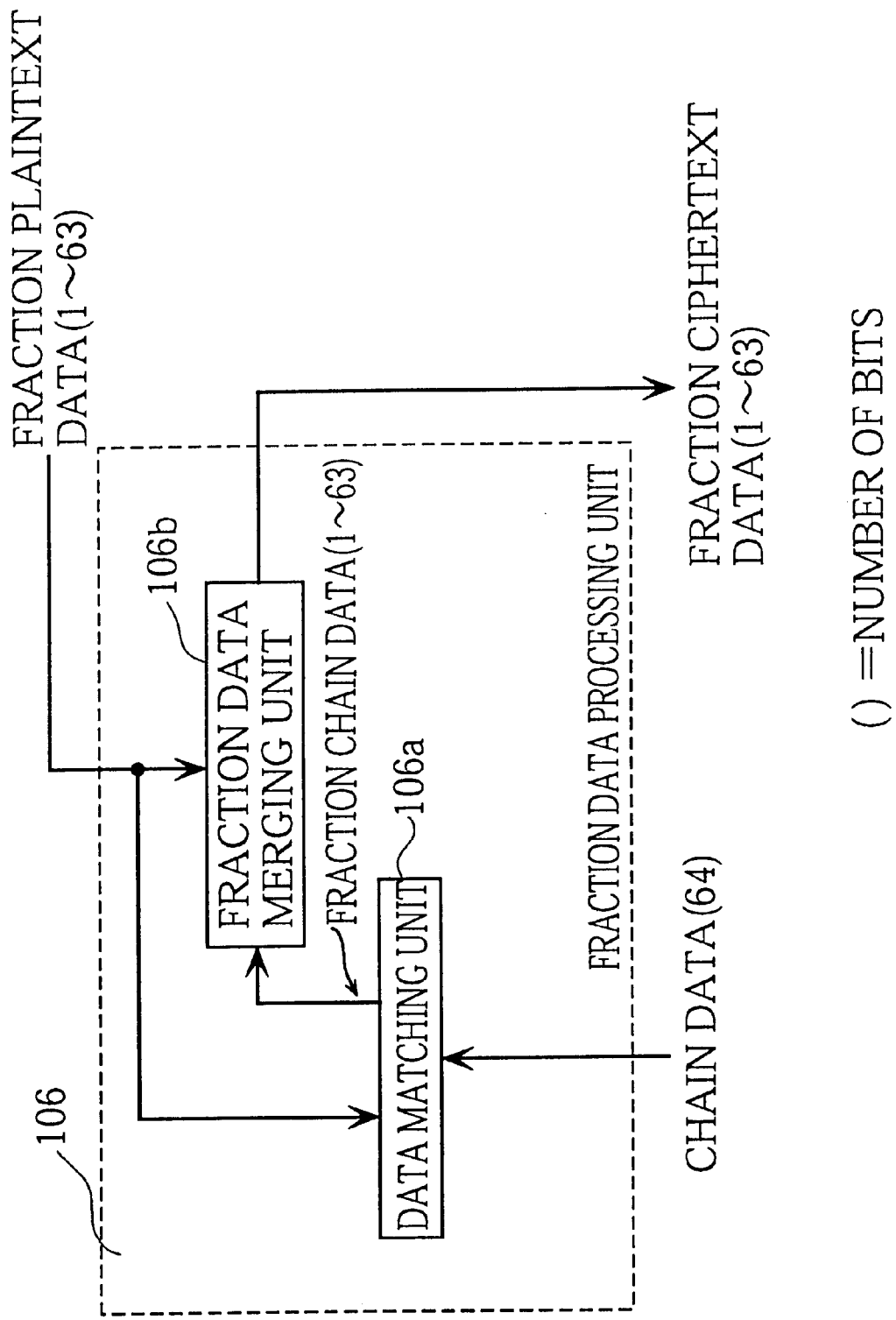
FIG. 7 shows the detailed construction of the fraction data processing unit 106 of First Embodiment of the present invention.

FIG. 7 shows the detailed construction of the fraction data processing unit 106, which is shown in FIG. 3, of First Embodiment of the present invention.

The data matching unit 106a generates fraction chain data whose number of bits is the same as the fraction plaintext data from the chain block stored in the block storage unit 102. In the present example, the fraction plaintext data is 8 bits, so that the data matching unit 106a generates fraction chain data which is composed of, for instance, highest 8 bits of the chain block stored in the block storage unit 102.

The fraction data merging unit 106b merges the generated fraction chain data with the fraction plaintext data. In the present example, an exclusive-OR operation is performed on 8 bits of the fraction chain data and 8 bits of the fraction plaintext data for each corresponding bit to generate 8 bits of fraction ciphertext data.

The block integration unit 107 integrates each ciphertext block generated by the eighth encryption unit 105h and the fraction ciphertext data generated by the fraction data processing unit 106 to generate ciphertext data. In the present example, the 64-bit first to third ciphertext blocks and the 8-bit fraction ciphertext data are integrated to form ciphertext data of 200 bits.

It should be noted here that, although the block storage unit 102 renews the chain block using each fourth intermediate block generated by the fourth encryption unit 105d in the present example, any intermediate blocks generated during the processing can also be used. Accordingly, the block storage unit 102 may use one of the first to seventh intermediate blocks generated by the respective first to seventh encryption units 105a–105g as the new chain block.

Construction of Data Decryption Apparatus 20

Figure 8:
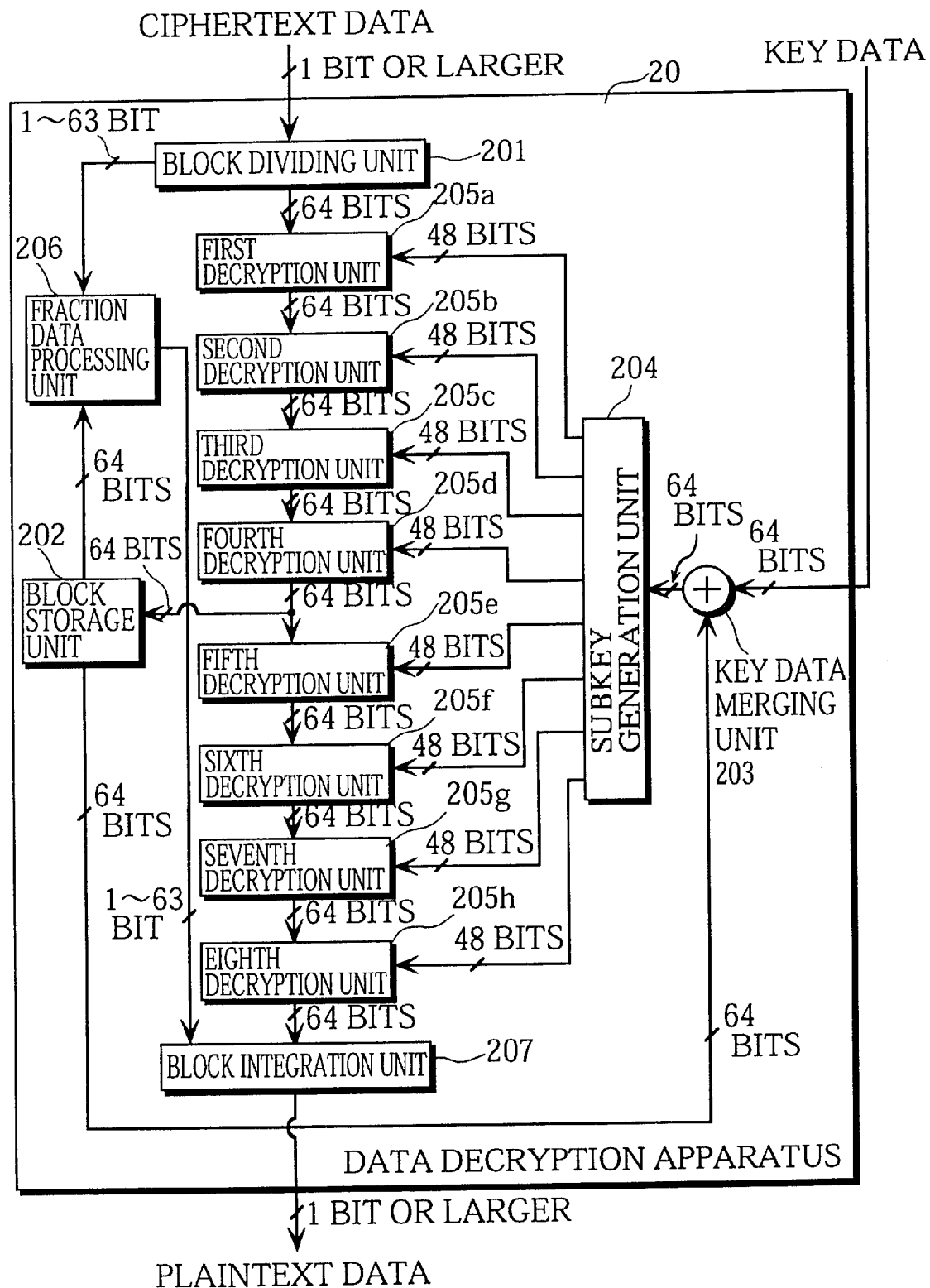
FIG. 8 shows the detailed construction of the data decryption apparatus 20 of First Embodiment of the present invention.

FIG. 8 shows the detailed construction of the data decryption apparatus 20, which is shown in FIG. 2, of First Embodiment of the present invention.

The data decryption apparatus 20 includes a block dividing unit 201, a block storage unit 202, a key data merging unit 203, a subkey generation unit 204, first to eighth decryption units 205a 205h, a fraction data processing unit 206, and a block integration unit 207.

When comparing the conventional encryption apparatus 30 shown in FIG. 1 and the data decryption apparatus 20 shown in FIG. 8, the exclusive-OR unit 301 corresponds to the key data merging unit 203, the data encryption unit 302 corresponds to the block dividing unit 201, the subkey generation unit 204, the first to eighth decryption units 205a–205h, the fraction data processing unit 206, and the block integration unit 207, and the register 303 corresponds to the block storage unit 202.

The block dividing unit 201 divides input ciphertext data into 64-bit ciphertext blocks, which are then sent in turn to the first decryption unit 205a. When fraction ciphertext data which is smaller than 64 bits is left behind after the ciphertext data is divided into ciphertext blocks, the fraction ciphertext data is sent to the fraction data processing unit 206. In the present example, ciphertext data of 200 bits is inputted and divided into a first ciphertext block composed of the first to 64th bits, a second ciphertext block composed of the 65th to 128th bits, a third ciphertext block composed of the 129th to 192th bits, and fraction ciphertext data composed of the 193th to 200th bits. The block dividing unit 201 then sends in turn the first to third ciphertext blocks to the first decryption unit 205a, and the fraction ciphertext data to the fraction data processing unit 206.

When each block which has been divided by the block dividing unit 201 is processed, the block storage unit 202 stores a chain block which is used for reflecting a present block on a next block. It should be noted that an initial value IV of the chain block is stored in the block storage unit 202 in advance for processing the first ciphertext block. This initial value IV is the same as the initial value IV used in the data encryption apparatus 10. That is to say, an initial value IV which is used for encrypting plaintext data is the same as an initial value IV which is used for decrypting ciphertext data corresponding to the plaintext data.

The key data merging unit 203 merges the chain block stored in the block storage unit 202 with key data to generate merged key data. It should be noted here that this merging is the same as the merging performed by the key data merging unit 103 of the data encryption apparatus 10. Also, the key data used in the data decryption apparatus 20 is the same as the key data used in the data encryption apparatus 10. That is to say, key data used for encrypting plaintext data is the same as key data used for decrypting ciphertext data corresponding to the plaintext data. In the present example, for processing the first ciphertext block, an exclusive-OR operation is performed on the initial value IV of the 64-bit chain block and 64-bit input key data which has been determined in advance for each corresponding bit. For processing the second and third ciphertext blocks, an exclusive-OR operation is performed, for each corresponding bit, on the 64-bit key data and a 64-bit chain block generated during the processing of the immediately preceding ciphertext block.

The subkey generation unit 204 generates a number of subkeys corresponding to a number of decryption units from the merged key data which has been generated by the key data merging unit 203. In the present example, eight 48-bit subkeys are generated from the 64-bit merged key data. It should be noted here that the function of generating the subkeys by the subkey generation unit 204 of the data decryption apparatus 20 is the same as the function of generating the subkeys by the subkey generation unit 104 of the data encryption apparatus 10.

The first decryption unit 205a generates a seventh intermediate block from a ciphertext block using an eighth subkey.

The second to seventh decryption units 205b–205g generate sixth to first intermediate blocks from the seventh to second intermediate blocks using seventh to second subkeys, respectively.

The eighth decryption unit 205h generates a plaintext block from the first intermediate block using a first subkey.

The first to eighth decryption units 205a–205h have the same construction, in which conversion processing is performed in eight stages, the conversion processing being composed of a process or converting higher 32 bits of a 64-bit input block using lower 32 bits of the 64-bit input block based on a conversion specified by a 48-bit subkey and a process of replacing the converted higher 32 bits with the lower 32 bits in series. In the present example, seventh to first intermediate blocks are progressively generated for each of the first to third ciphertext blocks, with first to third plaintext blocks being generated from the resulting intermediate blocks. It should be noted that the conversions performed by the first to eighth decryption units 205a–205h are inverse conversions of the conversions performed by the eighth to first encryption units 105h–105a of the data encryption apparatus 10, respectively.

The block storage unit 202 is equipped with a block renewal function. Each time the fourth decryption unit 205d generates a fourth intermediate block, the block storage unit 202 renews the chain block by storing the fourth intermediate block as the new chain block, which will be used for processing a next ciphertext block.

In the present example, the block storage unit 202 stores the initial value IV of 64 bits in advance, which is used for processing the first ciphertext block. The block storage unit 202 renews the chain block by storing a fourth intermediate block generated during the processing of the first ciphertext block as the new chain block. The renewed chain block is then used for processing the second ciphertext block, and the block storage unit 202 renews the chain block by storing a fourth intermediate block generated during the processing of the second ciphertext block. Next, the renewed chain block is used for processing the third ciphertext block, and the block storage unit 202 renews the chain block by storing a fourth intermediate block generated during the processing of the third ciphertext block. The renewed chain block is then used for processing the fraction ciphertext data.

The fraction data processing unit 206 receives the fraction ciphertext data from the block dividing unit 201, and generates fraction plaintext data whose number is the same as the fraction ciphertext data using the chain block stored in the block storage unit 202. The fraction data processing unit 206 includes a data matching unit 206a and a fraction data merging unit 206b.

Figure 9:
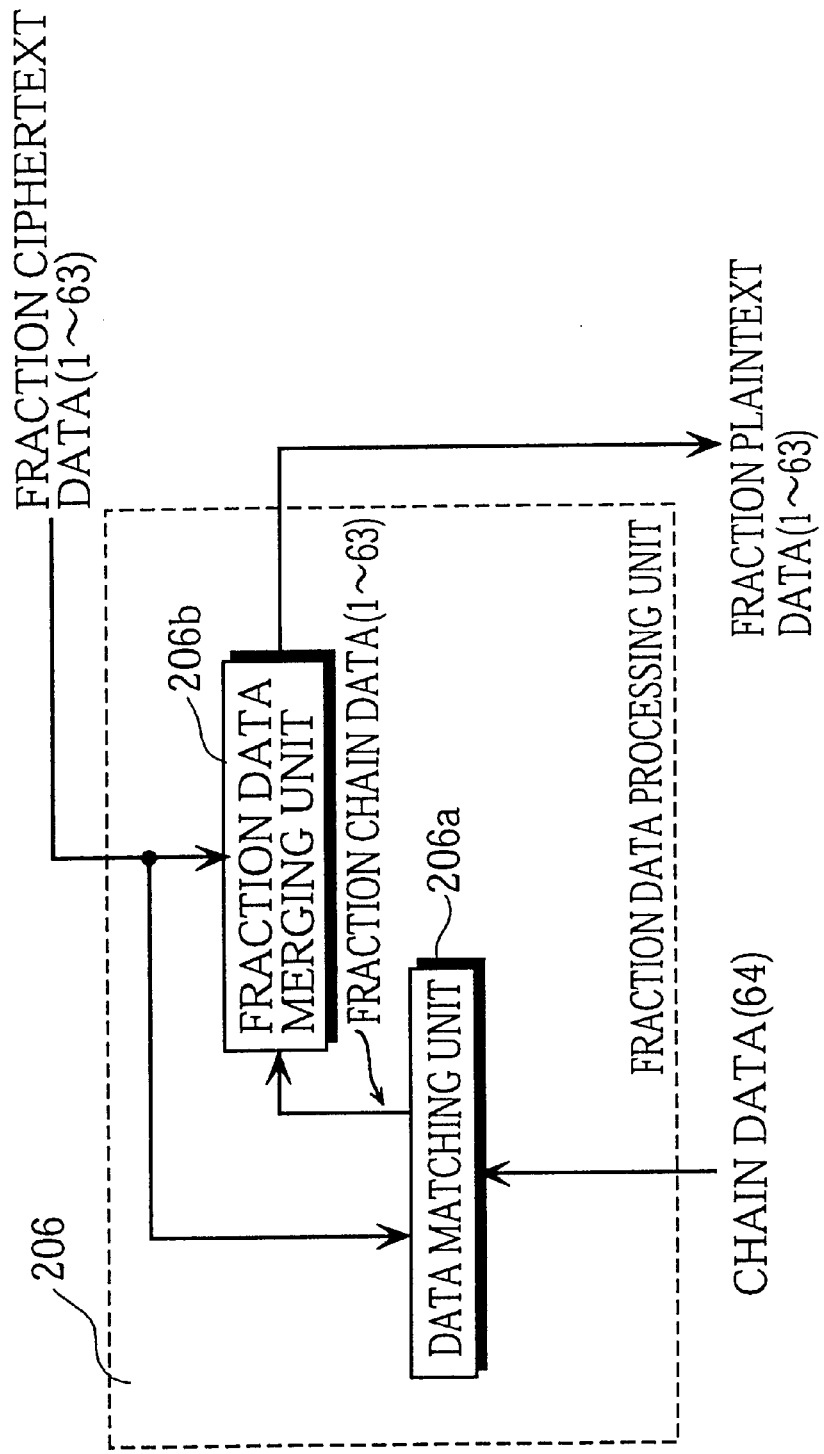
FIG. 9 shows the detailed construction of the fraction data processing unit 206 of First Embodiment of the present invention.

FIG. 9 shows the detailed construction of the fraction data processing unit 206, which is shown in FIG. 8, of First Embodiment of the present invention.

The data matching unit 206a generates fraction chain data whose number of bits is the same as the fraction ciphertext data from the chain block stored in the block storage unit 202. In the present example, the fraction ciphertext data is 8 bits, so that the data matching unit 206a generates fraction chain data which is composed of, for instance, highest 8 bits of the chain block stored in the block storage unit 202.

The fraction data merging unit 206b merges the generated fraction chain data with the fraction ciphertext data. In the present example, an exclusive-OR operation is performed on 8 bits of the fraction chain data and 8 bits of the fraction ciphertext data for each corresponding bit to generate 8 bits of fraction plaintext data.

The block integration unit 207 integrates each plaintext block generated by the eighth decryption unit 205h and the fraction plaintext data generated by the fraction data processing unit 206 to generate plaintext data. In the present example, the 64-bit first to third plaintext blocks and the 8-bit fraction plaintext data are integrated to form plaintext data of 200 bits.

It should be noted here that, although the block storage unit 202 renews the chain block using each fourth intermediate block generated by the fourth decryption unit 205d in the present example, any intermediate blocks generated during the processing can also be used. Accordingly, the block storage unit 202 may use one of the seventh to first intermediate blocks generated by the respective first to seventh decryption units 205a–205g as the new chain block. Here, the intermediate block used by the block storage unit 202 of the data decryption apparatus 20 should be the same as the intermediate block used by the block storage unit 102 of the data encryption apparatus 10.

Operation

Operation of Data Encryption Apparatus 10

Figure 10:
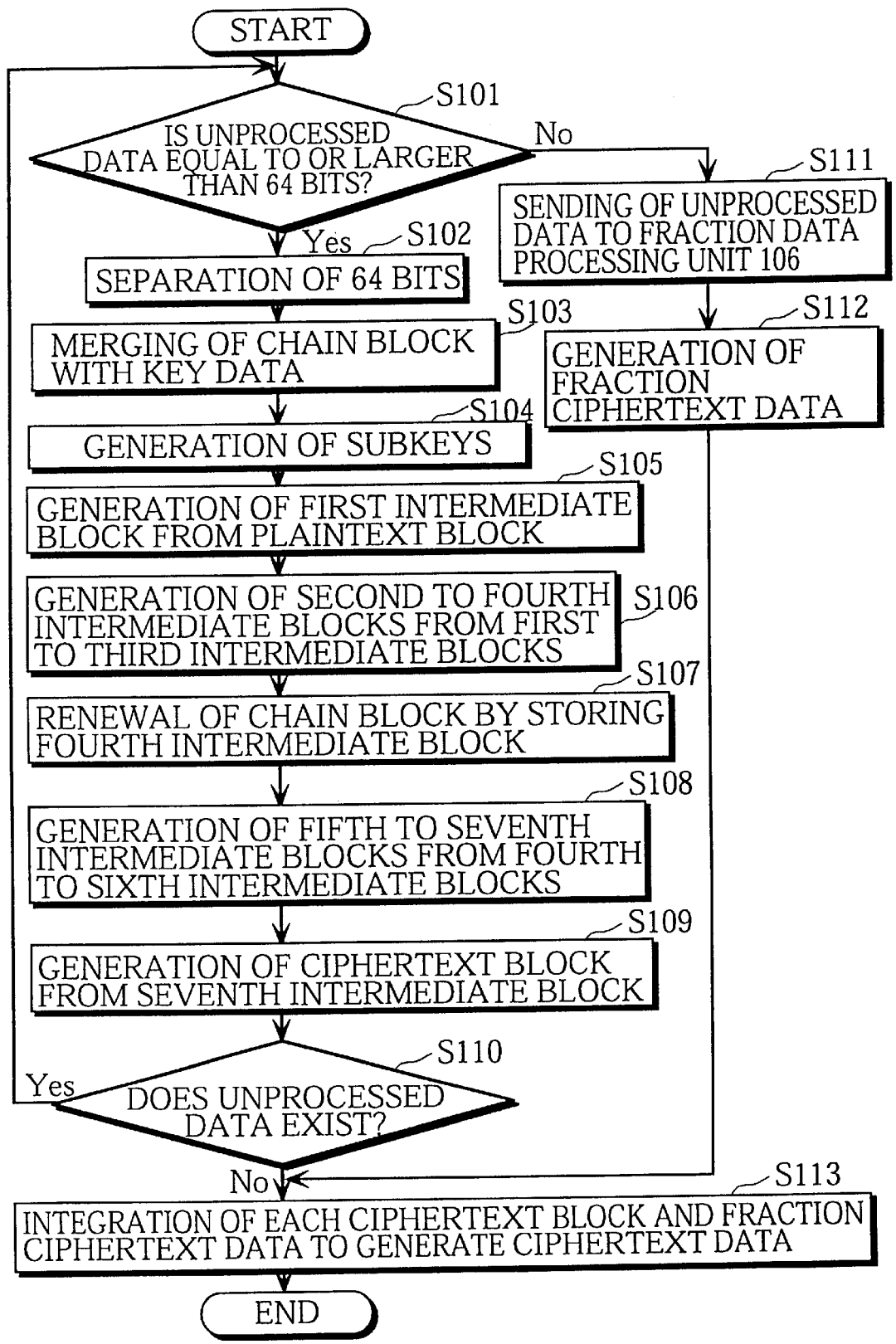
FIG. 10 is a flowchart showing the cryptographic processing of the data encryption apparatus 10 of First Embodiment of the present invention.

FIG. 10 is a flowchart showing the cryptographic processing of the data encryption apparatus 10 of First Embodiment of the present invention.

As one example, a case is explained when the cryptographic processing is performed according to the DES algorithm in the data encryption apparatus 10 where 200-bit plaintext data is inputted and the initial value IV of the chain block is stored in the block storage unit 102 in advance.

(1) The block dividing unit 101 judges whether unprocessed data of input plaintext data is equal to or larger than 64 bits (Step S101). In the present example, unprocessed data of the input plaintext data is originally 200 bits, so that the block dividing unit 101 judges that the unprocessed data is equal to or larger than 64 bits (Step S101: first time).

(2) When the unprocessed data of the input plaintext data is equal to or larger than 64 bits, the first 64 bits are separated from the unprocessed data (Step S102). In the present example, the first to 64th bits of the 200-bit plaintext data are separated as a first plaintext block (Step S102: first time).

(3) The key data merging unit 103 merges the chain block stored in the block storage unit 102 with key data to generate merged key data (Step S103). In the present example, an exclusive-OR operation is performed on the initial value IV of the 64 bit chain block and 64-bit key data for each corresponding bit to generate merged key data, which is then sent to the subkey generation unit 104 (Step S103: first time).

(4) From the merged key data, the subkey generation unit 104 generates subkeys whose number is the same as the number of encryption units (Step S104). In the present example, eight 48-bit subkeys are generated from the 64-bit merged key data (Step S104: first time).

The following is an example of the process of generating first to eighth 48-bit subkeys (48 bits×8) from the 64 bit key data which includes 8 parity bits.

The 8 parity bits are removed from the 64-bit key data, and the remaining 56 bits are transposed according to transposition shown in the following table (Table 3).

TABLE 3

| 57 | 49 | 41 | 33 | 25 | 17 | 9  |
| 1  | 58 | 50 | 42 | 34 | 26 | 18 |
| 10 | 2  | 59 | 51 | 43 | 35 | 27 |
| 19 | 11 | 3  | 60 | 52 | 44 | 36 |
| 63 | 55 | 47 | 39 | 31 | 23 | 15 |
| 7  | 62 | 54 | 47 | 38 | 30 | 22 |
| 14 | 6  | 61 | 53 | 45 | 37 | 29 |
| 21 | 13 | 5  | 28 | 20 | 12 | 4  |

The table shows new bit positions to which input bits are transposed. For example, the 57th bit of the input bits is transposed to the first bit of the output bits, while the 49th bit of the input bits is transposed to the second bit of the output bits.

The 56-bit key data is divided into the first half 28 bits represented as "C0" and the second half 28 bits as "D0", each of "C0" and "D0" being shifted to the left for a number of shifting times shown in the following table (Table 4) so as to generate C1–C8 and D1–D8.

TABLE 4

| subkey number | 1 | 2 | 3 | 4 | 5 | 6 | 7 | 8 |
|---|---|---|---|---|---|---|---|---|
| number of shifting times | 2 | 4 | 8 | 12 | 16 | 20 | 24 | 26 |

For instance, when C0=(c1 c2 c3 . . . c26 c27 c28), C1=(c3 c4 c5 . . . c28 c1 c2).

Next, the 56-bit key data is transposed to be 48 bits in accordance with transposition shown in the following table (Table 5).

TABLE 5

| 14 | 17 | 11 | 24 | 1  | 5  |
| 3  | 28 | 15 | 6  | 21 | 10 |
| 23 | 19 | 12 | 4  | 26 | 8  |
| 16 | 7  | 27 | 20 | 13 | 2  |
| 41 | 52 | 31 | 37 | 47 | 55 |
| 30 | 40 | 51 | 45 | 33 | 48 |
| 44 | 49 | 39 | 56 | 34 | 53 |
| 46 | 42 | 50 | 36 | 29 | 32 |

The table shows new bit positions to which input bits are transposed. For example, the 14th bit of the input bits is transposed to the first bit of the output bits, while the 17th bit of the input bits is transposed to the second bit of the output bits.

(5) The first encryption unit 105a generates a first intermediate block from a plaintext block using the first subkey (Step S105). In the present example, a first intermediate block is generated from the first plaintext block (step S105: first time).

(6) The second to fourth encryption units 105b–105d generate second to fourth intermediate blocks from the first to third intermediate blocks using the second to fourth subkeys, respectively (Step S106). In the present example, second to fourth intermediate blocks are generated from the first to third intermediate blocks corresponding to the first plaintext block (Step S106: first time).

(7) The block storage unit 102 renews the chain block by storing the fourth intermediate block generated by the fourth encryption unit 105d as the new chain block (Step S107). In the present example, the block storage unit 102 renews the chain block by storing the fourth intermediate block corresponding to the first plaintext block (Step S107: first time).

(8) The fifth to seventh encryption units 105e–105g generate fifth to seventh intermediate blocks from the fourth to sixth intermediate blocks using the fifth to seventh subkeys (Step S108). In the present example, fifth to seventh intermediate blocks are generated from the fourth to sixth intermediate blocks corresponding to the first plaintext block (Step S108: first time).

(9) The eighth encryption unit 105h generates a ciphertext block from the seventh intermediate block using the eighth subkey (Step S109). In the present example, a first ciphertext block is generated from the seventh intermediate block corresponding to the first plaintext block (Step S109: first time).

(10) It is judged whether unprocessed data of the plaintext data exists. When the unprocessed data exists, the processing returns to Step S101 in order to process a next plaintext block or fraction plaintext data (Step S110). In the present example, unprocessed data exists, so that the processing returns to Step S101 (Step S110: first time).

(11) In Step S101, the block dividing unit 101 judges that the unprocessed data in equal to or larger than 64 bits, since the remaining data after 64 bits were separated from the 200-bit plaintext data is 136 bits in the present example (Step S101: second time).

(12) In Step S102, the 65th to 128th bits are separated from the 200-bit plaintext data as a second plaintext block in the present example (Step S102: second time).

(13) In Step S103, an exclusive-OR operation is performed on the 64-bit chain block generated when processing the first plaintext block and the 64-bit key data for each corresponding bit to generate merged key data, which is then sent to the subkey generation unit 104 in the present example (Step S103: second time).

(14) In Step S104, eight 48-bit subkeys are generated from the 64-bit merged key data in the present example (Step S104: second time).

(15) (19) In Steps S105–S109, the second plaintext block is processed in the same way as the first plaintext block, so that first to seventh intermediate blocks and subsequently a second ciphertext block which correspond to the second plaintext block are generated, and the block storage unit 102 renews the chain block by storing the fourth intermediate block corresponding to the second plaintext block as the new chain block in the present example (Steps S105–S109: second time).

(20) In Step S110, the processing returns to Step S101, as unprocessed data of the plaintext data still exists in the present example (Step S110: second time).

(21) In Step S101, the block dividing unit 101 judges that the unprocessed data is equal to or larger than 64 bits, since the remaining data after b64 bits were separated from the 136-bit plaintext data is 72 bits in the present example (Step S101: third time).

(22) In Step S102, the 129th to 192th bits of the 200-bit plaintext data are separated as a third plaintext block in the present example (Step S102: third time).

(23) In Step S103, an exclusive-OR operation is performed on the 64-bit chain block generated when processing the second plaintext block and the 64-bit key data for each corresponding bit to generate merged key data, which is then sent to the subkey generation unit 104 in the present example (Step S103: third time).

(24) In Step S104, eight 48-bit subkeys are generated from the 64 bit merged key data in the present example (Step S104: third time).

(25)–(29) In Steps S105–S109, the third plaintext block is processed in the same way as the first plaintext block, so that first to seventh intermediate blocks and subsequently a third ciphertext block which correspond to the third plaintext block are generated, and the block storage unit 102 renews the chain block by storing the fourth intermediate block corresponding to the third plaintext block as the new chain block in the present example (Steps S105–S109: third time).

(30) In Step S110, the processing returns to Step S101, as unprocessed data of the plaintext data still exists in the present example (Step S110: third time).

(31) In Step S101, the block dividing unit 101 judges that the unprocessed data is not equal to or large than 64 bits, as the remaining data after 64 bits were separated from the 72-bit plaintext data is 8 bits in the present example (Step S101: fourth time).

(32) When the unprocessed data of the plaintext data is smaller than 64 bits, the unprocessed data is sent to the fraction data processing unit 106 (step S111). In the present example, the 193th to 200th bits of the 200-bit plaintext data are sent to the fraction data processing unit 106 as fraction plaintext data.

(33) On receiving the fraction plaintext data from the block dividing unit 101, the fraction data processing unit 106 generates fraction ciphertext data whose number of bits is the same as the fraction plaintext data using the chain block stored in the block storage unit 102 (Step S112). In the present example, an exclusive-OR operation is performed, for each corresponding bit, on the 8-bit fraction plaintext data and highest 8 bits of the 64-bit chain block which was generated when processing the third plaintext block and has been stored in the block storage unit 102, and as a result 8-bit fraction ciphertext data is generated.

(34) When it is judged that unprocessed data of the plaintext data does not exist in Step S110, or after the fraction ciphertext data is generated in step S112, the block integration unit 107 integrates each ciphertext block generated by the eighth encryption unit 105h and the fraction ciphertext data generated by the fraction data processing unit 106 to generate ciphertext data (Step S113). In the present example, the first to third ciphertext blocks and the fraction ciphertext data are integrated to form 200-bit ciphertext data.

Operation of Data Decryption Apparatus 20

Figure 11:
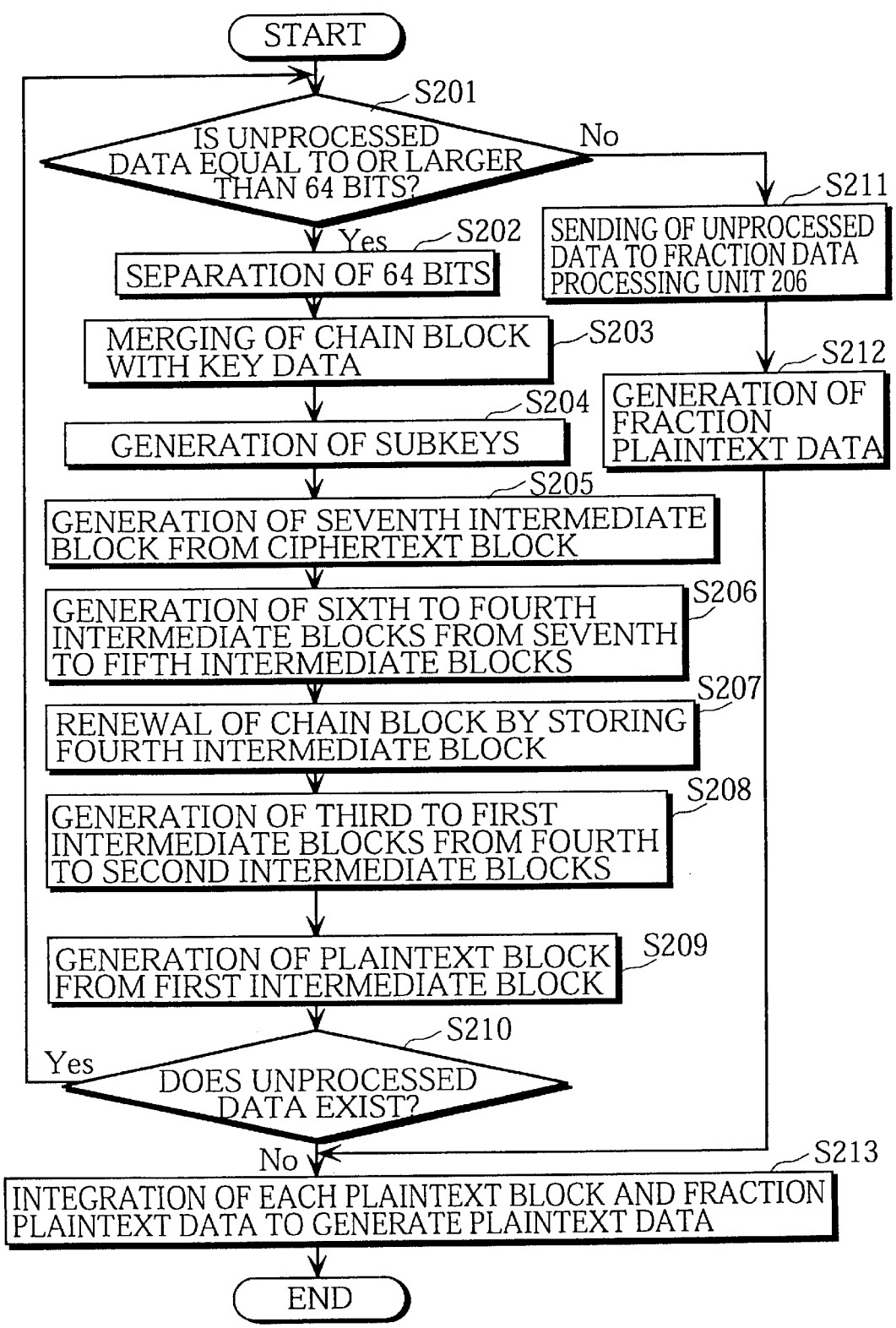
FIG. 11 is a flowchart showing the cryptographic processing of the data decryption apparatus 20 of First Embodiment of the present invention.

FIG. 11 is a flowchart showing the cryptographic processing of the data decryption apparatus 20 of First Embodiment of the present invention.

The operation of the data decryption apparatus 20 is inverse conversion of the operation of the data encryption apparatus 10.

As one example, a case is explained when the cryptographic processing is performed according to the DES algorithm in the data decryption apparatus 20 where 200-bit ciphertext data is inputted and the initial value IV of the chain block is stored in the block storage unit 202 in advance as in the block storage unit 102 of the data encryption apparatus 10.

(1) The block dividing unit 201 judges whether unprocessed data of the input ciphertext data is equal to or larger than 64 bits (Step S201). In the present example, unprocessed data of the input ciphertext data originally is 200 bits, so that the block dividing unit 201 judges that the unprocessed data is equal to or larger than 64 bits (Step S201: first time).

(2) When the unprocessed data of the input ciphertext data is equal to or larger than 64 bits, the first 64 bits are separated from the unprocessed data (Step S202). In the present example, the first to 64th bits of the 200-bit ciphertext data are separated as a first ciphertext block (Step S202: first time).

(3) The key data merging unit 203 merges the chain block stored in the block storage unit 202 with key data to generate merged key data (Step S203). In the present example, an exclusive-OR operation is performed on the initial value IV of the 64-bit chain block and 64-bit key data for each corresponding bit to generate merged key data, which is then sent to the subkey generation unit 204 (Step S203: first time).

(4) From the merged key data, the subkey generation unit 204 generates subkeys whose number is the same as the number of decryption units (Step S204). In the present example, eight 48-bit subkeys are generated from the 64-bit merged key data (Step S204: first time).

The process of generating first to eighth 48-bit subkeys (48 bits×8) from the 64-bit key data which includes 8 parity bits is the same as the subkey generation process performed by the subkey generation unit 104 of the data encryption apparatus 10.

(5) The first decryption unit generates a seventh intermediate block from a ciphertext block using the eighth subkey (Step S205). In the present example, a seventh intermediate block is generated from the first ciphertext block (Step S205; first time).

(6) The second to fourth decryption units 205b–205d generate sixth to fourth intermediate blocks from the seventh to fifth intermediate blocks using the seventh to fifth subkeys, respectively (Step S206). In the present example, sixth to fourth intermediate blocks are generated from the seventh to fifth intermediate blocks corresponding to the first ciphertext block (Step S206: first time).

(7) The block storage unit 202 renews the chain block by storing the fourth intermediate block generated by the fourth decryption unit 205d as the new chain block (Step S207). In the present example, the block storage unit 202 renews the chain block by storing the fourth intermediate block corresponding to the first ciphertext block (step S207: first time).

(8) The fifth to seventh decryption units 205e–205g generate third to first intermediate blocks from the fourth to second intermediate blocks using the fourth to second subkeys (Step S208). In the present example, third to first intermediate blocks are generated from the fourth to second intermediate blocks corresponding to the first ciphertext block (Step S208: first time).

(9) The eighth decryption unit 205h generates a plaintext block from the first intermediate block using the first subkey (Step S209). In the present example, a first plaintext block is generated from the first intermediate block corresponding to the first ciphertext block (Step S209: first time).

(10) It is judged whether unprocessed data of the ciphertext data exists. When the unprocessed data exists, the processing returns to Step S201 in order to process a next ciphertext block or fraction ciphertext data (Step S210). In the present example, unprocessed data exists, so that the processing returns to Step S201 (Step S210: first time).

(11) In Step S201, the block dividing unit 201 judges that the unprocessed data is equal to or larger than 64 bits, since the remaining data after 64 bits were separated from the 200-bit ciphertext data is 136 bits in the present example (Step S201: second time).

(12) In Step S202, the 65th to 128th bits are separated from the 200-bit ciphertext data as a second ciphertext block in the present example (Step S202: second time).

(13) In Step S203, an exclusive-OR operation is performed on the 64-bit chain block generated when processing the first ciphertext block and the 64-bit key data for each corresponding bit to generate merged key data, which is then sent to the subkey generation unit 204 in the present example (Step S203: second time).

(14) In Step S204, eight 48-bit subkeys are generated from the 64-bit merged key data in the present example (Step S204: second time).

(15)–(19) In Steps S205–S209, the second ciphertext block is processed in the same way as the first ciphertext block, so that seventh to first intermediate blocks and subsequently a second plaintext block which correspond to the second ciphertext block are generated, and the block storage unit 202 renews the chain block by storing the fourth intermediate block corresponding to the second ciphertext block as the new chain block in the present example (steps S205–S209: second time).

(20) In step S210, the processing returns to Step S201, as unprocessed data of the ciphertext data still exists in the present example (Step S210: second time).

(21) In Step S201, the block dividing unit 201 judges that the unprocessed data is equal to or larger than 64 bits, since the remaining data after 64 bits were separated from the 136-bit ciphertext data 72 bits in the present example (Step S201: third time).

(22) In Step S202, the 129th to 192th bits are separated from the 200-bit ciphertext data as a third ciphertext block in the present example (Step S202: third time).

(23) In Step S203, an exclusive-OR operation is performed on the 64-bit chain block generated when processing the second ciphertext block and the 64-bit key data for each corresponding bit to generate merged key data, which is then sent to the subkey generation unit 204 in the present example (Step S203: third time).

(24) In Step S204, eight 48-bit subkeys are generated from the 64-bit merged key data in the present example (Step S204: third time).

(25)–(29) In Steps S205–S209, the third ciphertext block is processed in the same way as the first ciphertext block, so that seventh to first intermediate blocks and subsequently a third plaintext block which correspond to the third ciphertext block are generated, and the block storage unit 202 renews the chain block by storing the fourth intermediate block corresponding to the third ciphertext block as the new chain block in the present example (Steps S205–S209: third time).

(30) In Step S210, the processing returns to Step S201, as unprocessed data of the ciphertext data still exists in the present example (Step S210: third time).

(31) In Step S201, the block dividing unit 201 judges that the unprocessed data is not equal to or larger than 64 bits, as the remaining data after 64 bits were separated from the 72-bit ciphertext data is 8 bits in the present example (Step S201: fourth time).

(32) When the unprocessed data of the ciphertext data is smaller than 64 bits, the unprocessed data is sent to the fraction data processing unit 206 (Step S211). In the present example, the 193th to 200th bits of the 200-bit ciphertext data are sent to the fraction data processing unit 206 as fraction ciphertext data.

(33) On receiving the fraction ciphertext data from the block dividing unit 201, the fraction data processing unit 206 generates fraction plaintext data whose number of bits is the same as the fraction ciphertext data using the chain block stored in the block storage unit 202 (Step S212). In the present example, an exclusive-OR operation is performed, for each corresponding bit, on the 8-bit fraction ciphertext data and highest 8 bits of the 64-bit chain block which was generated when processing the third ciphertext block and has been stored in the block storage unit 202, and as a result 8-bit fraction ciphertext data is generated.

(34) When it is judged that unprocessed data of the ciphertext data does not exist in Step S210, or after the fraction plaintext data is generated in Step S212, the block integration unit 207 integrates each plaintext block generated by the eighth decryption unit 205h and the fraction plaintext data generated by the fraction data processing unit 206 to generate plaintext data (Step S211). In the present example, the first to third plaintext blocks and the fraction plaintext data are integrated to form 200-bit plaintext data.

In the cryptographic processing apparatus of First Embodiment, an intermediate block generated when performing the cryptographic processing on a present block is stored as a chain block, which is then merged with key data when performing the cryptographic processing on a next block, renewing the chain block each time the cryptographic processing is performed.

Second Embodiment

Second Embodiment of the present invention is different from First Embodiment in that a chain block is not merged with key data but merged with either cryptographic-processing object data or data which has been generated by the cryptographic processing.

Construction

The construction of an encrypted communication system of Second Embodiment is the same as that of First Embodiment, and is thereby not explained here.

Construction of Data Encryption Apparatus 10

Figure 12:
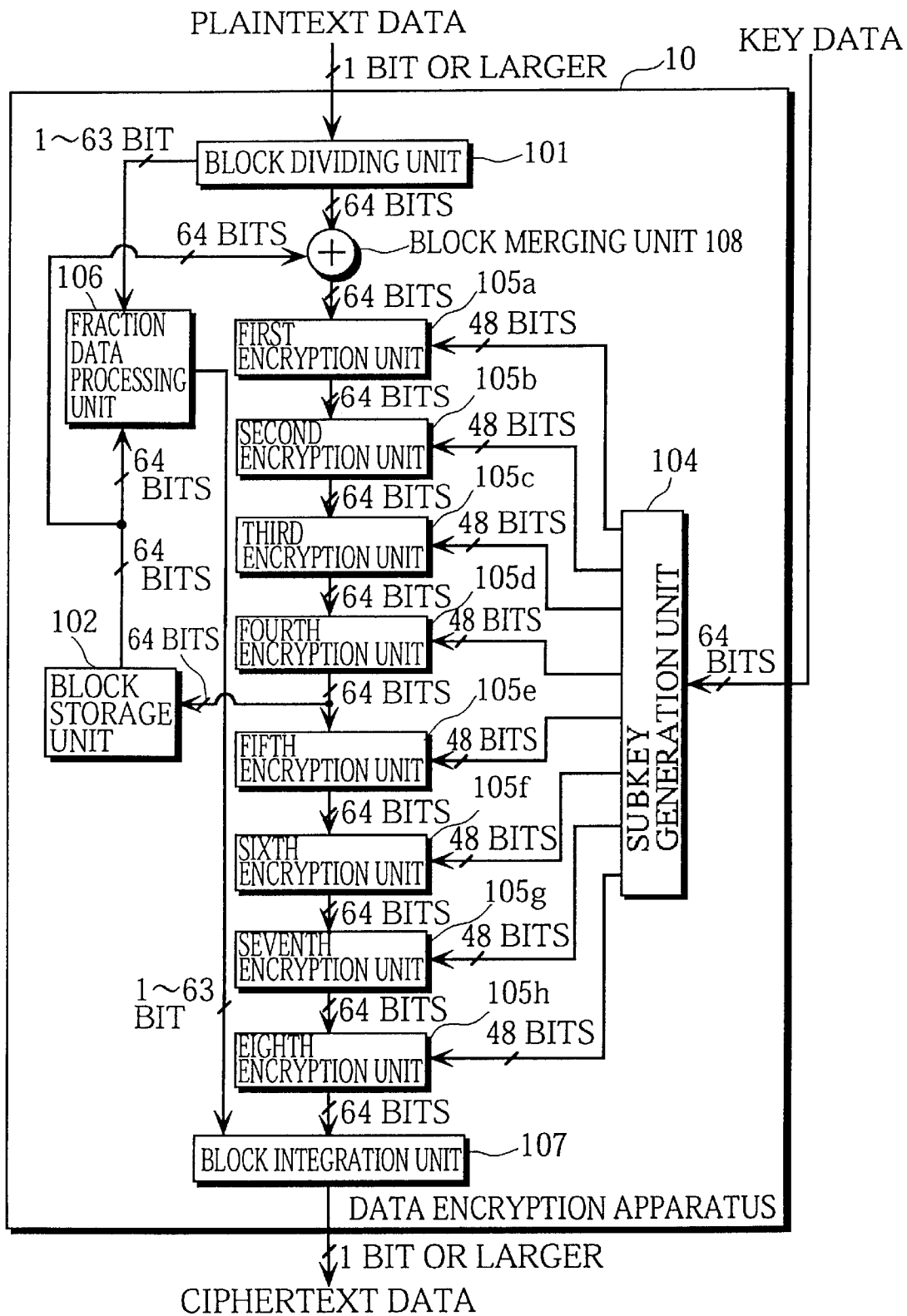
FIG. 12 shows the detailed construction of the data encryption apparatus 10 of Second Embodiment of the present invention.

FIG. 12 shows the detailed construction of a data encryption apparatus 10, which is shown in FIG. 2, of Second Embodiment of the present invention.

Components which are the same as those in the data encryption apparatus 10 of First Embodiment shown in FIG. 3 are given the same numbers. Components whose functions are the same as those in the data encryption apparatus 10 of the First Embodiment are not explained here.

The data encryption apparatus 10 of the Second Embodiment includes a block dividing unit 101, a block storage unit 102, a subkey generation unit 104, first to eighth encryption units 105a–105h, a fraction data processing unit 106, a block integration unit 107, and a block merging unit 108.

When comparing the conventional encryption apparatus 30 shown in FIG. 1 and the data encryption apparatus 10 of the Second Embodiment of the present invention shown in FIG. 12, the exclusive-OR unit 301 corresponds to the block merging unit 108, the data encryption unit 302 corresponds to the block dividing unit 101, the subkey generation unit 104, the first to eighth encryption units 105a–105h, the fraction data processing unit 106, and the block integration unit 107, and the register 303 corresponds to the block storage unit 102.

Here, the same example is used as in the First Embodiment where plaintext data of 200 bits is inputted in the data encryption apparatus 10.

The block dividing unit 101 of the Second Embodiment is different from that of First the Embodiment only in that it sends divided blocks not to the first encryption unit 105a but to the block merging unit 108.

The block merging unit 108 merges a chain block stored in the block storage unit 102 with a plaintext block to generate a merged plaintext block. In the present example, for processing a first plaintext block, an exclusive-OR operation is performed on the 64-bit first plaintext block and an initial value IV of d 64-bit chain block for each corresponding bit to generate a 64-bit first merged plaintext block. For processing second and third plaintext blocks, an exclusive-OR operation is performed, for each corresponding bit, on each of the 64-bit second and third plaintext blocks and a 64-bit chain block generated during the processing of the immediately preceding plaintext block, so as to generate 64-bit second and third merged plaintext blocks, respectively.

The subkey generation unit 104 generates subkeys whose number is the same as the number of encryption units from key data. In the present example, the subkey generation unit 104 generates eight 48-bit subkeys from 64-bit input key data which has been determined in advance.

The first encryption unit 105a generates a first intermediate block not from the plaintext block but from the merged plaintext block generated by the block merging unit 108.

The first to eighth encryption units 105a–105h of the data encryption apparatus 10 of the Second Embodiment have the same functions as those of the First Embodiment. In the present example, First to seventh intermediate blocks are progressively generated for each of the first to third merged plaintext blocks, with first to third ciphertext blocks being generated from the resulting intermediate blocks.

Construction of Data Decryption Apparatus 20

Figure 13:
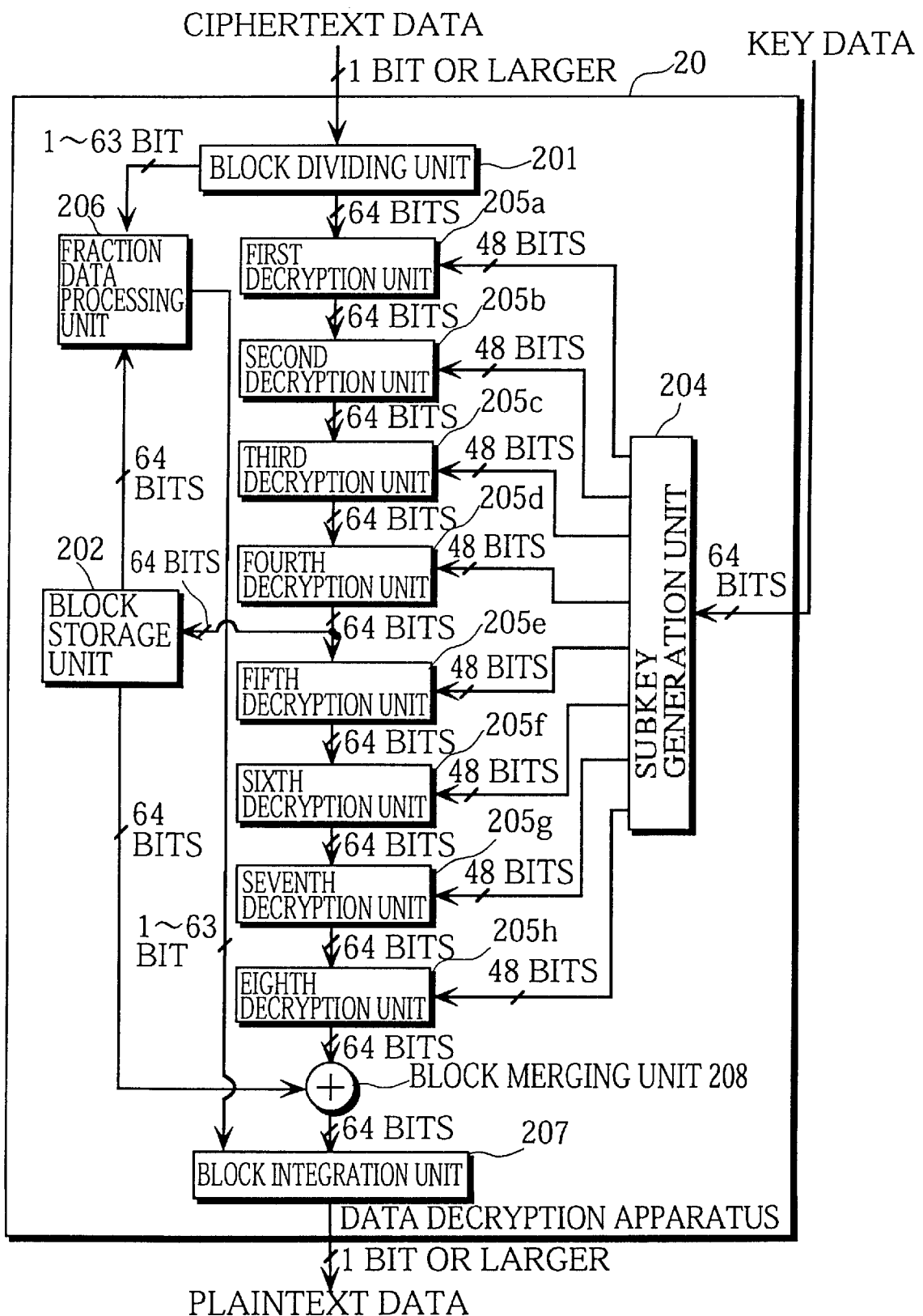
FIG. 13 shows the detailed construction of the data decryption apparatus 20 of Second Embodiment of the present invention.

FIG. 13 shows the detailed construction of a data decryption apparatus 20, which is shown in FIG. 2, of Second Embodiment of the present invention.

Components which are the same as those in the data decryption apparatus 20 of the First Embodiment shown in FIG. 8 are given the same numbers. Components whose functions are the same as those in the data decryption apparatus 20 of the First Embodiment are not explained here.

The data decryption apparatus 20 of the Second Embodiment includes a block dividing unit 201, a block storage unit 202, a subkey generation unit 204, first to eighth decryption units 205a–205h, a fraction data processing unit 206, a block integration unit 207, and a block merging unit 208.

Here, the same example is used as in the First Embodiment where ciphertext data of 200 bits is inputted in the data decryption apparatus 20.

The subkey generation unit 204 generates subkeys whose number is the same as the number of decryption units from key data. In the present example, the subkey generation unit 204 generates eight 48-bit subkeys from 64-bit input key data which has been determined in advance. It should be noted here that the function of generating the subkeys by the subkey generation unit 204 of the data decryption apparatus 20 is the same as the function of generating the subkeys by the subkey generation unit 104 of the data encryption apparatus 10.

The eighth decryption unit 205h generates a cryptographic-processed block from a first intermediate block using a first subkey.

The first to eighth decryption units 205a–205h of the data decryption apparatus 20 of the Second Embodiment have the same functions as those of the First Embodiment. In the present example, seventh to first intermediate blocks are progressively generated for each of the first to third ciphertext blocks, with first to third cryptographic-processed blocks being generated from the resulting intermediate blocks.

The block merging unit 208 merges a chain block stored in the block storage unit 202 with a cryptographic-processed block to generate a plaintext block. In the present example, for processing the first ciphertext block, an exclusive-OK operation is performed on the 64-bit first cryptographic-processed block and an initial value IV of the 64-bit chain block for each corresponding bit to generate a 64-bit first plaintext block. For processing the second and third ciphertext blocks, an exclusive-OR operation is performed, for each corresponding bit, on each of the 64-bit second and third cryptographic-processed blocks and a 64-bit chain block generated during the processing of the immediately preceding ciphertext block, so as to generate 64-bit second and third plaintext blocks, respectively.

The block integration unit 207 integrates each plaintext block generated by the block merging unit 208 and fraction plaintext data generated by the fraction data processing unit 206 to generate plaintext data. In the present example, the 64-bit first to third plaintext blocks and the 8-bit fraction plaintext data are integrated to form 200-bit plaintext data.

Operation

Operation of Data Encryption Apparatus 10

Figure 14:
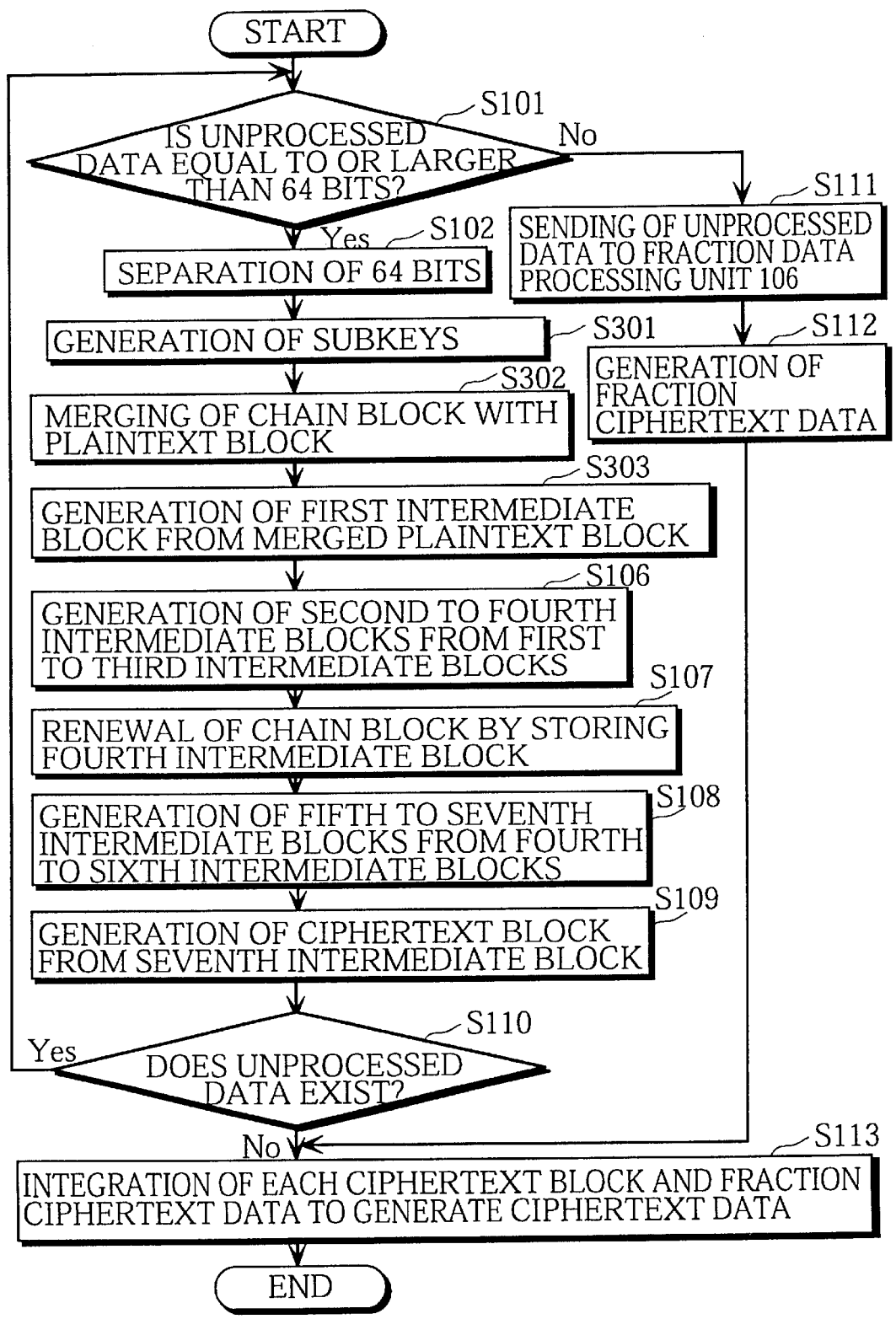
FIG. 14 is a flowchart showing the cryptographic processing of the data encryption apparatus 10 of Second Embodiment of the present invention.

FIG. 14 is a flowchart showing the cryptographic processing of the data encryption apparatus 10 of Second Embodiment of the present invention.

Here, the same example as in the First Embodiment is used, wherein the cryptographic processing is performed according to the DES algorithm in the data encryption apparatus 10 where 200-bit plaintext data is inputted and the initial value IV of the chain block is stored in the block storage unit 102 in advance.

Steps which are the same as those in the operation of the data encryption apparatus 10 of the First Embodiment shown in FIG. 10 are given the same numbers, and are not explained here.

(1)–(2) The same as the First Embodiment (Steps S101 and S102: first time).

(3) The subkey generation unit 104 generates subkeys whose number is the same as the number of encryption units from key data (Step S301). In the present example, eight 48-bit subkeys are generated from 64-bit input key data which has been determined in advance (Step S301: first time).

(4) The block merging unit 108 merges a plaintext block with the chain block stored in the block storage unit 102 to generate a merged plaintext block (Step S302). In the present example, an exclusive-OR operation is performed on the 64-bit first plaintext block and the initial value IV of the 64-bit chain block for each corresponding bit to generate a 64-bit first merged plaintext block (Step S302: first time).

(5) The first encryption unit 105a generates a first intermediate block from the merged plaintext block using a first subkey (step S303). In the present example, a first intermediate block is generated from the first merged plaintext block (Step S303: first time).

(6)–(12) The same as the First Embodiment (Steps S106–S110: first time, Steps S101 and S102: second time).

(13) In Step S301, eight 48-bit subkeys are generated from the 64-bit key data in the present example. It the key data has not been changed since the first time, the eight 48-bit subkeys generated in the first time may be stored, as the subkeys generated in the second time is the same as the subkeys generated in the first time (Step S301: second time).

(14) In Step S302, an exclusive-OR operation is performed, for each corresponding bit, on the 64-bit second plaintext block and the 64-bit chain block generated when processing the first plaintext block, so as to generate a 64-bit second merged plaintext block in the present example (Step S302: second time).

(15) In Step S303, a first intermediate block is generated from the second merged plaintext block in the present example (Step S303: second time).

(16)–(22) the same as the First Embodiment (Steps S106–S110: second time, Steps S101 and S102: third time).

(23) In Step S301, eight 48-bit subkeys are generated from the 64-bit key data in the present example. If the key data has not been changed since the first time, the eight 48-bit subkeys generated in the first time may be stored, since the subkeys generated in the third time is the same as the subkeys generated in the first time (Step S301: third time).

(24) In Step S302, an exclusive-OR operation is performed, for each corresponding bit, on the 64-bit third plaintext block and the 64-bit chain block generated when processing the second plaintext block, so as to generate a 64-bit third merged plaintext block in the present example (Step S302: third time).

(25) In Step S303, a first intermediate block is generated from the third merged plaintext block in the present example (Step S303 third time).

(26)–(34) The same as the First Embodiment (Steps S106–S110: third time, Step S101: fourth time, Steps S111–S113).

Operation of Data Decryption Apparatus 20

Figure 15:
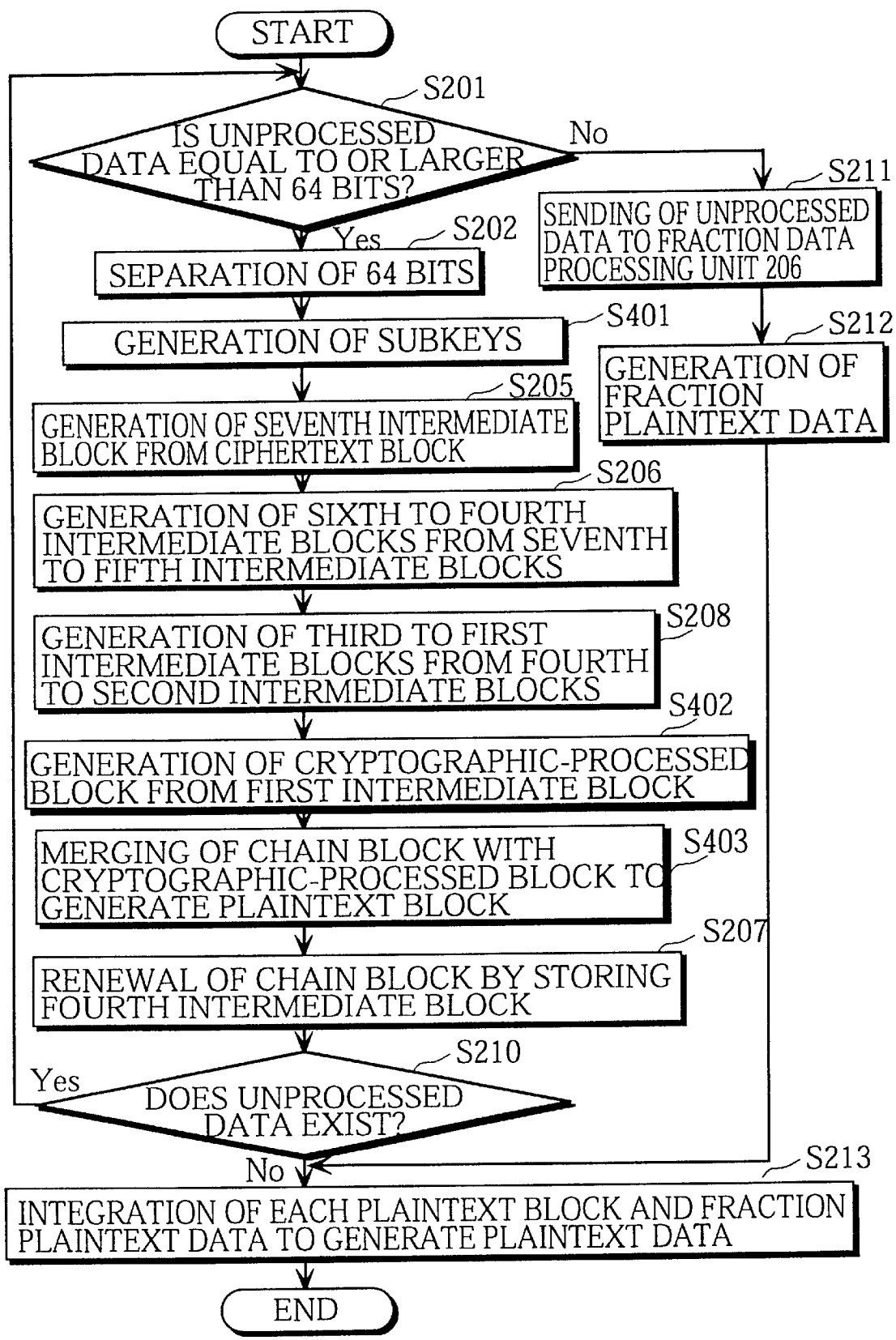
FIG. 15 is a flowchart showing the cryptographic processing of the data decryption apparatus 20 of Second Embodiment of the present invention.

FIG. 15 is a flowchart showing the cryptographic processing of the data decryption apparatus 20 of Second Embodiment of the present invention.

The operation of the data decryption apparatus 20 is inverse conversion of the operation of the data encryption apparatus 10.

Here, the same example as in the First Embodiment is used, wherein the cryptographic processing is performed according to the DES algorithm in the data decryption apparatus 20 where 200-bit ciphertext data is inputted and the initial value IV of the chain block is stored in the block storage unit 202 in advance.

Steps which are the same as those in the operation of the data decryption apparatus 20 of the First Embodiment shown in FIG. 11 are given the same numbers, and are not explained here.

(1)–(2) The same as the First Embodiment (Steps S201–S202: first time).

(3) The subkey generation unit 204 generates subkeys whose number is the same as the number of decryption units from key data (Step S401). In the present example, eight 48-bit subkeys are generated from the 64-bit input key data which has been determined in advance (step S401: first time).

(4)–(6) The same as (5), (6), and (8) of the First Embodiment (Steps S205, S206, and S208: first time).

(7) The eighth decryption unit 205h generates a cryptographic-processed block from the first intermediate block using a first subkey (Step S402). In the present example, a first cryptographic-processed block is generated from the first intermediate block corresponding to the first ciphertext block (Step S402: first time).

(8) The block merging unit 208 merges the cryptographic processed block with the chain block stored in the block storage unit 202 (Step S403). In the present example, an exclusive OR operation is performed on the 64-bit first cryptographic-processed block and the initial value IV of the 64-bit chain block for each corresponding bit to generate a 64-bit first plaintext block (Step S403: first time).

(9) The same as (7) of the First Embodiment (Step S207: first time).

(10)–(12) The same as the First Embodiment (Step S210: first time, Steps S201 and S202: second time).

(13) In Step S401, eight 48-bit subkeys are generated from the 64-bit key data in the present example. If the key data has not been changed, the eight 48-bit subkeys generated in the first time may be stored, since the subkeys generated in the second time is the same as the subkeys generated in the first time (Step S401: second time).

(14)–(16) The same as (15), (16), and (18) of the First Embodiment (Steps S205, S206, and S208: second time).

(17) In Step S402, a second cryptographic-processed block is generated from the first intermediate block corresponding to the second ciphertext block in the present example (Step S402: second time).

(18) In Step S403, an exclusive-OR operation is performed, for each corresponding bit, on the 64-bit second cryptographic-processed block and the 64-bit chain block generated when processing the first ciphertext block, 30 as to generate a 64 bit second plaintext block (Step S403: second time).

(19) The same as (17) of the First Embodiment (Step S207: second time).

(20)–(22) The same as the First Embodiment (Step S210: second time, Steps S201–S202: third time).

(23) In Step S401, eight 48-bit subkeys are generated from the 64-bit key data in the present example. If the key data has not been changed, the eight 48-bit subkeys generated in the first time may be stored, since the subkeys generated in the third time is the same as the subkeys generated in the first time (Step S401: third time).

(24)–(26) The same as (25), (26), and (28) of First Embodiment (Steps S205, S206, and S208: third time).

(27) In Step S402, a third cryptographic-processed block is generated from the first intermediate block corresponding to the third ciphertext block in the present example (Step S402: third time).

(28) In Step S403, an exclusive-OR operation is performed, for each corresponding bit, on the 64-bit third cryptographic-processed block and the 64-bit chain block generated when processing the second ciphertext block, so as to generate a 64-bit third plaintext block (Step S403: third time).

(29) The same as (27) of the First Embodiment (Step S207: third time).

(30)–(34) The same as the First Embodiment (Step S210: third time, Step S201: fourth time, Steps S211–S213).

In the cryptographic processing apparatus of Second Embodiment, an intermediate block generated when the cryptographic processing is performed on a present block is stored as a chain block, which is then merged with a plaintext block or a cryptographic-processed block when the cryptographic processing is performed on a next block, renewing the chain block each time the cryptographic processing is performed.

Third Embodiment

A data encryption apparatus 10 of Third Embodiment of the present invention is different from that of First Embodiment only in the input of a fifth encryption unit 105e. While the input of the encryption unit 105e of First Embodiment is the output of the fourth encryption unit 105d, the input of the fifth encryption unit 105e of the Third Embodiment is a plaintext block. Accordingly, a chain block and the plaintext block are processed by different encryption units.

Also, a data decryption apparatus 20 of Third Embodiment of the present invention operates in inverse conversion of the data encryption apparatus 10. The data decryption apparatus 20 of the Third Embodiment is different from that of the First Embodiment in that the output of a fourth decryption unit 205d is a plaintext block, which is encrypted in the same way as the data encryption apparatus 10 to generate a fourth intermediate block, the fourth intermediate block then being stored as the new chain block.

Construction

The construction of an encrypted communication system of the Third Embodiment is the same as that of the First Embodiment, and is thereby not explained here.

Construction of Data Encryption Apparatus 10

Figure 16:
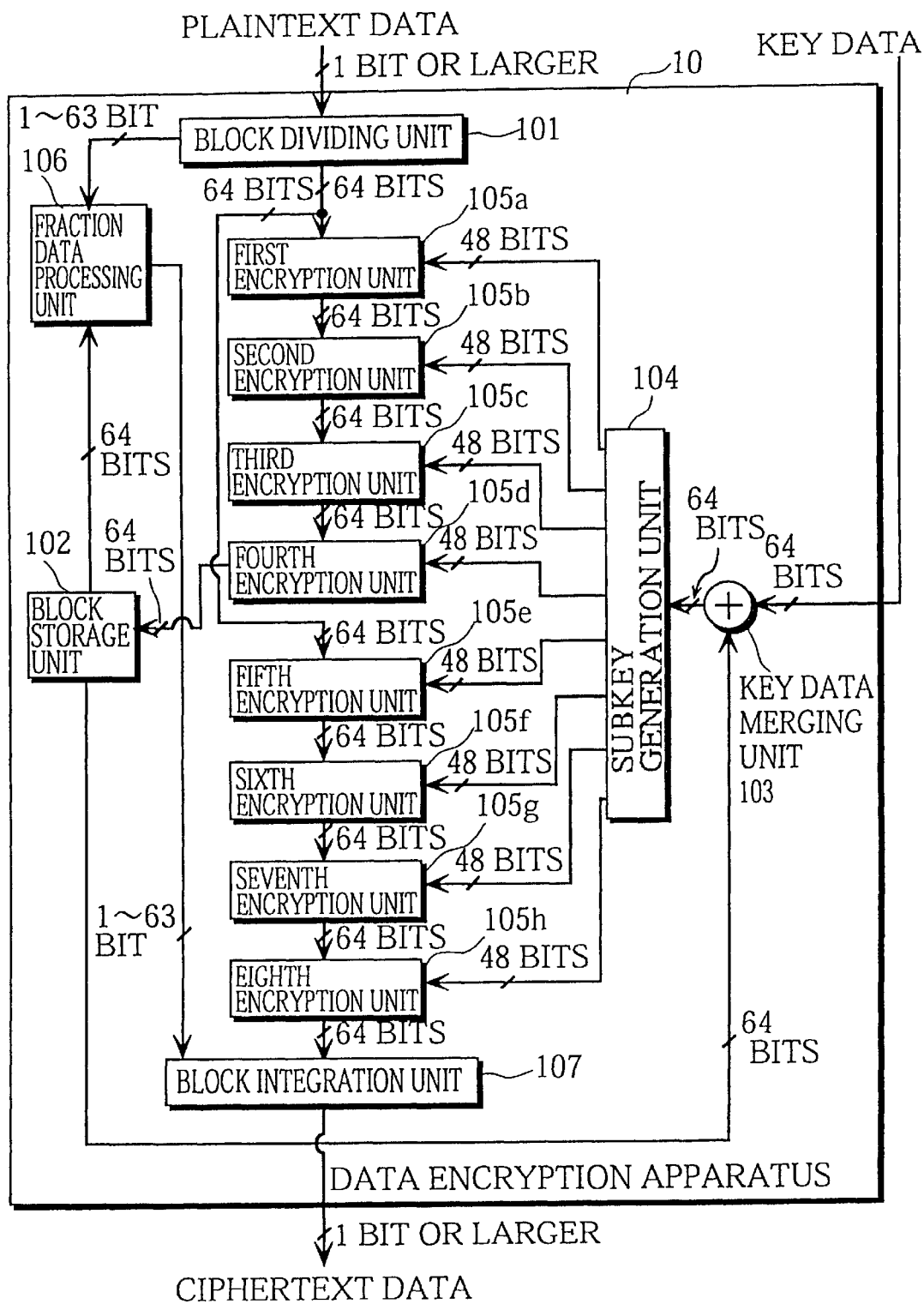
FIG. 16 shows the detailed construction of the data encryption apparatus 10 of Third Embodiment of the present invention.

FIG. 16 shows the detailed construction of a data encryption apparatus 10, which is shown in FIG. 2, of Third Embodiment of the present invention.

Components which are the same as those in the data encryption apparatus 10 of the First Embodiment shown in FIG. 3 are given the same numbers. Components whose functions are the same as those in the data encryption apparatus 10 of the First Embodiment are not explained here.

The construction of the data encryption apparatus 10 of Third Embodiment is the same as that of the First Embodiment, the only difference lying in that the fifth encryption unit 105e of the Third Embodiment generates a fifth intermediate block not from a fourth intermediate block but from the plaintext block.

Construction of Data Decryption Apparatus 20

Figure 17:
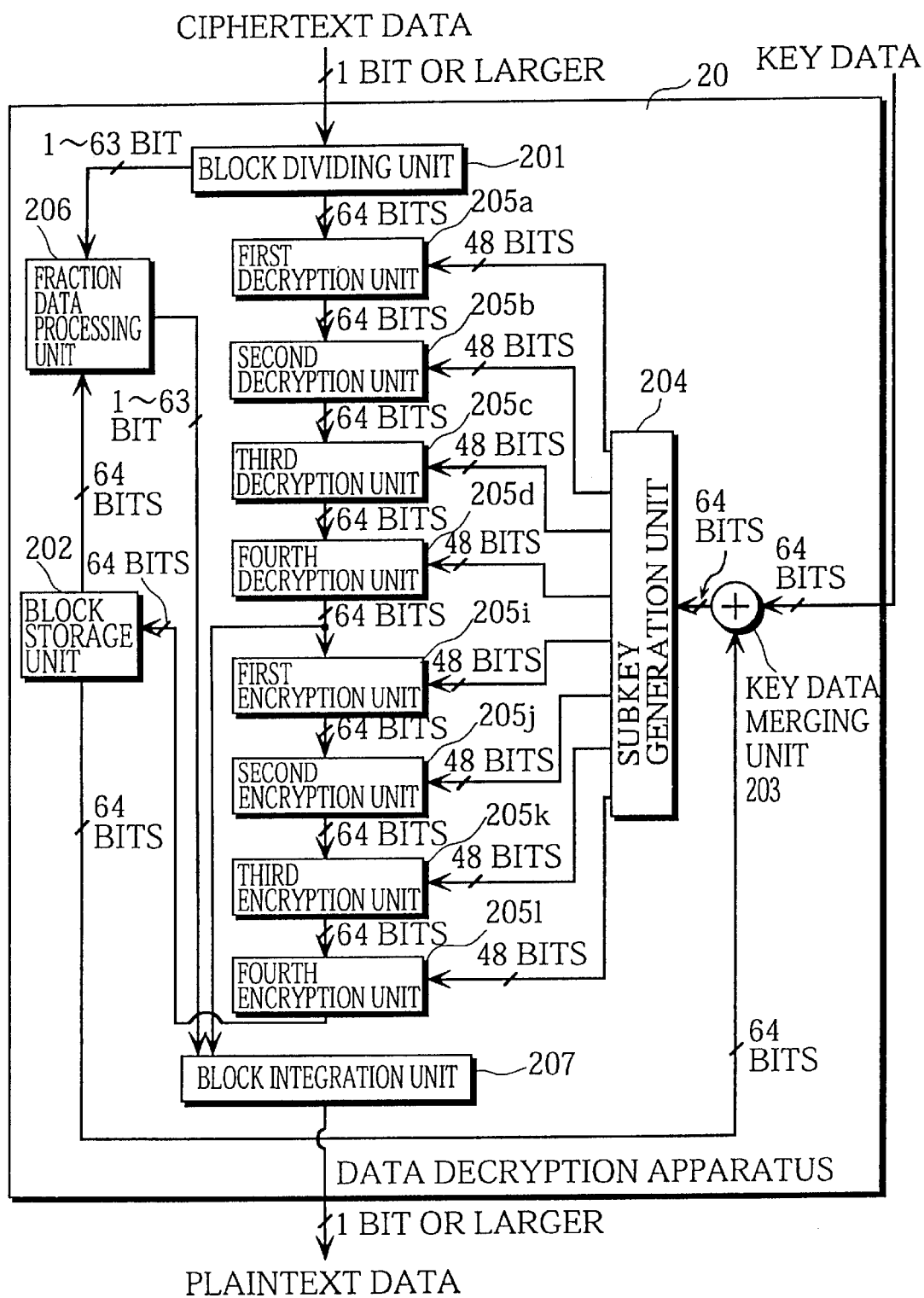
FIG. 17 shows the detailed construction of the data decryption apparatus 20 of Third Embodiment of the present invention.

FIG. 17 shows the detailed construction of a data decryption apparatus 20, which is shown in FIG. 2, of Third Embodiment of the present invention.

Components which are the same as those in the data decryption apparatus 20 of the First Embodiment shown in FIG. 8 are given the same numbers. Components whose functions are the same as those in the data decryption apparatus 20 of the First Embodiment are not explained here.

The data decryption apparatus 20 of the Third Embodiment includes a block dividing unit 201, a block storage unit 202, a key data merging unit 203, a subkey generation unit 204, first to fourth decryption units 205a–205d, first to fourth encryption units 205i–205l, a fraction data processing unit 206, and a block integration unit 207.

Here, the same example is used as in the First Embodiment where ciphertext data of 200 bits is inputted in the data decryption apparatus 20.

The fourth decryption unit 205d generates a plaintext block from a fifth intermediate block using a fifth subkey. In the present example, first to third plaintext blocks are generated from each fifth intermediate block corresponding to first to third ciphertext blocks. It should be noted that the first to fourth decryption units 205a–205d perform inverse conversions of the eighth to fifth encryption units 105h–105e of the data encryption apparatus 10, respectively.

The first encryption unit 205i generates a first intermediate block from the plaintext block generated by the fourth decryption unit 205d using a first subkey.

The second to fourth encryption units 205j–205l generate second to fourth intermediate blocks, from the first to third intermediate blocks using second to fourth subkeys, respectively.

The first to fourth encryption units 205i–205l have the same functions and operations as the first to fourth encryption units 105a–105d of the data encryption apparatus 10. In the present example, from the first to third plaintext blocks, the first to fourth intermediate blocks which correspond to each of the first to third plaintext blocks are generated.

Each time the fourth encryption unit 205l generates a fourth intermediate block, the block storage unit 202, which is provided with a block renewal function, renews the chain block by storing the fourth intermediate block as the new chain block, which is used for processing a next block. This operation is the same as in the First Embodiment.

The block integration unit 207 integrates each plaintext block generated by the fourth decryption unit 205d and fraction plaintext data generated by the fraction data processing unit 206 to generate plaintext data. In the present example, the 64-bit first to third plaintext blocks and 8-bit fraction plaintext data are integrated to form 200-bit plaintext data.

Operation

Operation of Data Encryption Apparatus 10

Figure 18:
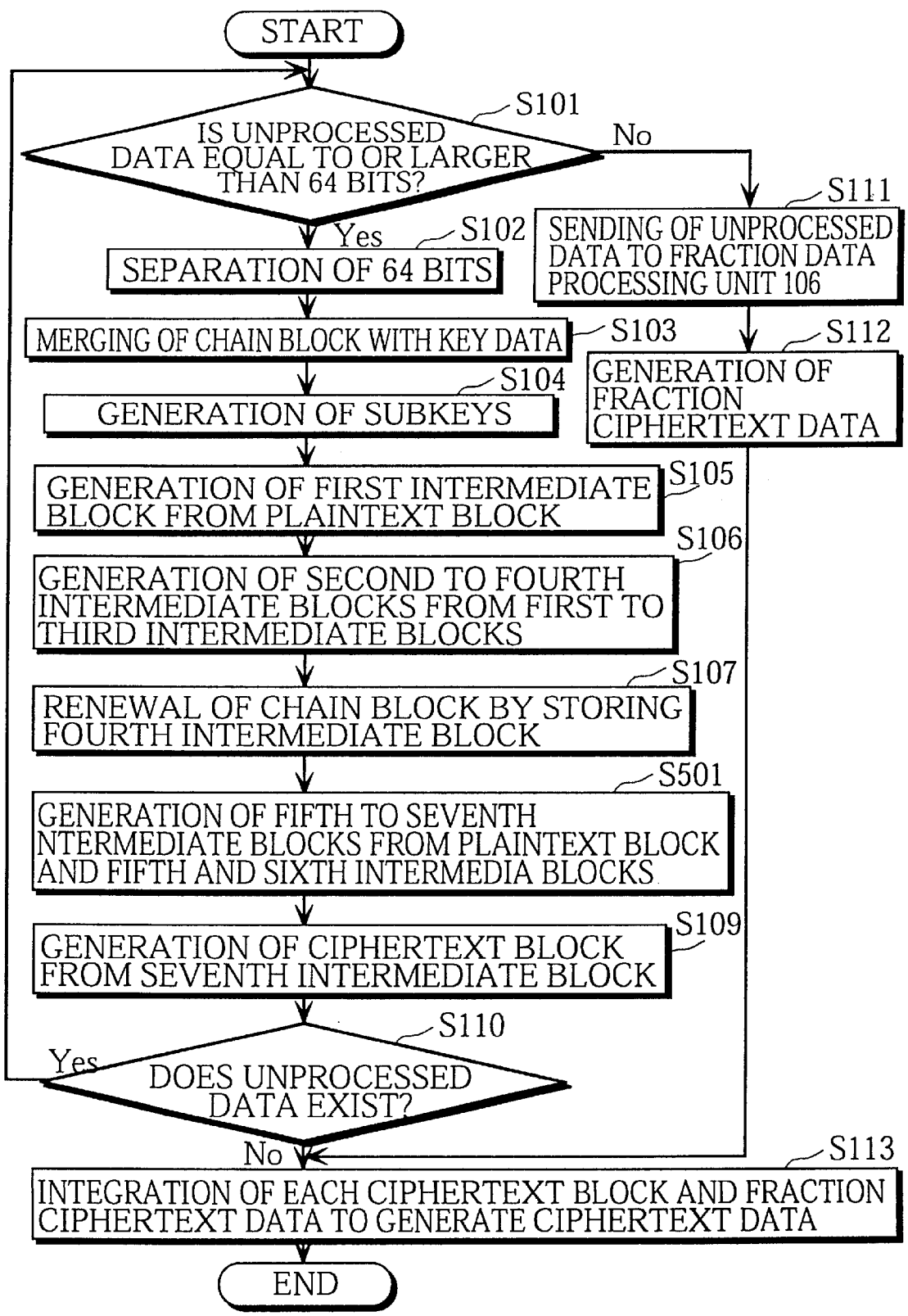
FIG. 18 is a flowchart showing the cryptographic processing of the data encryption apparatus 10 of Third Embodiment of the present invention.

FIG. 18 is a flowchart showing the cryptographic processing of the data encryption apparatus 10 of Third Embodiment of the present invention.

Here, the same example as in the First Embodiment is used, wherein the cryptographic processing is performed according to the DES algorithm in the data encryption apparatus 10 where 200-bit plaintext data is inputted and the initial value of the chain block is stored in the block storage unit 102 in advance.

Steps which are the same as those in the operation of the data encryption apparatus 10 of the First Embodiment shown in FIG. 10 are given the same numbers, and are not explained here.

(1)–(7) The same as the First Embodiment (Steps S101–S107: first time).

(8) The fifth to seventh encryption units 105e–105g generate fifth to seventh intermediate blocks from the plaintext block and the fifth and sixth intermediate blocks using the fifth to seventh subkeys, respectively (Step S501). In the present example, fifth to seventh intermediate blocks are generated from the first plaintext block and the fifth and sixth intermediate blocks corresponding to the first plaintext block, respectively (Step S501: first time).

(9)–(17) The same as the First Embodiment (Steps S109 and S110: first time, Steps S101–S107: second time).

(18) In Step S501, fifth to seventh intermediate blocks are generated from the second plaintext block and the fifth and sixth intermediate blocks corresponding to the second plaintext block respectively, in the present example (Step S501: second time).

(19)–(27) The same as the First Embodiment (Steps S109 and S110: second time, Steps S101–S107: third time).

(28) In Step S501, fifth to seventh intermediate blocks are generated from the third plaintext block and the fifth and sixth intermediate blocks corresponding to the third plaintext block respectively, in the present example (Step S501: third time).

(29)–(34) The same as the First Embodiment (Steps S109 and S110: third time, Step S101; fourth Lime, Steps S111–S113).

Operation of Data Decryption Apparatus 20

Figure 19:
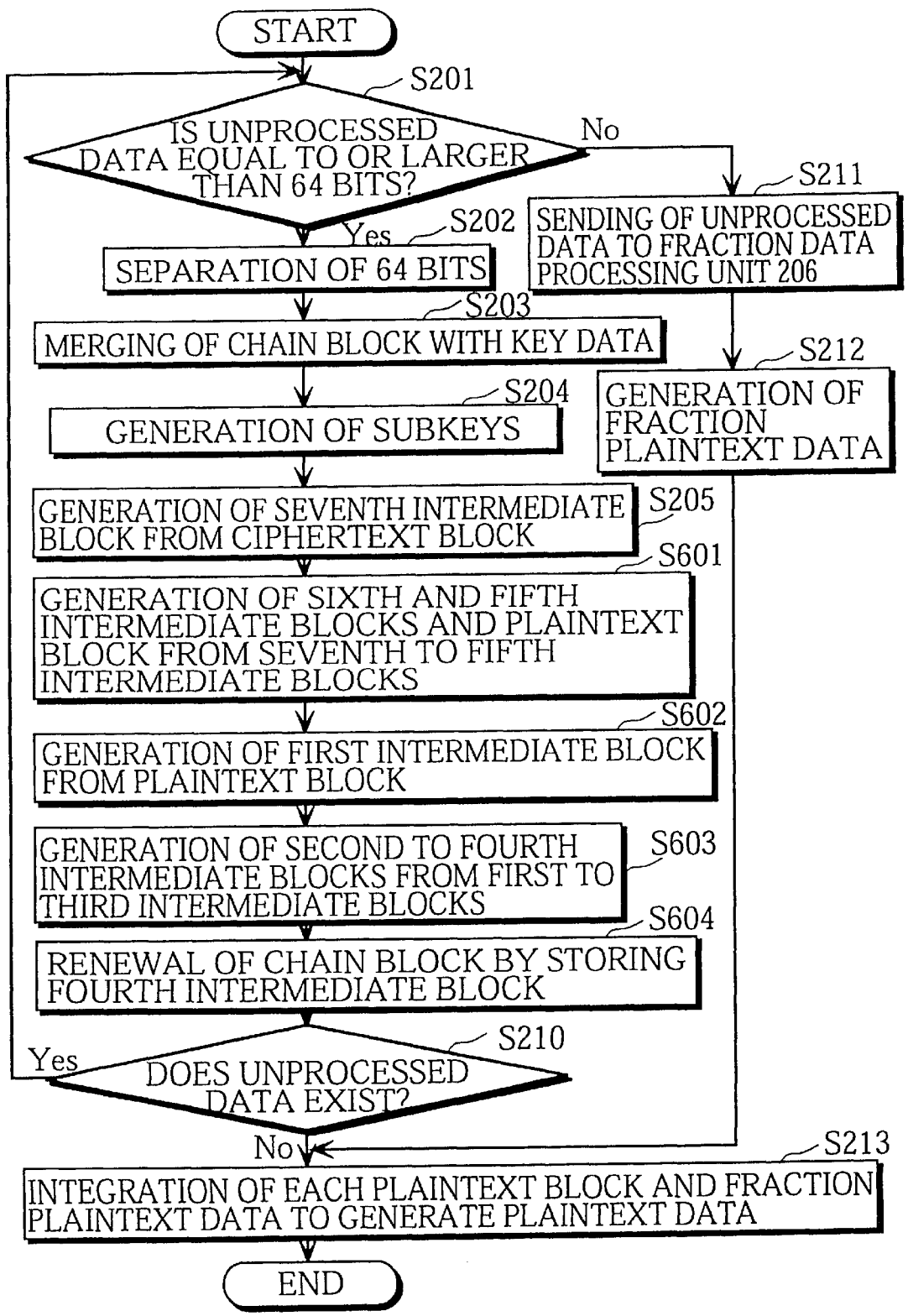
FIG. 19 is a flowchart showing the cryptographic processing of the data decryption apparatus 20 of Third Embodiment of the present invention.

FIG. 19 is a flowchart showing the cryptographic processing of the data decryption apparatus 20 of Third Embodiment of the present invention.

The operation of the data decryption apparatus 20 is inverse conversion of the operation of the data encryption apparatus 10.

Here, the same example as in the First Embodiment is used, wherein the cryptographic processing is performed according to the DES algorithm in the data decryption apparatus 20 where 200-bit ciphertext data is inputted and the initial value IV of the chain block is stored in the block storage unit 202 in advance.

(1)–(5) The same as the First Embodiment (Steps S201–S205: first time).

(6) The second to fourth decryption units 205b–205d generate sixth and fifth intermediate blocks and a plaintext block from the seventh to fifth intermediate blocks using the seventh to fifth subkeys, respectively (Step S601). In the present example, sixth and fifth intermediate blocks and a first plaintext block is generated from the seventh to fifth intermediate blocks corresponding to the first ciphertext block, respectively (Step S601: first time).

(7) The first encryption unit 205i generates a first intermediate block from the plaintext block generated by the fourth decryption unit 205d using the first subkey (Step S602). In the present example, a first intermediate block is generated from the first plaintext block (Step S602: first time).

(8) The second to fourth encryption units 205j–205l generate second to fourth intermediate blocks from the first to third intermediate blocks using the second to fourth subkeys, respectively (Step S603). In the present example, second to fourth intermediate blocks are generated from the first to third intermediate blocks corresponding to the first plaintext block, respectively (Step S603: first time).

(9) The block storage unit 202 renews the chain block by storing the fourth intermediate block generated by the fourth encryption unit 205l as the new chain block (Step S604). In the present example, the block storage 202 renews the chain block by storing the fourth intermediate block corresponding to the first plaintext block (Step S604: first time).

(10) (15) The same as the First Embodiment (Step S210: first time, Steps S201 S205: second time).

(16) In Step S601, sixth and fifth intermediate blocks and a second plaintext block are generated from the seventh to fifth intermediate blocks corresponding to the second ciphertext block respectively, in the present example (Step S601: second time).

(17) In Step S602, a first intermediate block is generated from the second plaintext block in the present example (Step S602: second time).

(18) in Step S603, second to fourth intermediate blocks are generated from the first to third intermediate blocks corresponding to the second plaintext block respectively, in the present example (Step S603: second time).

(19) In Step S604, the block storage unit 202 renews the chain block by storing the fourth intermediate block corresponding to the second plaintext block in the present example (Step S604: second time).

(20)–(25) The same as the First Embodiment (Step S210: second time, Steps S201–S205: third time).

(26) In Step S601, sixth and fifth intermediate blocks and a third plaintext block are generated from the seventh to fifth intermediate blocks corresponding to the third ciphertext block respectively, in the present example (Step S601: third time).

(27) In Step S602, a first intermediate block is generated from the third plaintext block in the present example (Step S602: third time).

(28) In Step S603, second to fourth intermediate blocks are generated from the first to third intermediate blocks corresponding to the third plaintext block respectively, in the present example (Step S603: third time).

(29) In Step S604, the block storage unit 202 renews the chain block by storing the fourth intermediate block corresponding to the third plaintext block as the new chain block in the present example (Step S604: third time).

(30)–(34) The same as the First Embodiment (Step S210: third time, Step S201: fourth time, Steps S211–S213).

In the cryptographic processing apparatuses of the Third Embodiment, an intermediate block generated when the cryptographic processing is performed on a present block is stored as a chain block, which is then merged with key data when performing the cryptographic processing on a next block, renewing the chain block each time the cryptographic processing is performed.

It should be noted that in the Third Embodiment the change described above is applied to the First Embodiment in which the chain block is merged with the key data, while the change may be applied to the Second Embodiment in which the chain block is merged with a plaintext block or a cryptographic-processed block.

In such a cryptographic processing apparatus, an intermediate block generated when the cryptographic processing is performed on a present block is stored as a chain block, which is then merged with the plaintext block or the cryptographic-processed block when the cryptographic processing is performed on a next block, renewing the chain block each time the cryptographic processing is performed.

Fourth Embodiment

Fourth Embodiment of the present invention is a cryptographic processing apparatus in that, when the change of the Third Embodiment is applied to Second Embodiment, the operation of the first to fourth encryption units to encrypt data which is to be merged and the operation of a block storage unit to store a chain block are carried out in inverse order, so that a merged block or a block which is not yet merged is stored as the new chain block.

Construction

The construction of an encrypted communication system of the Fourth Embodiment is the same as that of the First Embodiment and is thereby not explained here.

Construction of Data Encryption Apparatus 10

Figure 20:
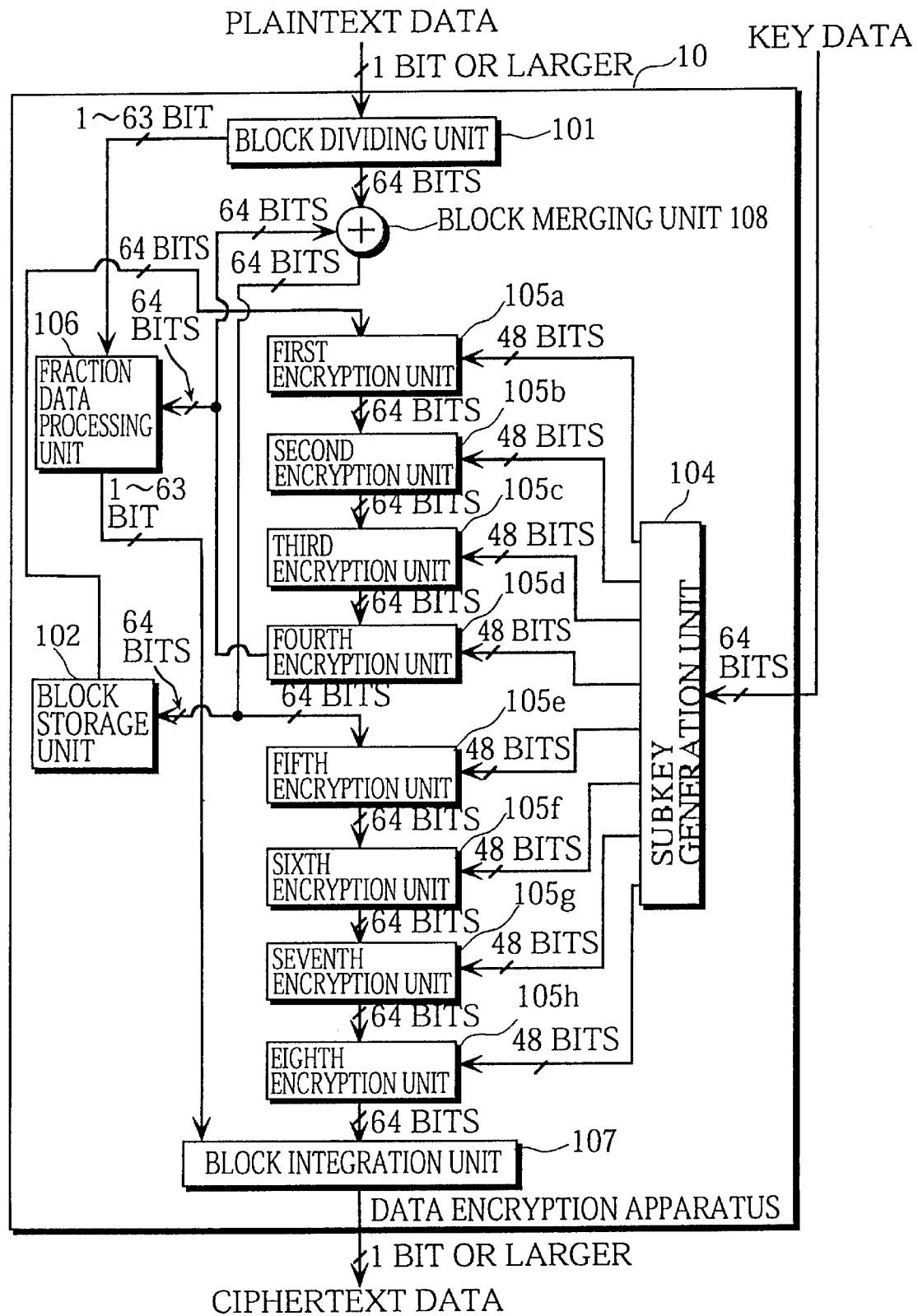
FIG. 20 shows the detailed construction of the data encryption apparatus 10 of Fourth Embodiment of the present invention.

FIG. 20 shows the detailed construction of a data encryption apparatus 10, which is shown in FIG. 2, of Fourth Embodiment of the present invention.

Components which are the same as those in the data encryption apparatus 10 of the Second Embodiment shown in FIG. 12 are given the same numbers. Components whose functions are the same as those in the data encryption apparatus 10 of the Second Embodiment are not explained here.

The data encryption apparatus 10 of the Fourth Embodiment includes a block dividing unit 101, a block storage unit 102, a subkey generation unit 104, first to eighth encryption units 105a–105h, a fraction data processing unit 106, a block integration unit 107, and a block merging unit 108.

Here, the same example is used as in the First Embodiment where plaintext data of 200 bits is inputted in the data encryption apparatus 10.

The first encryption unit 105a generates a first intermediate block not from a merged plaintext block but from a chain block stored in the block storage unit 102.

The first to fourth encryption units 105a–105d have the same function as those of the Second Embodiment. Here, first to third intermediate blocks and a cryptographic-processed block which correspond to each chain block are generated from the chain block.

The block merging unit 108 merge the cryptographic-processed block generated by the fourth encryption unit 105d with a plaintext block to generate a fourth intermediate block. In the present example, for processing a first plaintext block, an exclusive-OR operation is performed, for each corresponding bit, on the 64-bit first plaintext block and a 64-bit first cryptographic-processed block generated from an initial value IV of the chain block. For processing second and third plaintext blocks, an exclusive-OR operation is performed, for each corresponding bit, on the 64-bit second and third plaintext blocks and 64-bit second and third cryptographic-processed blocks generated during the processing of the immediately preceding block, respectively.

Each time the block merging unit 108 generates a fourth intermediate block corresponding to a present plaintext block, the block storage unit 102, which is provided with a block renewal function, renews the chain block by storing the fourth intermediate block as the new chain block, which is used for processing a next plaintext block. In the present example, the block storage unit 102 stores the 64 bit initial value IV in advance, which is used for processing the first plaintext block, and renews the chain block by storing a fourth intermediate block generated when processing the first plaintext block as the new chain block. Next, this new chain block is used for processing the second plaintext block, and a fourth intermediate block generated during the processing is stored in the block storage unit 102 as the new chain block. Next, this new chain block is used for processing the third plaintext block, and a fourth intermediate block generated during the processing is stored in the block storage units 102 as the new chain block. Then, this new chain block is used for processing fraction plaintext data.

The fifth to eighth encryption units 105e–105h have the same functions as those of the Second Embodiment. In the present example, fifth to seventh intermediate blocks are progressively generated for each of the fourth intermediate blocks, with first to third ciphertext blocks being generated from the resulting intermediate blocks.

The fraction data processing unit 106 receives the fraction plaintext data from the block dividing unit 101, and generates fraction ciphertext data whose number of bits is the same as the fraction plaintext data using the cryptographic-processing block generated by the fourth encryption unit 105d. The fraction data processing unit 106 includes a data matching unit 106a and a fraction data merging unit 106b.

The data matching unit 106a generates fraction cryptographic-processed data whose number of bits is the same as the fraction plaintext data from the cryptographic-processed block generated by the fourth encryption unit 105d. In the present example, the fraction plaintext data is 8 bits, so that the data matching unit 106a generates fraction cryptographic-processed data which is composed of, for example, highest 8 bits of the cryptographic-processed block generate by the fourth encryption unit 105d.

The fraction data merging unit 106b merges the fraction cryptographic-processed data with the fraction plaintext data to generate the fraction ciphertext data. In the present example, an exclusive-OR operation is performed on the 8-bit fraction cryptographic-processed data and the 8-bit fraction plaintext data for each corresponding bit to generate 8-bit fraction ciphertext data.

It should be noted here that the fraction data processing unit 106 may have the same function as that of Second Embodiment.

Construction of Data Decryption Apparatus 20

Figure 21:
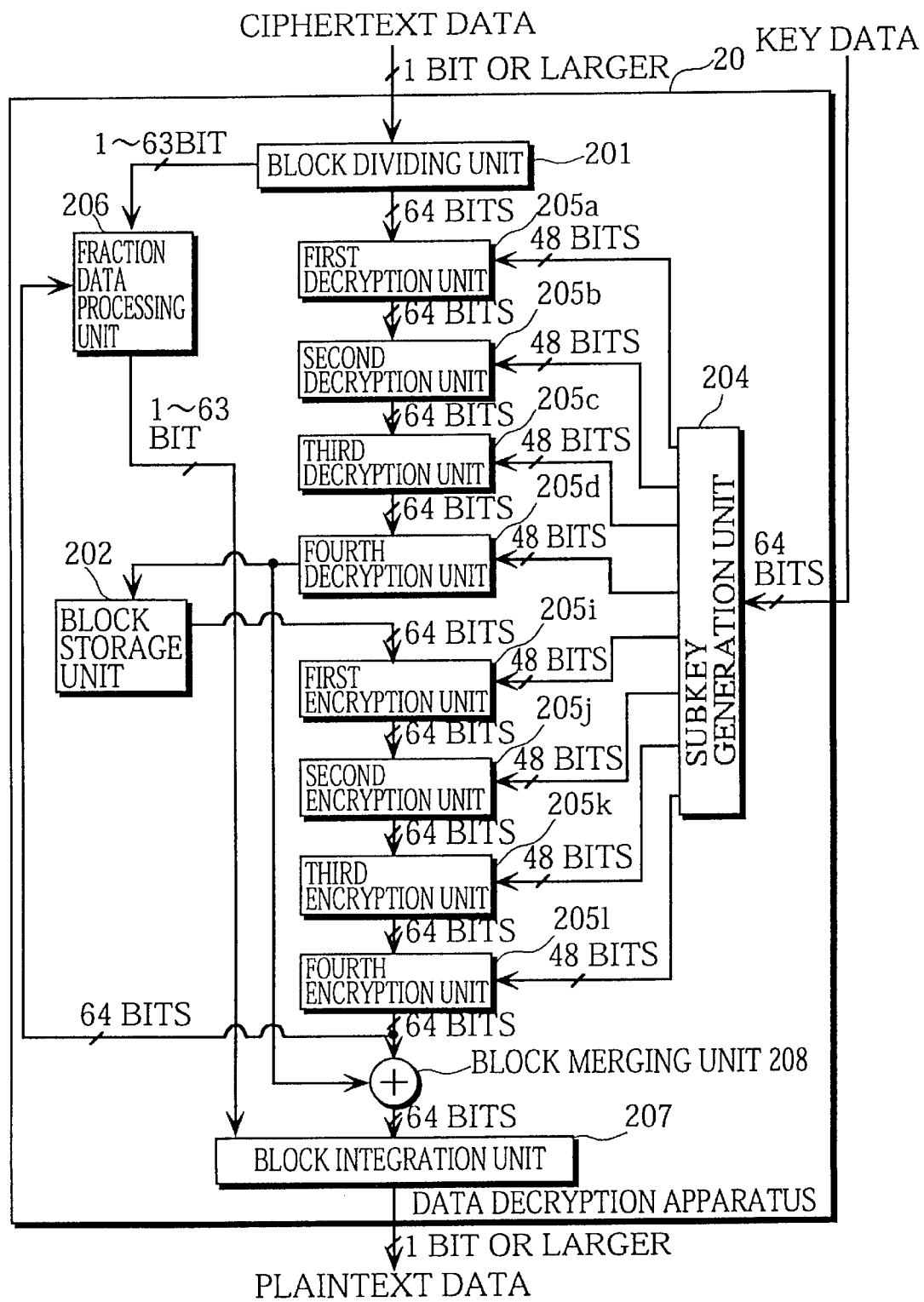
FIG. 21 shows the detailed construction of the data decryption apparatus 20 of Fourth Embodiment of the present invention.

FIG. 21 shows the detailed construction of a data decryption apparatus 20, which is shown in FIG. 2, of Fourth Embodiment of the present invention.

Here, the same example is used as in First Embodiment where ciphertext data of 200 bits is inputted in the data decryption apparatus 20.

Components which are the same as those in the data decryption apparatus 20 of Second Embodiment shown in FIG. 13 are given the same numbers. Components whose functions are the same as those in the data decryption apparatus 20 of Second Embodiment are not explained here.

The data decryption apparatus 20 of Fourth Embodiment includes a block dividing unit 201, a block storage unit 202, a subkey generation unit 204, first to fourth decryption units 205a–205d, first to fourth encryption units 201i–205l, a fraction data processing unit 206, a block integration unit 207, and a block merging unit 208.

The first encryption unit 205i generates a first intermediate block from a chain block stored in the block storage unit 202 using a first subkey.

The second to fourth encryption units 205j–205l generate second and third intermediate blocks and a cryptographic-processed block from the first to third intermediate blocks using the second to fourth subkeys, respectively.

The block merging unit 208 merges the cryptographic-processed block generated by the fourth encryption unit 205l with a fourth intermediate block generated by the fourth decryption unit 205d to generate a plaintext block. In the present example, for processing a first ciphertext block, an exclusive-OR operation is performed, for each corresponding bit, on a 64-bit first cryptographic-processed block generated from an initial value IV of the chain block and a 64-bit fourth intermediate block generated from the first ciphertext block, and as a result a 64-bit first plaintext block is generated. For processing second and third ciphertext blocks, an exclusive-OR operation is performed, for each corresponding bit, on 64-bit second and third cryptographic-processed blocks which have been generated from each chain block generated during the processing of the first and second ciphertext blocks and each 64-bit fourth intermediate block generated from the second and third ciphertext blocks, and as a result 64-bit second and third plaintext blocks are generated, respectively.

The fraction data processing unit 206 receives fraction ciphertext data from the block dividing unit 201, and generates fraction plaintext data whose number of bits is the same as the fraction ciphertext data using the cryptographic-processed block generated by the fourth encryption unit 205l. The fraction data processing unit 206 includes a data matching unit 206a and a fraction data merging unit 206b.

The data matching unit 206a generates fraction cryptographic-processed data whose number of bits is the same as the fraction ciphertext data from the cryptographic-processed block generated by the fourth encryption unit 205l. In the present example, the fraction ciphertext data is 8 bits, so that the data matching unit 206a generates fraction cryptographic-processed data which is composed of, for example, highest 8 bits of the cryptographic-processed block generated by the Fourth encryption unit 205l.

The fraction data merging unit 206b merges the fraction cryptographic-processed data with the fraction ciphertext data to generate the fraction plaintext data. In the present example, an exclusive-OR operation is performed on the 8-bit fraction cryptographic-processed data and the 8-bit fraction ciphertext is data for each corresponding bit to generate 8-bit fraction plaintext data.

It should be noted here that the fraction data processing unit 206 may have the same function as that of Second Embodiment.

Operation

Operation of Data Encryption Apparatus 10

Figure 22:
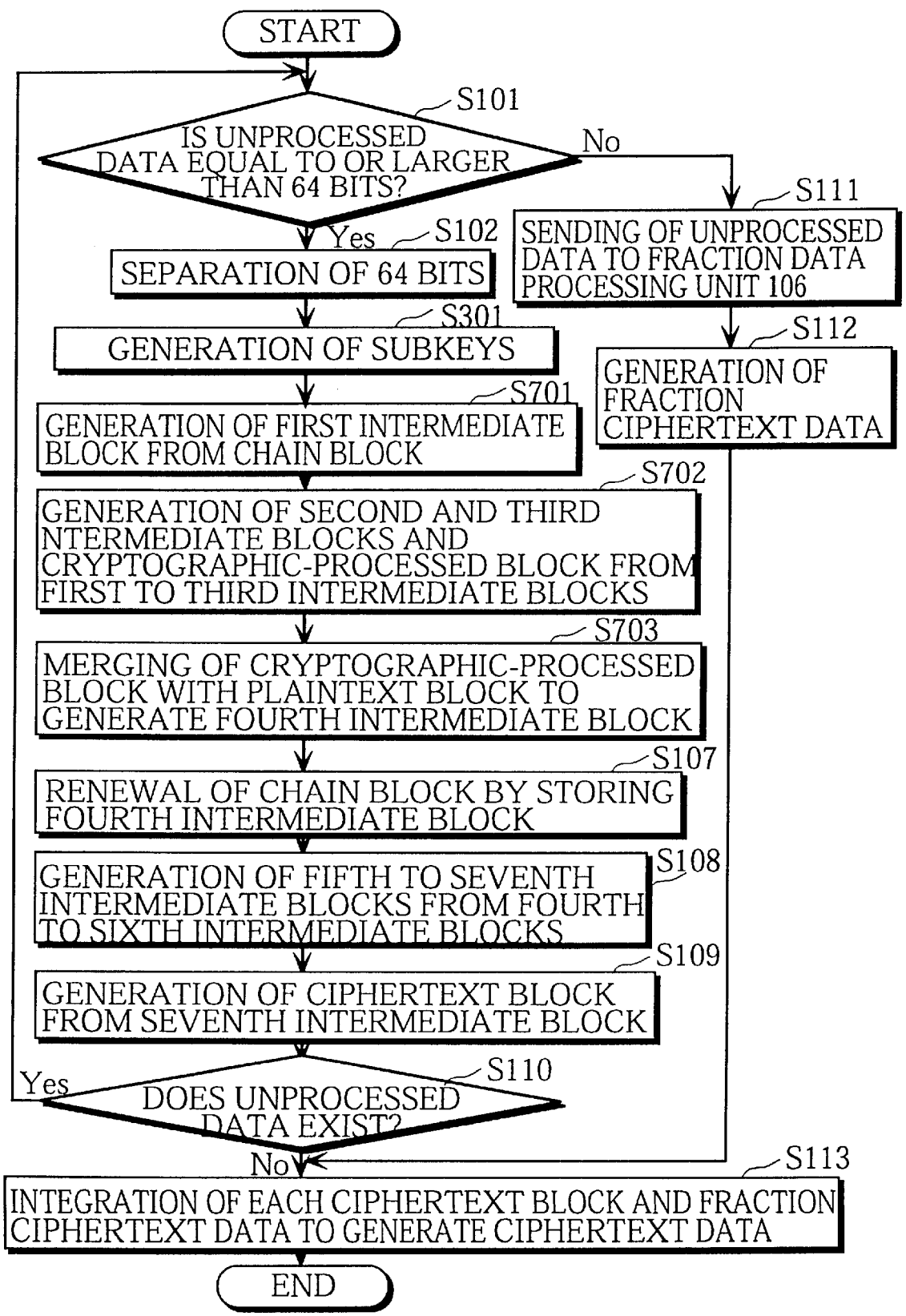
FIG. 22 is a flowchart showing the cryptographic processing of the data encryption apparatus 10 of Fourth Embodiment of the present invention.

FIG. 22 is a flowchart showing the cryptographic processing of the data encryption apparatus 10 of Fourth Embodiment of the present invention.

Here, the same example as in the First Embodiment is used, wherein the cryptographic processing is performed according to the DES algorithm in the data encryption apparatus 10 where 200-bit plaintext data is inputted and the initial value IV of the chain block is stored in the block storage unit 102 in advance.

Steps which are the same as those in the operation of the data encryption apparatus 10 of the Second Embodiment shown in FIG. 14 are given the same numbers, and are not explained here.

(1)–(3) The same as the Second Embodiment (Steps 101, S102, and S301; first time).

(4) The first encryption unit 105a generates first intermediate block from the chain block stored in the block storage unit 102 using the first subkey (Step S701). In the present example, a first intermediate block is generated from the initial value IV of the chain block (Step S701: first time).

(5) The second to fourth encryption units 105b–105d generate second and third intermediate blocks and a cryptographic-processed block from the first to third intermediate blocks using the second to fourth subkeys (Step S702). In the present example, second and third intermediate blocks and a first cryptographic-processed block are generated from the first to third intermediate blocks corresponding to the initial value IV of the chain block, respectively (Step S702: first time).

(6) The block merging unit 108 merges the cryptographic-processed block with a plaintext block to generate a fourth intermediate block (Step S703). In the present example, an exclusive-OR operation is performed on the 64 bit first cryptographic-processed block and the 64-bit first plaintext block for each corresponding bit to generate a 64-bit fourth intermediate block (Step S703: first time).

(7)–(13) The same as the Second Embodiment (Steps S107–S110: first time, Steps S101, S102, and S301: second time).

(14) In Step S701, a first intermediate block is generated from the 64-bit chain block generated during the processing of the first plaintext block in the present example (Step S701: second time).

(15) In Step S702, second and third intermediate blocks and a second cryptographic-processed block are generated from the first to third intermediate blocks corresponding to the chain block generated during the processing of the first plaintext block respectively, in the present example (Step S702: second time).

(16) In Step S703, an exclusive-OR operation is performed on the 64-bit second cryptographic-processed block and the 64-bit second plaintext block for each corresponding bit to generate a 64-bit fourth intermediate block in the present example (Step S703: second time).

(17)–(23) The same as the Second Embodiment (Steps S107–S110: second time, Steps S101, S102, and S301: third time).

(24) In Step S701, a first intermediate block is generated from the 64-bit chain block generated during the processing of the second plaintext block in the present example (Step S701: third time).

(25) In Step S702, second and third intermediate blocks and a third cryptographic-processed block are generated from the first to third intermediate blocks corresponding to the chain block generated during the processing of the second plaintext block respectively, in the present example (Step S702: third time).

(26) In Step S703, an exclusive-OR operation is performed on the 64-bit third cryptographic-processed block and the 64-bit third plaintext block for each corresponding bit to generate a 64-bit fourth intermediate block in the present example (Step S703: third time).

(27)–(34) The same as the Second Embodiment (Steps S107–S110:. third time, Step S101: fourth time, Steps S111–S113).

Operation of Data Decryption Apparatus 20

Figure 23:
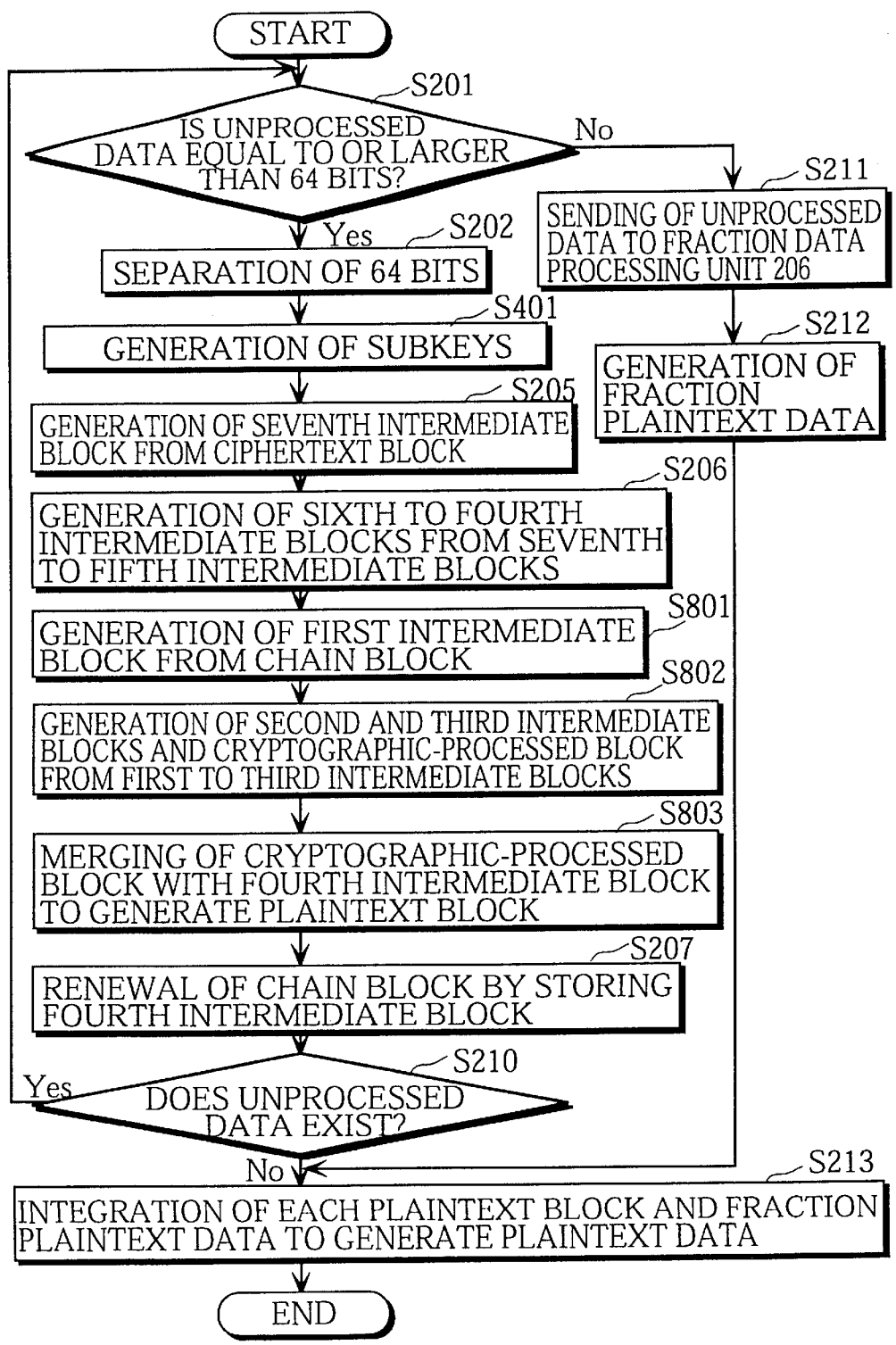
FIG. 23 is a flowchart showing the cryptographic processing of the data decryption apparatus 20 of Fourth Embodiment of the present invention.

FIG. 23 is a flowchart showing the cryptographic processing of the data decryption apparatus 20 of Fourth Embodiment of the present invention.

The operation of the data decryption apparatus 20 is inverse conversion of the operation of the data encryption apparatus 10.

Here, the same example as in the First Embodiment is used, wherein the cryptographic processing is performed according to the DES algorithm in the data decryption apparatus 20 where 200-bit ciphertext data is inputted and the initial value IV of the chain block is stored in the block storage unit 202 in advance.

Steps which are the same as those in the operation of the data decryption apparatus 20 of the Second Embodiment shown in FIG. 15 are given the same numbers, and are not explained here.

(1)–(5) The same as the Second Embodiment (Steps S201, S202, S401, S205, and S206: first time).

(6) The first encryption unit 205i generates a first intermediate block from the chain block stored in the block storage unit 202 using the first subkey (Step S801). In the present example, a first intermediate block is generated from the initial value IV of the chain block (Step S801: first time).

(7) The second to fourth encryption units 205j–205l generate second and third intermediate blocks and a cryptographic-processed block from the first to third intermediate blocks using the second to fourth subkeys, respectively (Step S802). In the present example, second and third intermediate blocks and a first cryptographic-processed block are generated from the first to third intermediate blocks corresponding to the initial value IV of the chain block (Step S802: first time).

(8) The block merging unit 208 merges the cryptographic-processing block with the fourth intermediate block to generate a plaintext block (Step S803). In the present example, an exclusive-OR operation is performed, for each corresponding bit, on the 64-bit first cryptographic-processed block and the 64-bit fourth intermediate block corresponding to the first ciphertext block to generate a 64-bit first plaintext block (Step S803: first time).

(9)–(15) The same as the Second Embodiment (Step S207 and S210: first time, Steps S201, S202, S401, S205, and S206: second time).

(16) In Step S801, a first intermediate block is generated from the 64-bit chain block generated during the processing of the first ciphertext block in the present example (Step S801: second time).

(17) In Step S802, second and third intermediate blocks and a second cryptographic-processed block are generated from the first to third intermediate blocks corresponding to the chain block generated during the processing of the first ciphertext block respectively, in the present example (Step S802: second time).

(18) In Step S803, an exclusive-OR operation is performed on the 64-bit second cryptographic-processed block and the 64-bit fourth intermediate block corresponding to the second ciphertext block for each corresponding bit to generate a 64-bit second plaintext block in the present example (Step 803: second time).

(19)–(25) The same as the Second Embodiment (Steps S207 and S210: second time, Steps S201, S202, S401, S205, and S206: third time).

(26) In Step S801, a first intermediate block is generated from the 64-bit chain block generated during the processing of the second ciphertext block in the present example (Step S801: third time).

(27) In Step S802, second and third intermediate blocks and a third cryptographic-processed block are generated from the first to third intermediate blocks corresponding to the chain block generated during the processing of the second ciphertext block respectively, in the present example (Step S802: third time).

(28) In Step S803, an exclusive-OR operation is performed on the 64-bit third cryptographic-processed block and the 64-bit fourth intermediate block corresponding to the third ciphertext block for each corresponding bit to generate a 64-bit third plaintext block, in the present example (Step S803: third time).

(29)–(34) The same as the Second Embodiment (Steps S207 and S210: third time, Step S201: fourth time, Steps S211–S213).

In the cryptographic processing apparatus of Fourth Embodiment, an intermediate block generated when the cryptographic processing is performed on a present block is stored as a chain block. When the cryptographic processing is performed on a next block, the chain block on which the cryptographic processing is performed is merged with a plaintext block or a cryptographic-processed block. Thus, the chain block is renewed each time the cryptographic processing is performed.

Fifth Embodiment

Fifth Embodiment of the present invention is different from the Fourth Embodiment only in that a block which is obtained by performing cryptographic processing on a chain block is stored as the new chain block, while in Fourth Embodiment a merged block or a block which is not yet merged is stored as the new chain block.

Construction

The construction of an encrypted communication system of the Fifth Embodiment is the same as that of First Embodiment, and is thereby not explained here.

Construction of Data Encryption Apparatus 10

Figure 24:
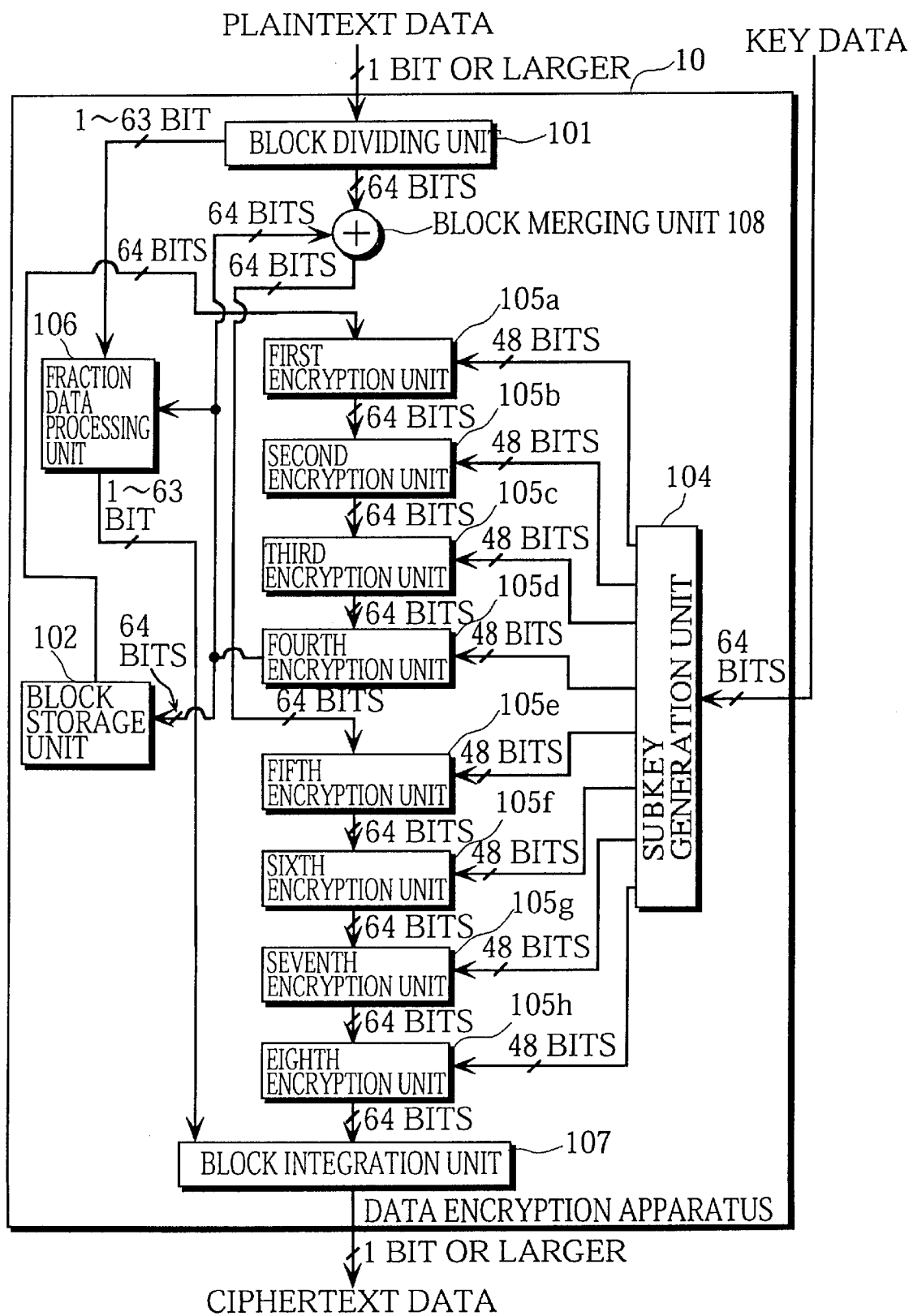
FIG. 24 shows the detailed construction of the data encryption apparatus 10 of Fifth Embodiment of the present invention.

FIG. 24 shows the detailed construction of a data encryption apparatus 10, which is shown in FIG. 2, of Fifth Embodiment of the present invention.

Components which are the same as those in the data encryption apparatus 10 of the Second Embodiment shown in FIG. 12 are given the same numbers. Components whose functions are the same as those in the data encryption apparatus 10 of the Second Embodiment are not explained here.

The data encryption apparatus 10 of the Fifth Embodiment includes a block dividing unit 101, a block storage unit 102, a subkey generation unit 104, first to eighth encryption units 105a–105h, a fraction data processing unit 106, a block integration unit 107, and a block merging unit 108.

Here the same example is used as in the First Embodiment where plaintext data of 200 bits is inputted in the data encryption apparatus 10.

The first encryption unit 105a generates a first intermediate block not from a merged plaintext block but from a chain block stored in the block storage unit 102.

The first to fourth encryption units 105a–105d have the same functions as those of the Second Embodiment. Here, first to fourth intermediate blocks which correspond to each chain block are generated from the chain block.

The block merging unit 108 merges the fourth intermediate block generated by the fourth encryption unit 105d with a plaintext block to generate a merged plaintext block. In the present example, for processing a first plaintext block, an exclusive-OR operation is performed, for each corresponding bit, on the 64-bit first plaintext block and a 64-bit fourth intermediate block generated from an initial value IV of the chain block. For processing second and third plaintext blocks, an exclusive-OR operation is performed, for each corresponding bit, on each of the 64-bit second and third plaintext blocks and a 64-bit fourth intermediate block generated during the processing of the immediately preceding plaintext block, respectively.

The fifth encryption unit 105e generates a fifth intermediate block not from the fourth intermediate block but from the merged plaintext block generated by the block merging unit 108.

The fifth to eighth encryption units 105e–105h have the same functions as those of the Second Embodiment. In the present example, fifth to seventh intermediate blocks are progressively generated for each of the merged plaintext blocks, with first to third ciphertext blocks being generated from the resulting intermediate blocks.

The fraction data processing unit 106 has the same function as that of the Fourth Embodiment.

It should be noted here that the fraction data processing unit 106 may have the same function as that of the Second Embodiment.

Construction of Data Decryption Apparatus 20

Figure 25:
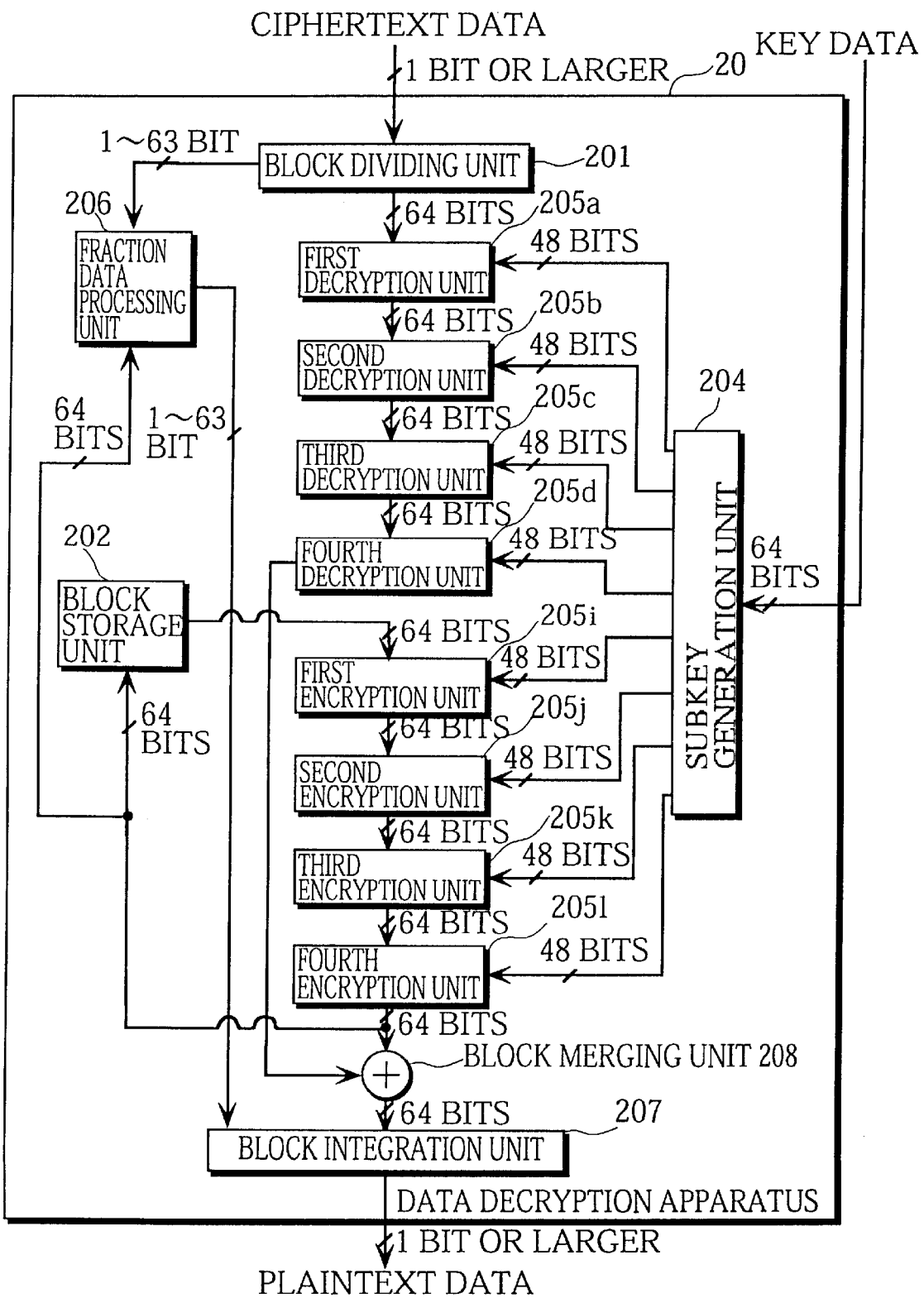
FIG. 25 shows the detailed construction of the data decryption apparatus 20 of Fifth Embodiment of the present invention.

FIG. 25 shows the detailed construction of a data decryption apparatus 20, which is shown in FIG. 2, of Fifth Embodiment of the present invention.

Components which are the same as those in the data decryption apparatus 20 of the Second Embodiment shown in FIG. 13 are given the same numbers. Components whose functions are the same as those in the data decryption apparatus 20 of the Second Embodiment are not explained here.

The data decryption apparatus 20 of the Fifth Embodiment includes a block dividing unit 201, a block storage unit 202, a subkey generation unit 204, first to fourth decryption units 205a–205d, first to fourth encryption units 205i–205l, a fraction data processing unit 206, a block integration unit 207, and a block merging unit 208.

Here, the same example is used as in the First Embodiment where ciphertext data of 200 bits is inputted in the data decryption apparatus 20.

The fourth decryption unit 205d generates a cryptographic-processed block from a fifth intermediate block using a fifth subkey. In the present example, first to third cryptographic-processed blocks are generated from each of the fifth intermediate blocks corresponding to the first to third ciphertext blocks, respectively. Here, the conversions performed by the first to fourth decryption units 205a–205d are inverse conversions of the conversions performed by the respective fourth to first encryption unit 105d–105a of the data encryption apparatus 10.

The first encryption unit 205i generates a first intermediate block from a chain block stored in the block storage unit 202 using a first subkey.

The second to fourth encryption units 205j–205l generate second to fourth intermediate blocks from the first to third intermediate blocks using second to fourth subkeys, respectively.

Each time the fourth encryption unit 205l generates a fourth intermediate block, the block storage unit 202, which is provided with a block renewal function, renews the chain block by storing the fourth intermediate block as the new chain block, which is used for processing a next ciphertext block. This operation is the same as the First Embodiment.

The first to fourth encryption units 205i–205l have the same functions and operations as the respective first to fourth encryption units 105a–105d of the data encryption apparatus 10. In the present example, first to fourth intermediate blocks corresponding to each chain block are generated from the chain block.

The block merging unit 208 merges the fourth intermediate block generated by the fourth encryption unit 205l with the cryptographic-processed block generated by the fourth decryption unit 205d to generate a plaintext block. In the present example, for processing the first ciphertext block, an exclusive-OR operation is performed, for each corresponding bit, on the 64-bit fourth intermediate block generated from the initial value IV of the chain block and the 64-bit first cryptographic-processed block generated from the first ciphertext block, so as to generate a 64-bit first plaintext block. For processing the second and third ciphertext blocks, an exclusive-OR operation is performed, for each corresponding bit, on each 64-bit fourth intermediate block which has been generated from the chain blocks generated during the processing of the first and second ciphertext blocks and each of the 64-bit second and third cryptographic-processed blocks generated from the second and third ciphertext blocks, so as to generate 64-bit second and third plaintext blocks, respectively.

The fraction data processing unit 206 has the same function as that of the Fourth Embodiment.

It should be noted here that the fraction data processing unit 206 may have the same function as that of Second Embodiment.

Operation

Operation of Data Encryption Apparatus 10

Figure 26:
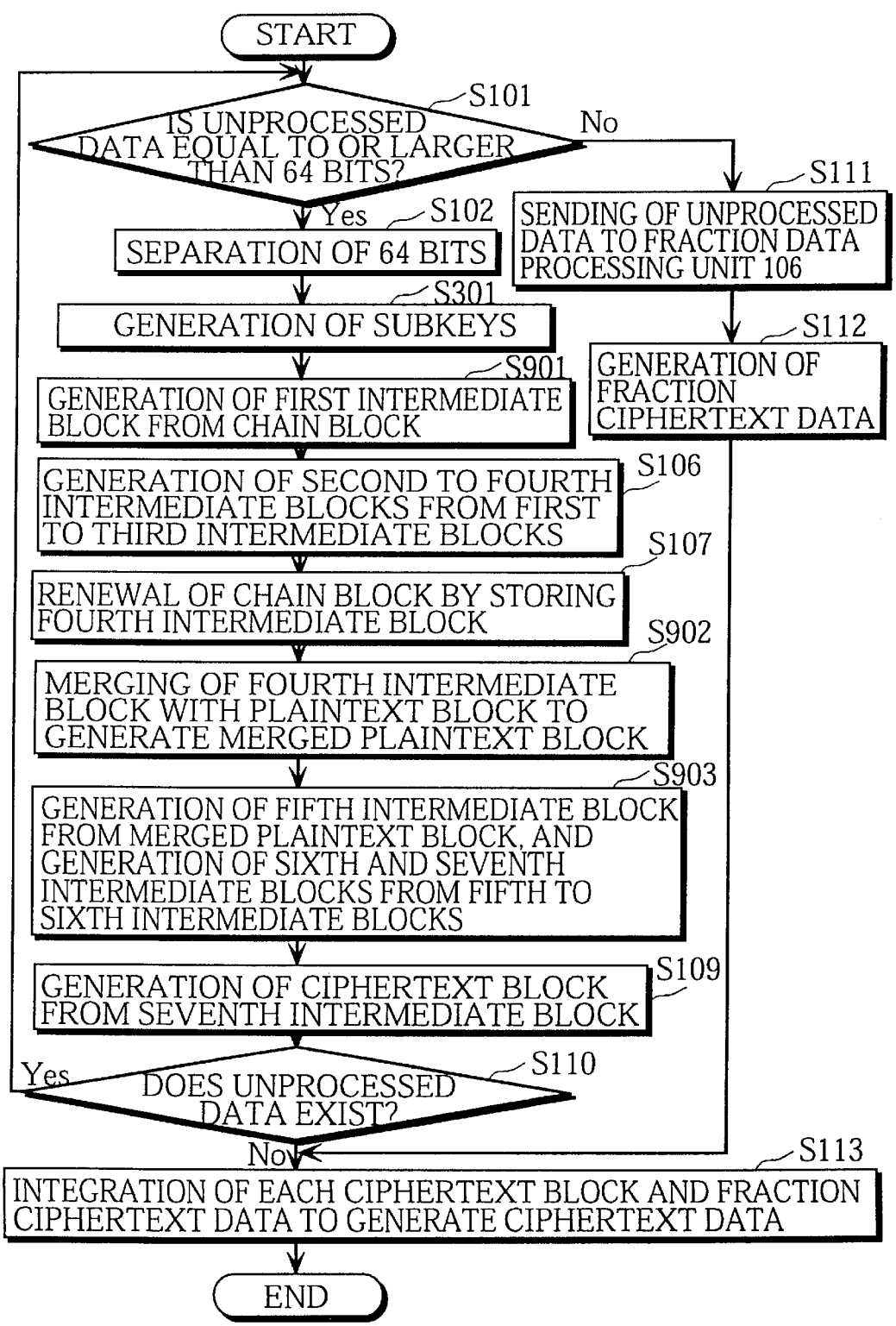
FIG. 26 is a flowchart showing the cryptographic processing of the data encryption apparatus 10 of Fifth Embodiment of the present invention.

FIG. 26 is a flowchart showing the cryptographic processing of the data encryption apparatus 10 of Fifth Embodiment of the present invention.

Here, the same example as in the First Embodiment is used, wherein the cryptographic processing is performed according to the DES algorithm in the data encryption apparatus 10 where 200-bit plaintext data is inputted and the initial value IV of the chain block is stored in the block storage unit 102 in advance.

Steps which are the same as those in the operation of the data encryption apparatus 10 of the Second Embodiment shown in FIG. 14 are given the same numbers, and are not explained here.

(1)–(3) The same as the Second Embodiment (Step S101, S102, and S301: first time).

(4) The first encryption unit 105a generates a first intermediate block from the chain block stored in the block storage unit 102 using the first subkey (Step S901). In the present example, a first intermediate block is generated from the initial value IV of the chain block (Step S901: first time).

(5)–(6) The same as (6)–(7) of the Second Embodiment (Steps S106 and S107: first time).

(7) The block merging unit 108 merges the fourth intermediate block with a plaintext block to generate a merged plaintext block (Step S902). In the present example, an exclusive-OR operation is performed, for each corresponding bit, on the 64-bit fourth intermediate block corresponding to the initial value IV of the chain block and the 64-bit first plaintext block to generate a 64-bit first merged plaintext block (Step S902: first time).

(8) The fifth encryption unit 105e generates a fifth intermediate block from the merged plaintext block using the fifth subkey, and then the sixth and seventh encryption units 105f–105g generate sixth and seventh intermediate blocks from the fifth and sixth intermediate blocks using the sixth and seventh subkeys, respectively (Step S903). In the present example, a fifth intermediate block is generated from the first merged plaintext block, and then sixth and seventh intermediate blocks are generated from the fifth and sixth intermediate blocks, respectively (Step S903: first time).

(9)–(13) The same as the Second Embodiment (Steps S109 and S110: first time, Steps S101, S102, and S301: second time).

(14) In Step S901, a first intermediate block is generated from the 64-bit chain block generated during the processing of the first plaintext block in the present example (Step S901: second time).

(15)–(16) The same as (16)–(17) of the Second Embodiment (Steps S106 and S107: second time).

(17) In Step S902, an exclusive-OR operation is performed, for each corresponding bit, on the 64-bit fourth intermediate block corresponding to the chain block generated during the processing of the first plaintext block and the 64-bit second plaintext block to generate a 64-bit second merged plaintext block in the present example (Step S902: second time).

(18) In Step S903, a fifth intermediate block is generated from the second merged plaintext block, and then sixth and seventh intermediate blocks are generated from the fifth and sixth intermediate blocks respectively, in the present example (Step S903: second time).

(19)–(23) The same as the Second Embodiment (Steps S109 and S110; second time, Steps S101, S102, and S301: third time).

(24) In Step S901, a first intermediate block is generated from the 64-bit chain block generated during the processing of the second plaintext block in the present example (Step S901: third time).

(25)–(26) The same as (26)–(27) of the Second Embodiment (Steps S106 and S107: third time).

(27) In Step S902, an exclusive-OR operation is performed, for each corresponding bit, on the 64-bit fourth intermediate block corresponding to the chain block generated during the processing of the second plaintext block and the 64-bit third plaintext block to generate a 64-bit third merged plaintext block in the present example (Step S902: third time).

(28) In Step S903, a fifth intermediate block is generated from the third merged plaintext block, and then sixth and seventh intermediate blocks are generated from the fifth and sixth intermediate blocks respectively, in the present example (Step S903: third time).

(29)–(34) The same as the Second Embodiment (Steps S109 and S110: third time, Step S101: fourth time, Steps S111–S113).

Operation of Data Decryption Apparatus 20

Figure 27:
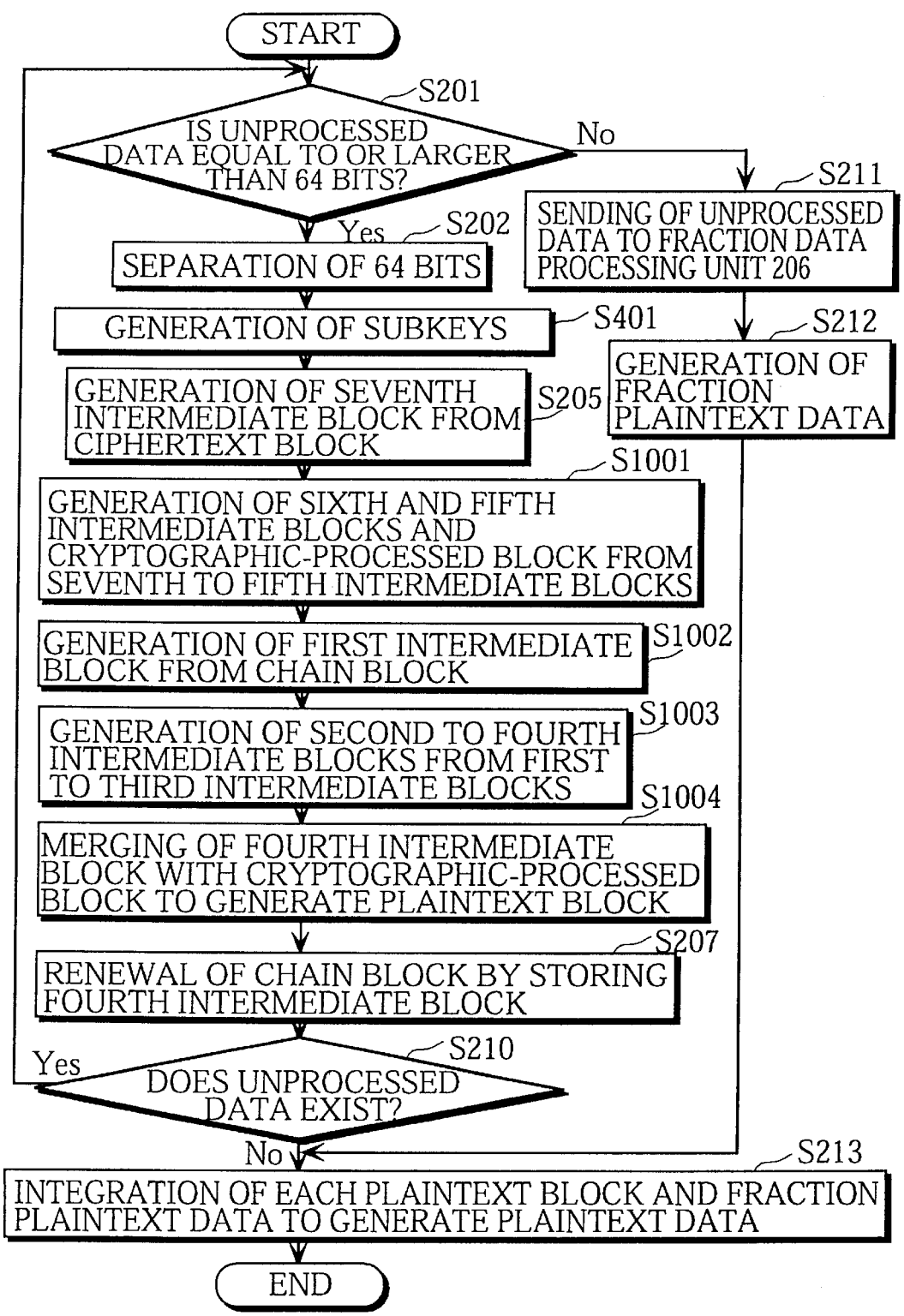
FIG. 27 is a flowchart showing the cryptographic processing of the data decryption apparatus 20 of Fifth Embodiment of the present invention.

FIG. 27 is a flowchart showing the cryptographic processing of the data decryption apparatus 20 of Fifth Embodiment of the present invention.

The operation of the data decryption apparatus 20 is inverse conversion of the operation of the data encryption apparatus 10.

Here, the same example, as in the First Embodiment is used, wherein the cryptographic processing is performed according to the DES algorithm in the data decryption apparatus 20 where 200-bit ciphertext data is inputted and the initial value IV of the chain block is stored in the block storage unit 202 in advance.

Steps which are the same as those in the operation of the data decryption apparatus 20 of the Second Embodiment shown in FIG. 15 are given the same numbers, and are not explained here.

(1)–(4) The same as the Second Embodiment (Steps S201, S202, S401, and S205: first time).

(5) The second to fourth decryption units 205b–205d generate sixth and fifth intermediate blocks and a cryptographic-processed block from the seventh to fifth intermediate blocks using the seventh to fifth subkeys, respectively (Step S1001). In the present example, sixth and fifth intermediate blocks and a first cryptographic-processed block are generated from the seventh to fifth intermediate blocks corresponding to the first ciphertext block, respectively (Step S1001: first time).

(6) The first encryption unit 205i generates a first intermediate block from the chain block stored in the block storage unit 202 using the first subkey (Step S1002). In the present example, a first intermediate block is generated from the initial value IV of the chain block (Step S1002: first time).

(7) The second to fourth encryption units 205j–205l generate second to fourth intermediate blocks from the first to third intermediate blocks using the second to fourth subkeys, respectively (Step S1003). In the present example, second to fourth intermediate blocks are generated from the first to third intermediate blocks corresponding to the initial value IV of the chain block (Step S1003: first time).

(8) The block merging unit 208 merges the cryptographic-processing block with the fourth intermediate block to generate a plaintext block (Step S1004). In the present example, an exclusive-OR operation is performed, for each corresponding bit, on the 64-bit first cryptographic-processed block and the 64-bit fourth intermediate block corresponding to the initial value IV of the chain block, so as to generate a 64-bit first plaintext block (Step S1004: first time).

(9)–(14) The same as the Second Embodiment (Steps S207 and S210: first time, Steps S201, S202, S401, and S205: second time).

(15) In Step S1001, sixth and fifth intermediate blocks and a second cryptographic-processed block are generated from the seventh to fifth intermediate blocks corresponding to the second ciphertext block respectively, in the present example (Step S1001: second time).

(16) It Step S1002, a first intermediate block is generated from the 64-bit chain block generated during the processing of the first ciphertext block in the present example (Step S1002: second time).

(17) In Step S1003, second to fourth intermediate blocks are generated from the first to third intermediate blocks corresponding to the chain block generated during the processing of the first ciphertext block respectively, in the present example (Step S1003: second time).

(18) In Step S1004, an exclusive-OR operation is performed, for each corresponding bit, on the 64-bit second cryptographic-processed block and the 64-bit fourth intermediate block corresponding to the chain block generated during the processing of the first ciphertext block, so as to generate a 64-bit second plaintext block in the present example (Step S1004: second time).

(19)–(24) The same as the Second Embodiment (Steps S207 and S210: second time, Steps S201, S202, S401, and S205: third time).

(25) In Step S1001, sixth and fifth intermediate blocks and a third cryptographic-processed block are generated from the seventh to fifth intermediate blocks corresponding to the third ciphertext block respectively, in the present example (Step S1001: third time).

(26) In Step S1002, a first intermediate block is generated from the 64-bit chain block generated during the processing of the second ciphertext block in the present example (Step S1002: third time).

(27) In Step S1003, second to fourth intermediate blocks are generated from the first to third intermediate blocks corresponding to the chain block generated during the processing of the second ciphertext block respectively, in the present example (Step S1003: third time).

(28) In Step S1004, an exclusive-OR operation is performed, for each corresponding bit, on the 64-bit third cryptographic-processed block and the 64-bit fourth intermediate block corresponding to the chain block generated during the processing of the second ciphertext block, so as to generate a 64-bit third plaintext block respectively, in the present example (Step S1004: third time).

(29)–(34) The same as Second Embodiment (Steps S207 and S210: third time, Step S201: fourth time, Steps S211–S213).

In the cryptographic processing apparatus of Fifth Embodiment, an intermediate block generated when the cryptographic processing is performed on a present block is stored as a chain block when the cryptographic processing is performed on a next block, the chain block, on which the cryptographic processing has been performed, is then merged with a plaintext block or a cryptographic-processed block. Thus, the chain block is renewed each time the cryptographic processing is performed.

Sixth Embodiment

A Sixth Embodiment of the present invention is a cryptographic processing apparatus where output data is generated from cryptographic-processing object data by performing cryptographic processing specified by key data on the cryptographic-processing object data. In this cryptographic processing apparatus, each time the cryptographic processing is performed on a present block, a block such as an output block, a block which is to be subjected to the cryptographic processing, or an intermediate block, is stored as a chain block, which is then converted and merged with the key data when the cryptographic processing is performed on a next block.

Construction

The construction of an encrypted communication system of the Sixth Embodiment is the same as that of the First Embodiment, and is thereby not explained here.

Construction of Data Encryption Apparatus 10

Figure 28:
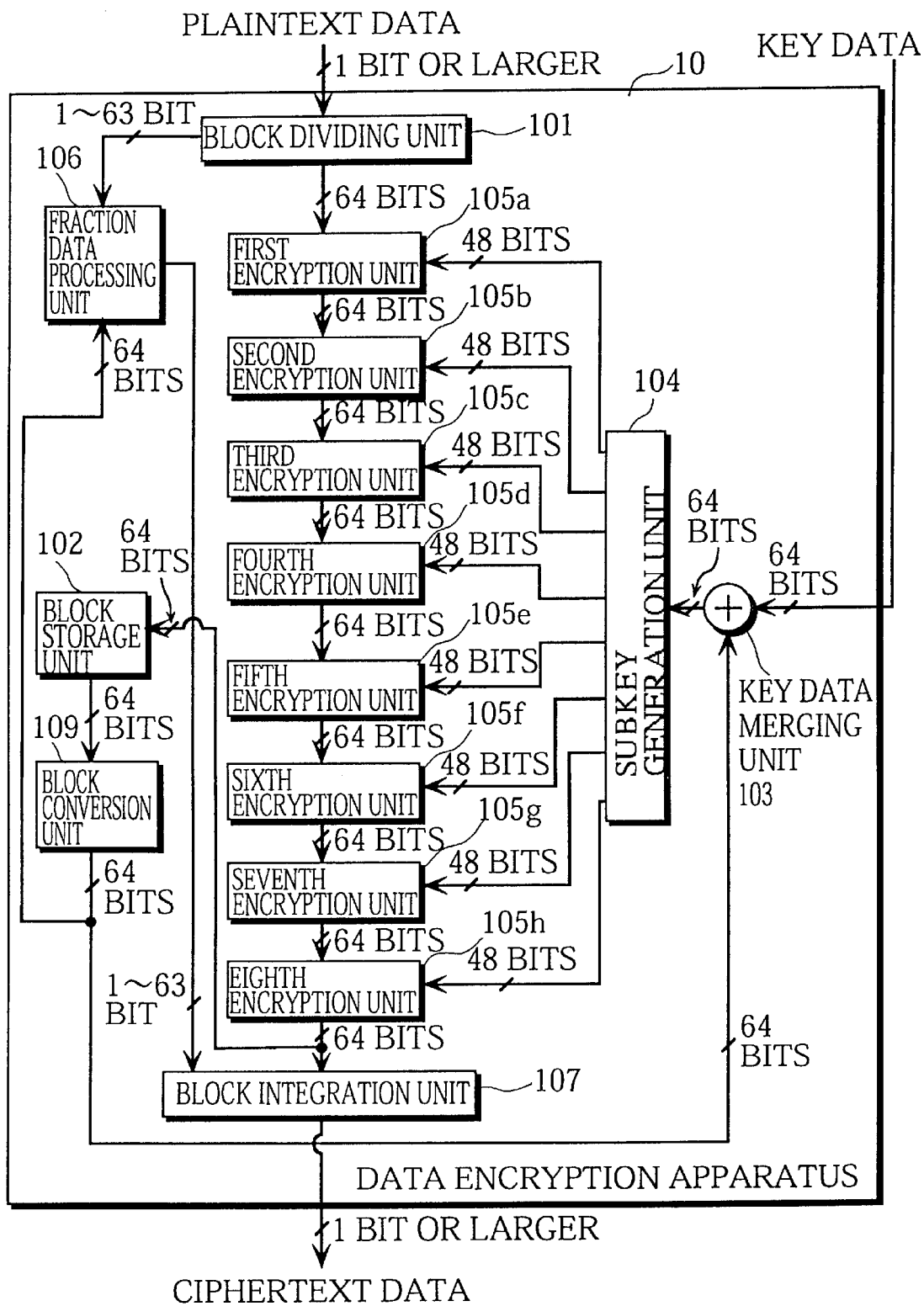
FIG. 28 shows the detailed construction of the data encryption apparatus 10 of Sixth Embodiment of the present invention.

FIG. 28 shows the detailed construction of a data encryption apparatus 10, which is shown in FIG. 2, of Sixth Embodiment of the present invention.

Components which are the same as those in the data encryption apparatus 10 of the First Embodiment shown in FIG. 3 are given the same numbers. Components whose functions are the same as those in the data encryption apparatus 10 of the First Embodiment are not explained here.

The data encryption apparatus 10 of the Sixth Embodiment includes a block dividing unit 101, a block storage unit 102, a key data merging unit 103, a subkey generation unit 104, first to eighth encryption units 105a–105h, a fraction data processing unit 106, a block integration unit 107, and a block conversion unit 109.

Here, the same example is used as in the First Embodiment where plaintext data of 200 bits is inputted in the data encryption apparatus 10.

Each time the eighth encryption unit 105h generates a ciphertext block corresponding to a present plaintext block, the block storage unit 102, which is provided with a block renewal function, renews a chain block by storing the ciphertext block as the new chain block, which is used for processing a next plaintext block. In the present example, the block storage unit 102 closes a 64-bit initial value IV in advance, which is used for processing a first plaintext block, and renews the chain block by storing a first ciphertext block generated during the processing of the first plaintext block as the new chain block. Next, this new chain block is used for processing a second plaintext block, and a second ciphertext block generated during the processing is stored in the block storage unit 102 as the new chain block. Next, this new chain block is used for processing a third plaintext block, and a third ciphertext block generated during the processing is stored in the block storage unit 102 as the new chain block. Then, this new chain block is used for processing fraction plaintext data.

The block conversion unit 109 performs predetermined conversion on the chain block stored in the block storage unit 102 to generate a converted block. Here, the predetermined conversion performed by the block conversion unit 109 is, for instance, bit transposition, bit conversion, or the like. Here, the bit transposition is transposition in a bit unit, such as the permutation P explained in the description of the first to eighth encryption unit: 105a–105h of First Embodiment, while the bit conversion is fixed calculation in a bit unit, such as an exclusive-OR operation on specific data. In the present example, for processing the first plaintext block, a 64-bit first converted block is generated from the initial value IV of the 64-bit chain block. For processing the second and third plaintext blocks, 64-bit second and third converted blocks are generated from the 64-bit chain blocks generated during the processing of the first and second plaintext blocks, respectively.

The key data merging unit 103 merges the converted block generated by the block conversion unit 109 with key data to generate merged key data. In the present example, for processing the first plaintext block, an exclusive-OR operation is performed, for each corresponding bit, on the 64-bit first converted block and 64-bit input key data which has been determined in advance. For processing the second and third plaintext blocks, an exclusive-OR operation is performed on each of the 64-bit second and third converted blocks and the 64-bit key data for each corresponding bit, respectively.

The fraction data processing unit 106 receives the fraction plaintext data from the block dividing unit 101, and generates fraction ciphertext data whose number of bits is the same as the fraction plaintext data using the converted block generated by the block conversion unit 109. The fraction data processing unit 106 includes a data matching unit 106a and a fraction data merging unit 106b.

The data matching unit 106a generates fraction converted data whose number of bits is the same as the fraction plaintext data from the converted block generated by the block conversion unit 109. In the present example, the fraction plaintext data is 8 bits, so that the data matching unit 106a generates fraction converted data which is composed of, for example, highest 8 bits of the converted block generated by the block conversion unit 109.

The fraction data merging unit 106b merges the fraction converted data with the fraction plaintext data. In the present example, an exclusive-OR operation is performed on the 8-bit fraction converted data and the 8-bit fraction plaintext data for each corresponding bit to generate 8-bit fraction ciphertext data.

It should be noted that the fraction data processing unit 106 may have the same function as that of the First Embodiment.

Construction of Data Decryption Apparatus 20

Figure 29:
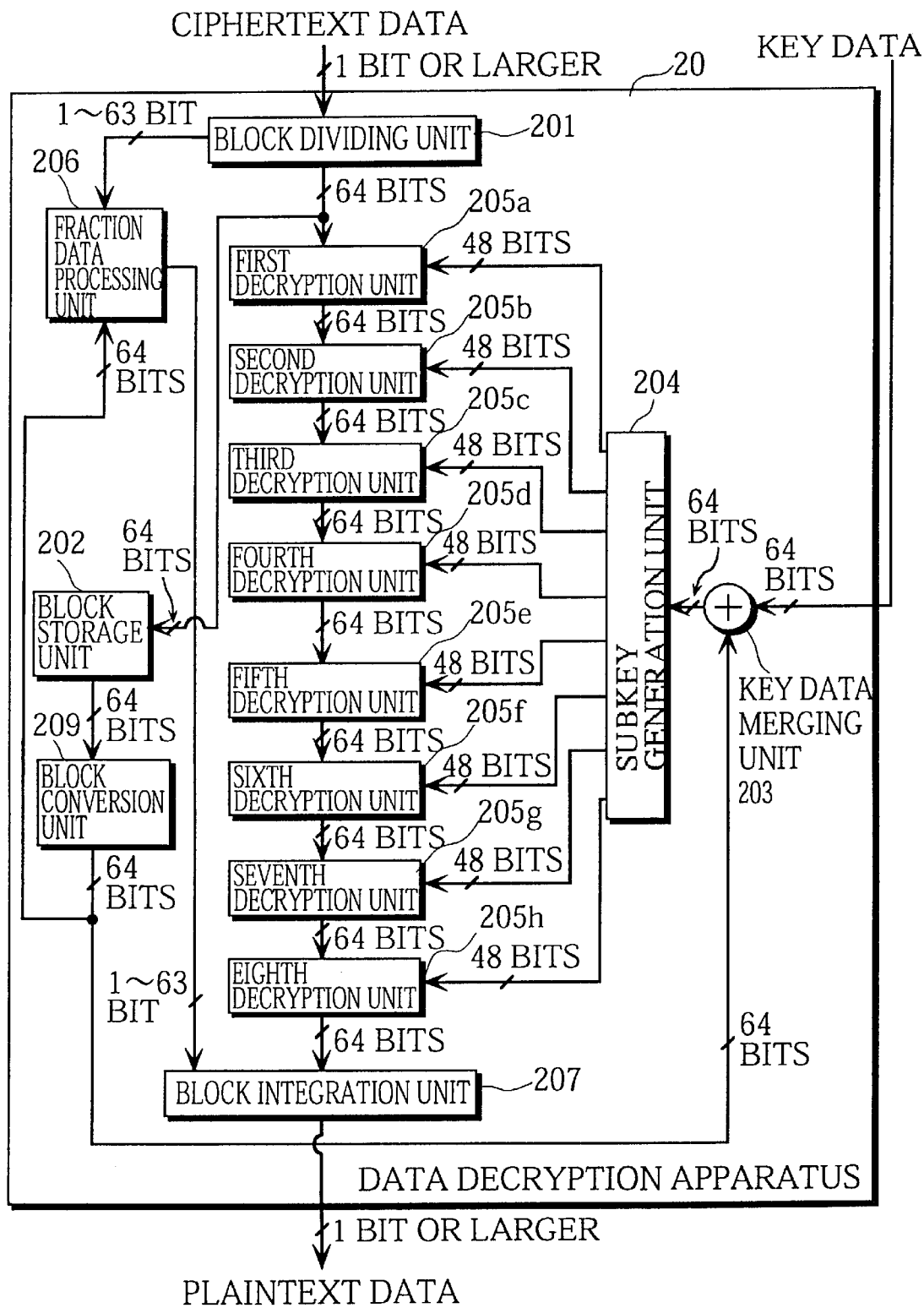
FIG. 29 shows the detailed construction of the data decryption apparatus 20 of Sixth Embodiment of the present invention.

FIG. 29 shows the detailed construction of a data decryption apparatus 20, which is shown in FIG. 2, of Sixth Embodiment of the present invention.

Components which are the same as those in the data decryption apparatus 20 of First Embodiment shown in FIG. 8 are given the same numbers. Components whose functions are the same as those in the data decryption apparatus 20 of the First Embodiment are not explained here.

The data decryption apparatus 20 of the Sixth Embodiment includes a block dividing unit 201, a block storage unit 202, a key data merging unit 203, a subkey generation unit 204, first to eighth decryption units 205a–205h, a fraction data processing unit 206. a block integration unit 207, and a block conversion unit 209.

Here, the same example is used as in the First Embodiment where ciphertext data of 200 bits is inputted in the data decryption apparatus 20.

The block storage unit 202 is provided with a block renewal function, Each time the block dividing unit 201 generates a present ciphertext block, the block storage unit 202 renews a chain block by storing the ciphertext block as the new chain block, which is used for processing a next ciphertext block. In the present example, a 64-bit initial value IV which has been stored in advance is used for processing a first ciphertext block, and the first ciphertext block is stored as the new chain block. Next, this new chain block is used for processing a second ciphertext block, and the second ciphertext block is stored as the new chain block. Next, this new chain block is used for processing a third ciphertext block, and the third ciphertext block is stored as the new chain block. Then, this new chain block is used for processing fraction ciphertext data.

The block conversion unit 209 performs predetermined conversion on the chain block stored in the block storage unit 202 to generate a converted block. Here, the predetermined conversion performed by the block conversion unit 209 is the same as the predetermined conversion performed by the block conversion unit 109 of the data encryption apparatus 10, which is, for instance, bit transposition, bit conversion, or the like. Here, the bit transposition is transposition in a bit unit, such as the permutation P which has been explained in the description of the first to eighth encryption units 105a–105h of First Embodiment, while the bit conversion is fixed calculation in a bit unit, such as an exclusive-OR operation on specific data. In the present example, for processing the first ciphertext block, a 64-bit first converted block is generated from the initial value IV of the 64-bit chain block. For processing the second and third ciphertext blocks, 64-bit second and third converted blocks are generated from the 64-bit chain blocks generated during the processing of the first and second ciphertext blocks, respectively.

The key data merging unit 203 merges the converted block generated by the block conversion unit 209 with key data to generate merged key data. In the present example, for processing the first ciphertext block, an exclusive-OR operation is performed, for each corresponding bit, on the 64-bit first converted block and 64 bit input key data which has been determined in advance. For processing the second and third ciphertext blocks, an exclusive-OR operation is performed on each of the 64-bit second and third converted blocks did the 64-bit key data for each corresponding bit, respectively.

The fraction data processing unit 206 receives the fraction ciphertext data from the block dividing unit 201, and generates fraction plaintext data whose number of bits is the same as the fraction ciphertext data using the converted block generated by the block conversion unit 209. The fraction data processing unit 206 includes a data matching unit 206a and a fraction data merging unit 206b.

The data matching unit 206a generates fraction converted data whose number of bits is the same as the fraction ciphertext data from the converted block generated by the block conversion unit 209. In the present example, the fraction ciphertext data is 8 bits, so that the data matching unit 206a generates fraction converted data which is composed of, for example, highest 8 bits of the converted block generated by the block conversion unit 209.

The fraction data merging unit 206b merges the fraction converted data with the fraction ciphertext data. In the present example, an exclusive-OR operation is performed on the 8-bit fraction converted data and the 8-bit fraction ciphertext data for each corresponding bit to generate 8-bit fraction plaintext data.

It should be noted that the fraction data processing unit 206 may have the same function as that of the First Embodiment.

Operation

Operation of Data Encryption Apparatus 10

Figure 30:
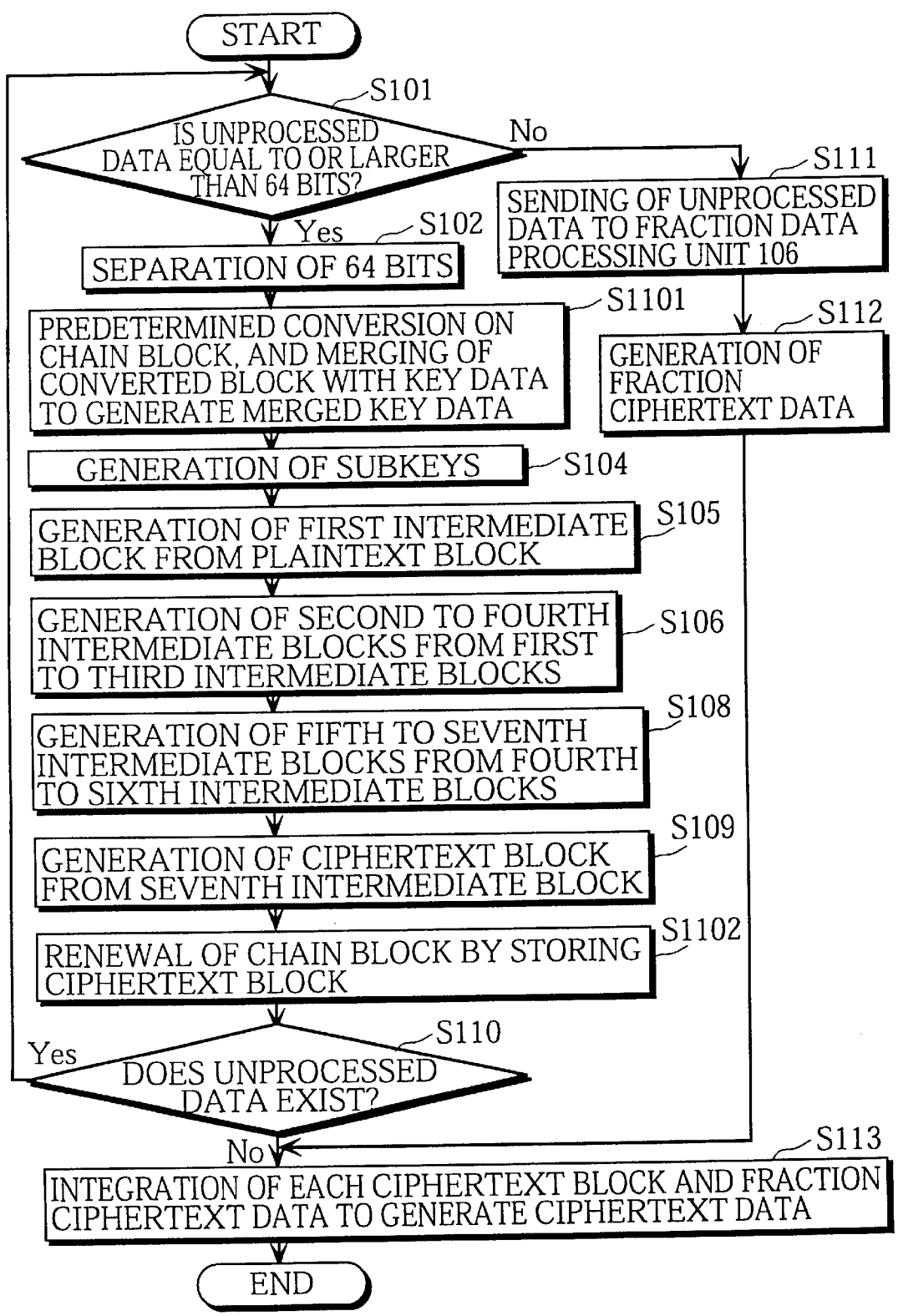
FIG. 30 is a flowchart showing the cryptographic processing of the data encryption apparatus 10 of Sixth Embodiment of the present invention.

FIG. 30 is a flowchart showing the cryptographic processing of the data encryption apparatus 10 of Sixth Embodiment of the present invention.

Here, the same example as in the First Embodiment is used, wherein the cryptographic processing is performed according to the DES algorithm in the data encryption apparatus 10 where 200-bit plaintext data is inputted and the initial value IV or the chain block is stored in the block storage unit 102 in advance.

Steps which are the same as those in the operation of the data encryption apparatus 10 of the First Embodiment shown in FIG. 10 are given the same numbers, and are not explained here.

(1)–(2) The same as the First Embodiment (Steps S101 and S102: first time).

(3) The block conversion unit 109 performs predetermined conversion on the chain block stored in the block storage unit 102 to generate a converted block, and the key data merging unit 103 merges the converted block with key data to generate merged key data (Step S1101). In the present example, a 64-bit first converted block is generated from the initial value IV of the 64 bit chain block, and an exclusive-OR operation is performed on the 64-bit first converted block and 64-bit input key data which has been determined in advance for each corresponding bit (Step S1101: first time).

(4)–(8) The same as (4)–(6), (8), and (9) of the First Embodiment (Steps S102–S106, S108, and S109: first time).

(9) The block storage unit 102 renews the chain block by storing the ciphertext block as the new chain block (Step S1102). In the present example, the first ciphertext block is stored as the new chain block (Step S1102: first time).

(10)–(12) The same as the First Embodiment (Step S110: first time, Steps S101 and S102: second time).

(13) In Step S1101, a 64-bit second converted block is generated from the 64-bit chain block generated during the processing of the first plaintext block, and an exclusive-OR operation is performed on the 64-bit second converted block and the 64-bit key data for each corresponding bit in the present example (Step S1101: second time).

(14) (18) The same as (14)–(16), (18), and (19) of the First Embodiment (Steps S104–S106, S108, and S109: second time).

(19) In Step S1102, the second ciphertext block is stored as the new chain block in the present example (Step S1102; second time).

(20)–(22) The same as the First Embodiment (Step S110: second time, Steps S101 and S102: third time).

(23) In Step S1101, a 64-bit third converted block is generated from the 64-bit chain block generated during the processing of the second plaintext block, and an exclusive-OR operation is performed on the 64-bit third converted block and the 64-bit key data for each corresponding bit in the present example (Step S1101: third time).

(24)–(28) The same as (24)–(26), (28), and (29) of the First Embodiment (Steps S104–S106, S108, and S109: third time)

(29) In Step S1102, the third ciphertext block is stored as the new chain block (Step S1102: third time)

(30)–(34) The same as the First Embodiment (Step 110: third time, Step S101: fourth time, Steps S111–S113).

Operation of Data Decryption Apparatus 20

Figure 31:
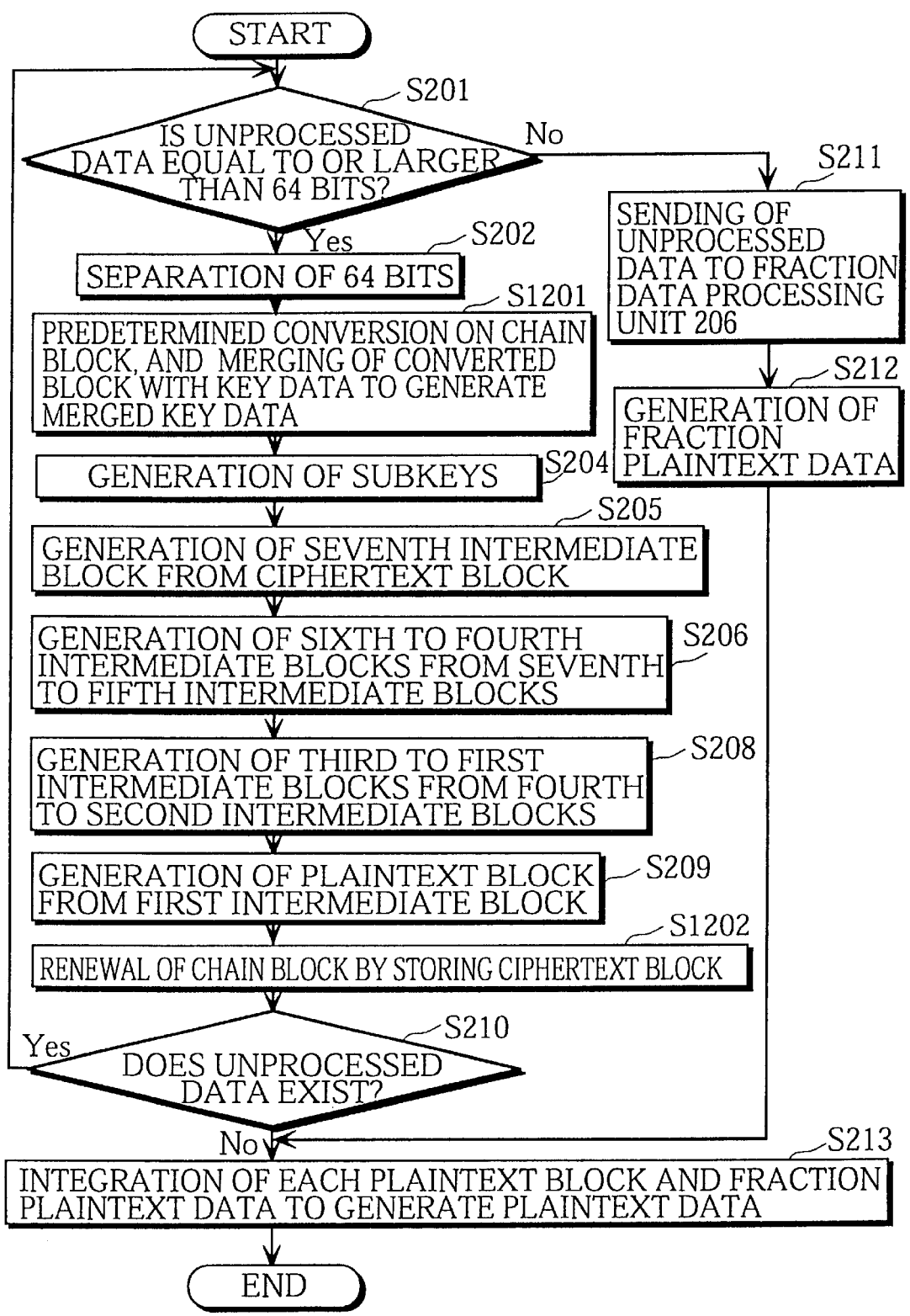
FIG. 31 is a flowchart showing the cryptographic processing of the data decryption apparatus 20 of Sixth Embodiment of the present invention.

FIG. 31 is a flowchart showing the cryptographic processing of the data decryption apparatus 20 of Sixth Embodiment of the present invention.

The operation of the data decryption Apparatus 20 is inverse conversion of the operation of the data encryption apparatus 10.

Here, the same example as in the First Embodiment is used, wherein the cryptographic processing is performed according to the DES algorithm in the data decryption apparatus 20 where 200-bit ciphertext data is inputted and the initial value IV of the chain block is stored in the block storage unit 202 in advance.

Steps which are the same as those in the operation of the data decryption apparatus 20 of the First Embodiment shown in FIG. 11 are given the same numbers, and are not explained here.

(1)–(2) The same as the First Embodiment (Steps S201–S202; first time).

(3) The block conversion unit 209 performs predetermined conversion on the chain block stored in the block storage unit 202 to generate a converted block, and the key data merging unit 203 merges the conversed block with key data to generate merged key data (Step S1201). In the present example, a 64-bit first converted block is generated from the initial value IV of the 64-bit chain block, and an exclusive-OR operation is performed on the 64-bit first converted block and 64-bit input key data which has been determined in advance for each corresponding bit (Step S1201: first time).

(4)–(8) The same as (4) (6), (8), and (9) of First Embodiment (Steps S204–S206, S208, and S209: first time).

(9) The block storage unit 202 renews the chain block by storing the ciphertext block as the new chain block (Step S1201) in the present example, the first ciphertext block is stored as the new chain block (Step S1202: first time).

(10)–(12) The same as the First Embodiment (Step S210: first time, Steps S201 and S202: second time).

(13) In Step S201, a 64-bit second converted block is generated from the 64-bit chain block generated during the processing of the first ciphertext block, and an exclusive-OR operation is performed on the 64-bit second converted block and the 64-bit key data for each corresponding bit in the present example (Step S1201: second time).

(14)–(18) The same as (14)–(16), (18), and (19) of the First Embodiment (Steps S204–S206, S208, and S209: second time).

(19) In Step S1202, the second ciphertext block is stored as the new chain block in the present example (Step S1202: second time).

(20)–(22) The same as the First Embodiment (Step S210: second time, Steps S201 and S202: third time).

(23) In Step S1201, a 64-bit third converted block is generated from the 64-bit chain block generated during the processing of the second ciphertext block, and an exclusive-OR operation is performed on the 64-bit third converted block and the 64-bit key data for each corresponding bit in the present example (Step S1201: third time)

(24)–(28) The same as (24)–(26), (28), and (29) of First Embodiment (Steps S204–S206, S208, and S209: third time).

(29) In Step S1202, the third ciphertext block is stored as the new chain block (Step S1202: third time).

(30)–(34) The same as the First Embodiment (Step S210: third time, step S201: fourth time, Steps S211–S213)

In the cryptographic processing apparatus of the Sixth Embodiment, a ciphertext block is stored as a chain block, which is then converted and merged with key data next time the cryptographic processing is performed. Thus, the chain block is renewed each time the cryptographic processing is performed.

It should be noted that while in the Sixth Embodiment the ciphertext block is stored as the new chain block, a plaintext block or one of intermediate blocks may also be stored as the new chain block.

Seventh Embodiment

The Seventh Embodiment of the present invention is different from Sixth Embodiment in that a converted block obtained by performing block conversion on a chain block is not merged with key data but with either cryptographic-processing object data or cryptographic-processed data which has been generated by the cryptographic processing.

Construction

The construction of an encrypted communication system of the Seventh Embodiment is the same as that of the First Embodiment, and is thereby not explained here.

Construction of Data Encryption Apparatus 10

Figure 32:
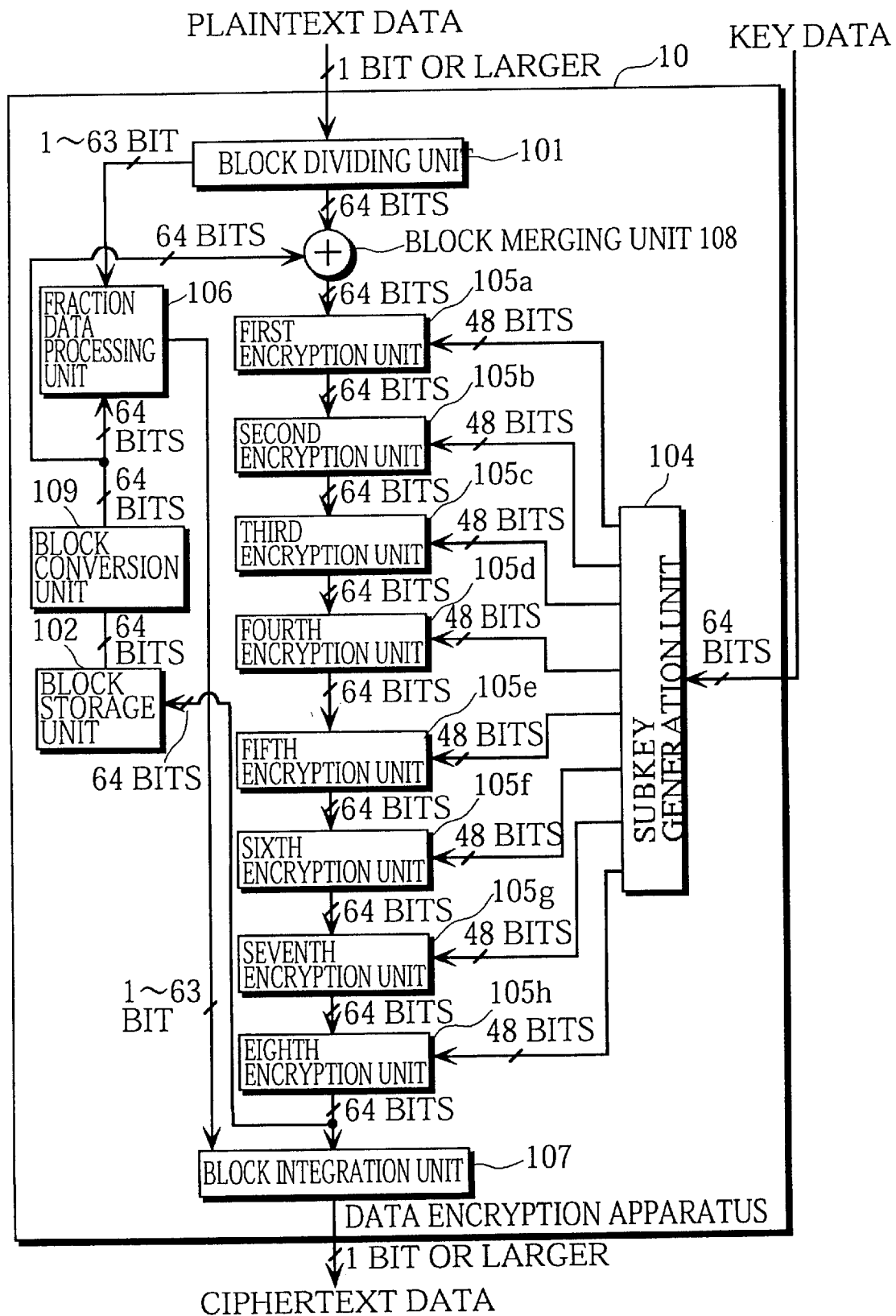
FIG. 32 shows the detailed construction of the data encryption apparatus 10 of Seventh Embodiment of the present invention.

FIG. 32 shows the detailed construction of a data encryption apparatus 10, which is shown in FIG. 2, of Seventh Embodiment of the present invention.

Components which are the same as those in the data encryption apparatus 10 of the Second Embodiment shown in FIG. 12 are given the same numbers. Components whose functions are the same as those in the data encryption apparatus 10 of the Second Embodiment are not explained here.

The data encryptions apparatus 10 of the Seventh Embodiment includes a block dividing unit 101, a block storage unit 102, a subkey generation unit 104, first to eighth encryption units 105a–105h, a fraction data processing unit 106, a block integration unit 107, a block merging unit 108, and a block conversion unit 109.

Here, the same example is used as in the First Embodiment where plaintext data of 200 bits is inputted in the data encryption apparatus 10.

The block storage unit 102 has a block renewal function. Each time the eighth encryption unit 105h generates a ciphertext block from a present plaintext block, the block storage unit 102 renews a chain block by storing the ciphertext block as the new chain block, which is used for processing a next plaintext block. In the present example, a 64-bit initial value IV which has been stored in advance is used for processing a first plaintext block, and a first ciphertext block generated during the processing is stored as the new chain block. Next, this new chain block is used for processing a second plaintext block, and a second ciphertext block generated during the processing is stored as the new chain block. Next, this new chain block is used for processing a third plaintext block, and a third ciphertext block generated during the processing is stored as the new chain block. Then this new chain block is used for processing fraction plaintext data.

The block conversion unit 109 performs predetermined conversion on the chain block stored in the block storage unit 102 to generate a converted block. Here, the predetermined conversion performed by the block conversion unit 109 is, for example, bit transposition, bit conversion, or the like. In the present example, for processing the first plaintext block, a 64-bit first converted block is generated from the initial value IV of the 64-bit chain block. For processing the second and third plaintext blocks, 64-bit second and third converted blocks are generated from the 64-bit chain blocks generated during the processing of the first and second plaintext blocks, respectively.

The block merging unit 108 merges the converted block generated by the block conversion unit 109 with a plaintext block to generate a merged plaintext block. In the present example, for processing the first plaintext block, an exclusive-OR operation is performed on the 64-bit first converted block and the 64-bit first plaintext block for each corresponding bit to generate a 64-bit first merged plaintext block. For processing the second and third plaintext blocks, an exclusive-OR operation is performed on the 64 bit second and third converted blocks and the 64-bit second and third plaintext blocks for each corresponding bit to generate 64-bit second and third merged plaintext blocks, respectively.

Construction of Data Decryption Apparatus 20

Figure 33:
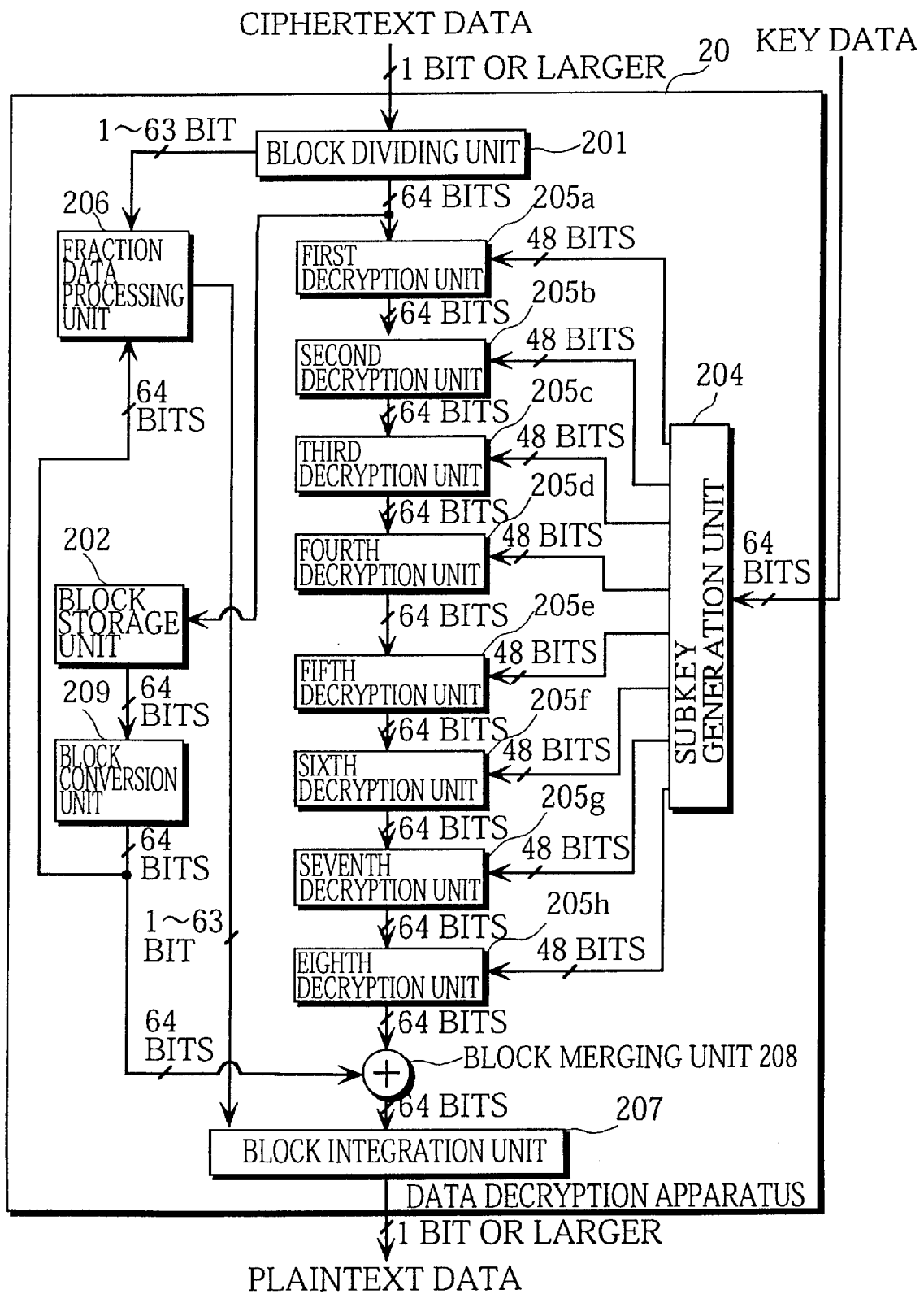
FIG. 33 shows the detailed construction of the data decryption apparatus 20 of Seventh Embodiment of the present invention.

FIG. 33 shows the detailed construction of a data decryption apparatus 20, which is shown in FIG. 2, of Seventh Embodiment of the present invention.

Components which are the same as those in the data decryption apparatus 20 of the Second Embodiment shown in FIG. 13 are given the same numbers. Components whose functions are the same as those in the data decryption apparatus 20 of Second Embodiment are not explained here.

The data decryption apparatus 20 of the Seventh Embodiment includes a block dividing unit 201, a block storage unit 202, A subkey generation unit 204, first to eighth decryption units 205*a*–205*h*, a fraction data processing unit 206, a block integration unit 207, a block merging unit 208, and a block conversion unit 209.

Here, the same example ia used as in the First Embodiment where ciphertext data of 200 bits is inputted in the data decryption apparatus 20.

The block storage unit 202 has a block renewal function. Each time the block dividing unit 201 generates a present ciphertext block, the block storage unit 102 renews a chain block by storing the ciphertext block as the new chain block, which is used for processing a next ciphertext block. In the present example, a 64-bit initial value IV which has been stored in advance is used for processing a first ciphertext block, and the first ciphertext block is stored as the new chain block. Next, this new chain block is used for processing a second ciphertext block, and the second ciphertext block is stored as the new chain block. Next, this new chain block is used for processing a third ciphertext block, and the third ciphertext is stored as the new chain block. Then this new chain block is used for processing fraction ciphertext data.

The block conversion unit 209 performs predetermined conversion on the chain block stored in the block storage unit 202 to generate a converted block. Here, the predetermined conversion performed by the block conversion unit 209 is the same as the predetermined conversion performed by the block conversion unit 109 of the data encryption apparatus 10, which is, for example, bit transposition, bit conversion, or the like. In the present example, for processing the first ciphertext block, a 64-bit first converted block is generated from the initial value IV of the 64-bit chain block. For processing the second and third ciphertext blocks, 64-bit second and third converted blocks are generated from the 64-bit chain blocks generated during the processing of the first and second ciphertext blocks, respectively.

The block merging unit 208 merges the converted block generated by the block conversion unit 209 with a cryptographic-processed block to generate a plaintext block. In the present example, for processing the first ciphertext block, an exclusive-OR operation is performed on the 64-bit first converted block and a 64-bit first cryptographic-processed block for each corresponding bit to generate a 64-bit first plaintext block. For processing the second and third ciphertext blocks, an exclusive-OR operation is performed on the 64-bit second and third converted blocks and 64-bit second and third cryptographic-processed blocks for each corresponding bit to generate 64-bit second and third plaintext blocks, respectively.

Operation

Operation of Data Encryption Apparatus 10

Figure 34:
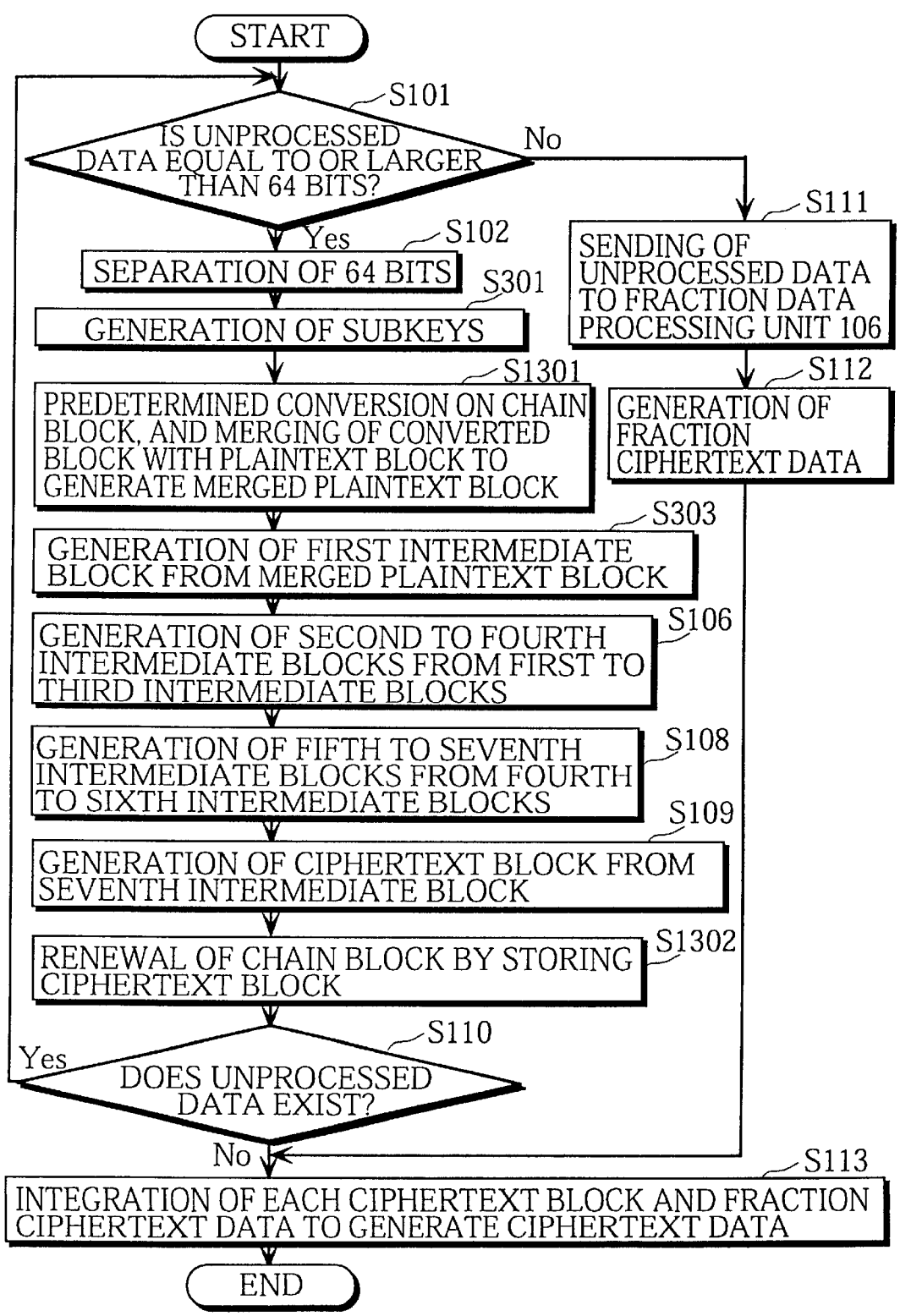
FIG. 34 is a flowchart showing the cryptographic processing of the data encryption apparatus 10 of Seventh Embodiment of the present invention.

FIG. 34 is a flowchart showing the cryptographic processing of the data encryption apparatus 10 of Seventh Embodiment of the present invention.

Here, the same example as in the First Embodiment is used, wherein the cryptographic processing is performed according to the DES algorithm in the data encryption apparatus 10 where 200-bit plaintext data is inputted and the initial value IV of the chain block is stored in the block storage unit 102 in advance.

Steps which are the same as those in the operation of the data encryption apparatus 10 of the Second Embodiment shown in FIG. 14 are given the same numbers, and are not explained here.

(1)–(3) The same as the Second Embodiment (Steps S101, S102, and S301: first time).

(4) The block conversion unit 109 performs predetermined conversion on the chain block stored in the block storage unit 102 to generate a converted block, and the block merging unit 108 merges the converted block with a plaintext block to generate a merged plaintext block (Step S1301). In the present example, a 64-bit first converted block is generated from the initial value IV of the 64-bit chain block, and an exclusive-OR operation is performed on the 64-bit first converted block and the 64-bit first plaintext block for each corresponding bit to generate a 64-bit first merged plaintext block (Step S1301: first time).

(5)–(8) The same as the Second Embodiment (Steps S303, S106, S108, and S109: first time).

(9) The block storage unit 102 renews the chain block by storing the ciphertext block as the new chain block (Step S1302). In the present example, the block storage unit 102 stores the first ciphertext block as the new chain block (Step S1302: first time).

(10)–(13) The same as the Second Embodiment (Step S110: first time, Steps S101, S102, and S301: second time).

(14) In Step S1301, a 64-bit second converted block is generated from the 64-bit chain block generated during the processing of the first plaintext block, and an exclusive-OR operation is performed on the 64-bit second converted block and the 64-bit second plaintext block for each corresponding bit to generate a 64-bit second merged plaintext block in the present example (Step S1301; second time).

(15)–(18) The same as the Second Embodiment (Steps S303, S106, S108, and S109: second time).

(19) In Step S1302, block the second ciphertext block is stored as the new chain block in the present example (Step S1302: second time).

(20)–(23) The same as the Second Embodiment (Step S110; second time, Steps S101, S102, and S301: third time).

(24) In Step S1301, a 64-bit third converted block is generated from the 64-bit chain block generated during the processing of the second plaintext block, and an exclusive-OR operation is performed on the 64-bit third converted block and the 64-bit third plaintext block for each corresponding bit to generate a 64-bit third merged plaintext block in the present example (Step S1301: third time).

(25)–(28) The same as the Second Embodiment (Steps S303, S106, S108, and S109: third time).

(29) In Step S1302, the third ciphertext block is stored as the new chain block in the present example (Step S1302: third time).

(30)–(34) The same as the Second Embodiment (Step S110: third time, Step S101: fourth time, Steps S111–S113)

Operation of Data Decryption Apparatus 20

Figure 35:
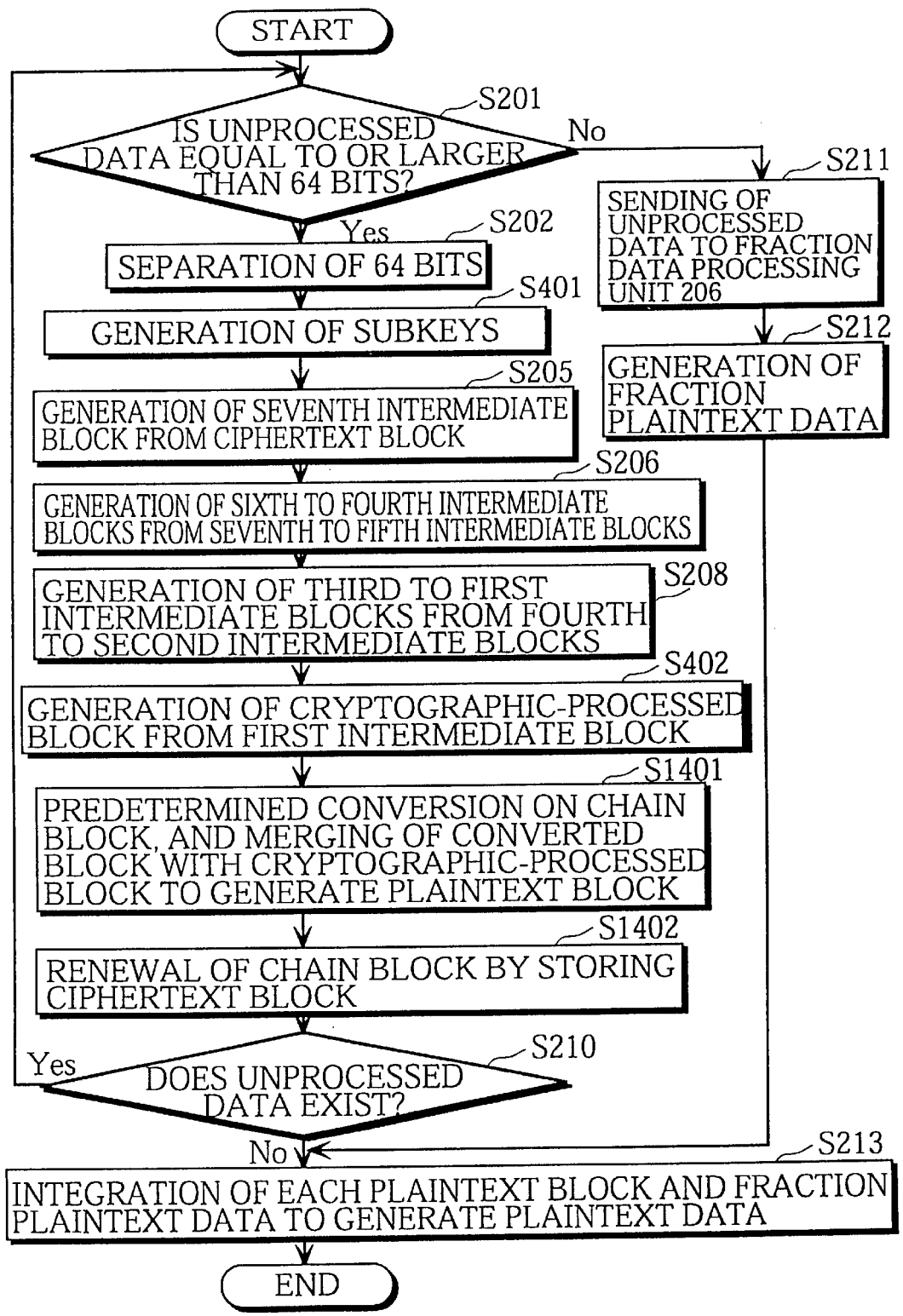
FIG. 35 is a flowchart showing the cryptographic processing of the data decryption apparatus 20 of Seventh Embodiment of the present invention.

FIG. 35 is a flowchart showing the cryptographic processing of the data decryption apparatus 20 of Seventh Embodiment of the present invention.

The operation of the data decryption apparatus 20 is inverse conversion of the operation of the data encryption apparatus 10.

Here, the same example as in the First Embodiment is used, wherein the cryptographic processing is performed according to the DES algorithm in the data decryption apparatus 20 where 200-bit ciphertext data is inputted and the initial value IV of the chain block is stored in the block storage unit 202 in advance.

Steps which are the same as those in the operation of the data decryption apparatus 20 of the Second Embodiment shown in FIG. 15 are given the same numbers, and are not explained here.

(1)–(7) The same as the Second Embodiment (Steps S201, S202, S401, S205, S206, S208, and S402: first time).

(8) The block conversion unit 209 performs predetermined conversion on the chain block stored in the block storage unit 202 to generate a converted block, and the block merging unit 200 merges the converted block with the cryptographic-processed block to generate a plaintext block (Step S1401). In the present example, a 64-bit first converted block is generated from the initial value IV of the chain block, and an exclusive-OR operation is performed on the 64 bit first converted block and the 64-bit first cryptographic processed block for each corresponding bit to generate a 64-bit first plaintext block (Step S1401: first time).

(9) The block storage unit 202 renews the chain block by storing the ciphertext block as the new chain block (Step S1402). In the present example, the first ciphertext block is stored as the new chain block (Step S1402: first time).

(10)–(17) The same as the Second Embodiment (Step S210: first time, Steps S201, S202, S401, S205, S206, S208, and S402: second time).

(18) In Step S1401, a 64-bit second converted block is generated from the 64-bit chain block generated during the processing of the first ciphertext block, and an exclusive-OR operation is performed on the 64-bit second converted block and the 64-bit second cryptographic-processed block for each corresponding bit to generate a 64-bit second plaintext block in the present example (Step S1401: second time).

(19) In Step S1402, the second ciphertext block is stored as the new chain block (Step S1402: second time).

(20)–(27) The same as the Second Embodiment (Step S210: second time, Steps S201, S202, S401, S205, S206, S208, and S402: third time).

(28) In Step S1401, a 64-bit third converted block is generated from the 64-bit chain block generated during the processing of the second ciphertext block, and an exclusive-OR operation is performed on the 64-bit third converted block and the 64-bit third cryptographic-processed block for each corresponding bit to generate a 64-bit third plaintext block in the present example (Step S1401: third time).

(29) In Step S1402, the third ciphertext block is stored as the new chain block in the present example (Step S1402: third time).

(30)–(34) The same as the Second Embodiment (Step S210: third time, Step S201: fourth time, Steps S211–S213 ).

In the cryptographic processing apparatus of the Seventh Embodiment, a ciphertext block is stored as a chain block, which is then converted and merged with a plaintext block or a cryptographic-processed block next time the cryptographic processing is performed. Thus, the chain block is renewed each time the cryptographic processing is performed.

It should be noted that while in the Seventh Embodiment the ciphertext block is stored as the new chain block, a plaintext block or one of intermediate blocks may also be stored as the new chain block.

Eighth Embodiment

A data encryption apparatus 10 of Eighth Embodiment of the present invention is different from that of Seventh Embodiment in each input of a first encryption unit 105a, a block storage unit 102, a block integration unit 107, and a block merging unit 108. The processing order and the like of the data encryption apparatus 10 of the Eighth Embodiment is different from that of the Seventh Embodiment.

A data decryption apparatus 20 of Eighth Embodiment of the present invention is the same as the data encryption apparatus 10, the only difference lying in the input of a block storage unit 202.

Construction

The construction of an encrypted communication system of the Eighth Embodiment is the same as that of the First Embodiment, and is thereby not explained here.

Construction of Data Encryption Apparatus 10

Figure 36:
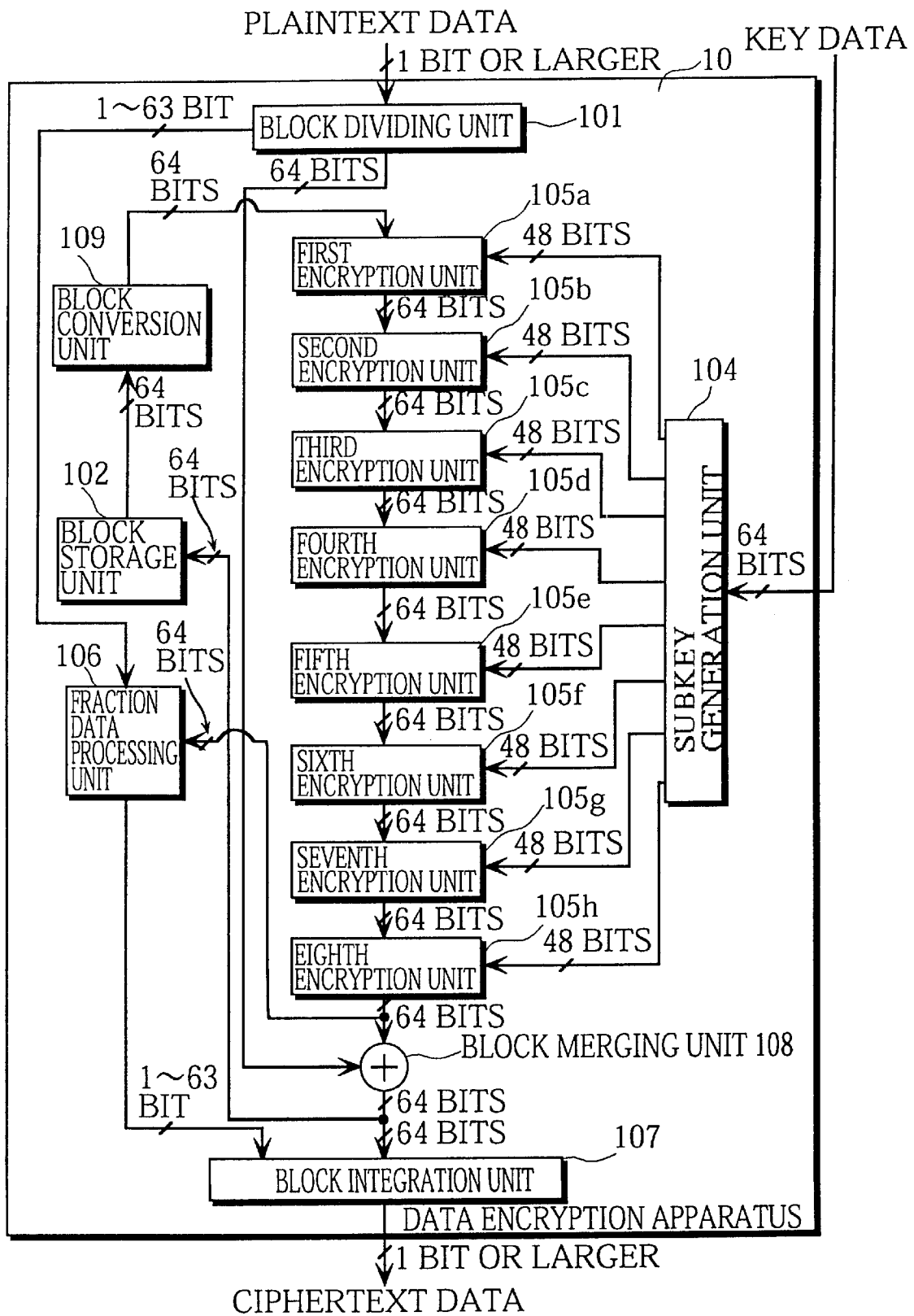
FIG. 36 shows the detailed construction of the data encryption apparatus 10 of Eighth Embodiment of the present invention.

FIG. 36 shows the detailed construction of a data encryption apparatus 10, which is shown in FIG. 2, of Eighth Embodiment of the present invention.

Components which are the same as those in the data encryption apparatus 10 of the Seventh Embodiment shown in FIG. 32 are given the same numbers. Components whose functions are the same as those in the data encryption apparatus 10 of the Seventh Embodiment are not explained here.

The construction of the data encryption apparatus 10 of the Eighth Embodiment is the same as that of the Seventh Embodiment.

Here, the same example is used as in the First Embodiment where plaintext data of 200 bits is inputted in the data encryption apparatus 10.

The first encryption unit 105a generates a first intermediate block from a converted block generated by the block conversion unit 109, and not from a merged plaintext block generated by the block merging unit 108 as in the Seventh Embodiment.

The eighth encryption unit 105h generates a cryptographic processed block, and not a ciphertext block as in the Seventh Embodiment.

The first to eighth encryption units 105a 105h have the same functions as those of the Seventh Embodiment. In the present example, first to seventh intermediate blocks are progressively generated for each of the first to third converted blocks, with first to third cryptographic processed blocks being generated from the resulting intermediate blocks.

The block storage unit 102 has a block renewal function. Each time the block merging unit 108 generates a ciphertext block, the block storage unit 102 renews a chain block by storing the ciphertext block as the new chain block, which is used for processing a next plaintext block. This operation is the same as that of the Seventh Embodiment.

The block merging unit 108 merges the plaintext block with the cryptographic-processed block generated by the eighth encryption unit 105h to generate a ciphertext block, and not with the converted block generated by the block conversion unit 109 as in the Seventh Embodiment. In the present example, for processing a first plaintext block, an exclusive-OR operation is performed on the 64-bit first cryptographic-processed block and the 64-bit first plaintext block for each corresponding bit to generate a 64-bit first ciphertext block. For processing second and third plaintext blocks, an exclusive OR operation is performed on the 64-bit second and third cryptographic-processed blocks and the 64-bit second and third plaintext blocks for each corresponding bit to generate 64 bit second and third ciphertext blocks, respectively.

The block integration unit 107 integrates each ciphertext block generated by the block merging unit 108 and fraction ciphertext data generated by the fraction data processing unit 106 to generate ciphertext data. In the present example, the 64-bit first to third ciphertext blocks and 8-bit fraction ciphertext data are integrated to form 200-bit ciphertext data.

Construction of Data Decryption Apparatus 20

Figure 37:
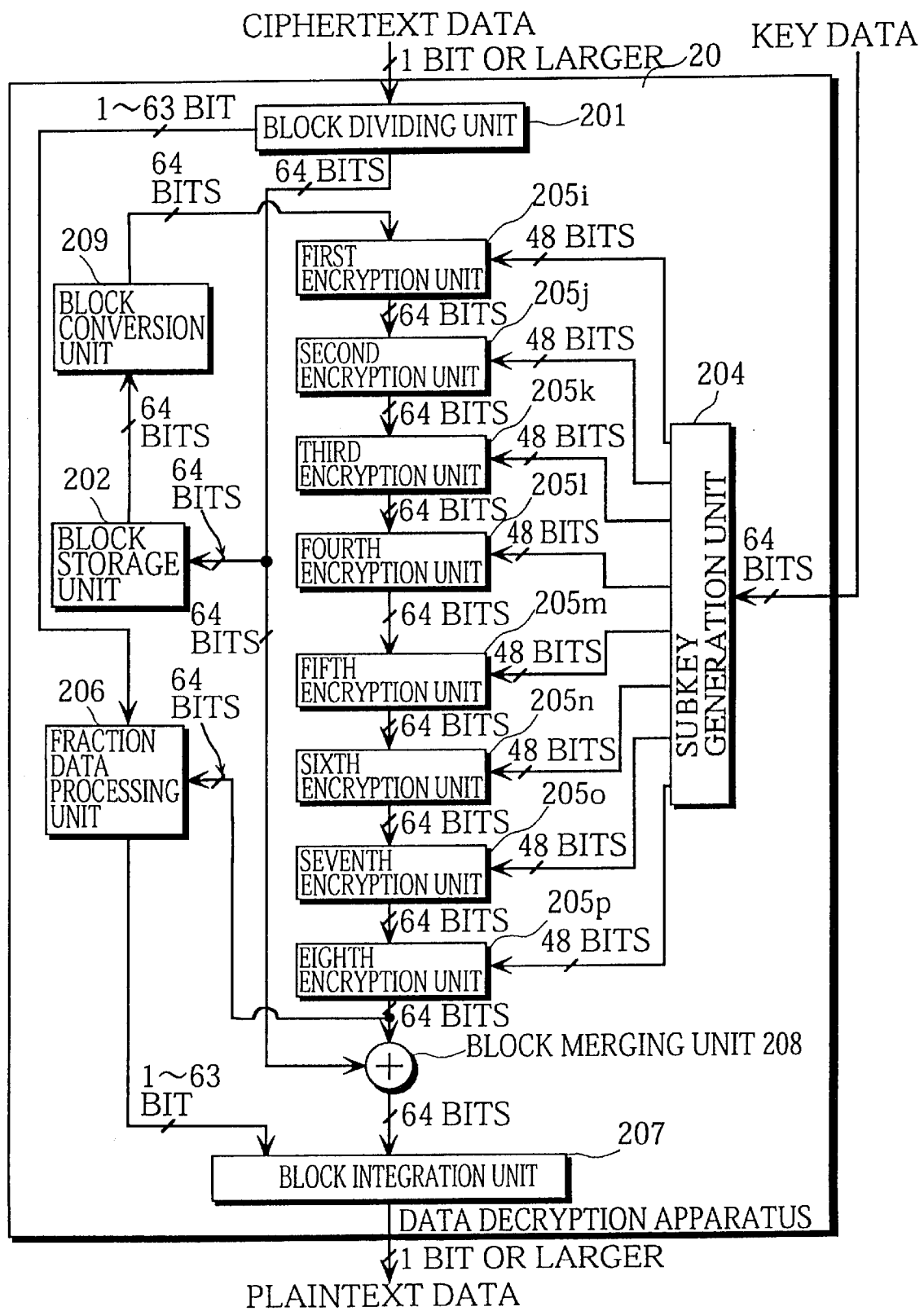
FIG. 37 shows the detailed construction of the data decryption apparatus 20 of Eighth Embodiment of the present invention.

FIG. 37 shows the detailed construction of a data decryption apparatus 20, which is shown in FIG. 2, of Eighth Embodiment of the present invention.

The data decryption apparatus 20 of the Eighth Embodiment includes a block dividing unit 201, a block storage unit 202, a subkey generation unit 204, first to eighth encryption units 205i–205p, a fraction data processing unit 206, a block integration unit 207, a block merging unit 208, and a block conversion unit 209.

Here, the same example is used as in the First Embodiment where ciphertext data of 200 bits is inputted in the data decryption apparatus 20.

The block storage unit 202 has a block renewal function. Each time the block dividing unit 201 generates a present ciphertext block, the block storage unit 202 renews a chain block by storing the ciphertext block as the new chain block, which is used for processing a next ciphertext block. In the present example, a 64-bit initial value IV which has been stored in advance is used for processing a first ciphertext block, and the first ciphertext block is stored as the new chain block. Next, this new chain block is used for processing a second ciphertext block, and the second ciphertext block is stored as the new chain block. Next, this new chain block is used for processing a third ciphertext block, and the third ciphertext is stored as the new chain block. Then this new chain block is used for processing fraction ciphertext data.

Components whose names are the same as those of the data encryption apparatus 10 of the Eighth Embodiment shown in FIG. 36 have the same functions. Here, except that the input of the block storage unit 202 is different from the input of the block storage unit 102 of the data encryption apparatus 10, the construction of the data decryption apparatus 20 is the same as that of the data encryption apparatus 10.

Operation

Operation of Data Encryption Apparatus 10

Figure 38:
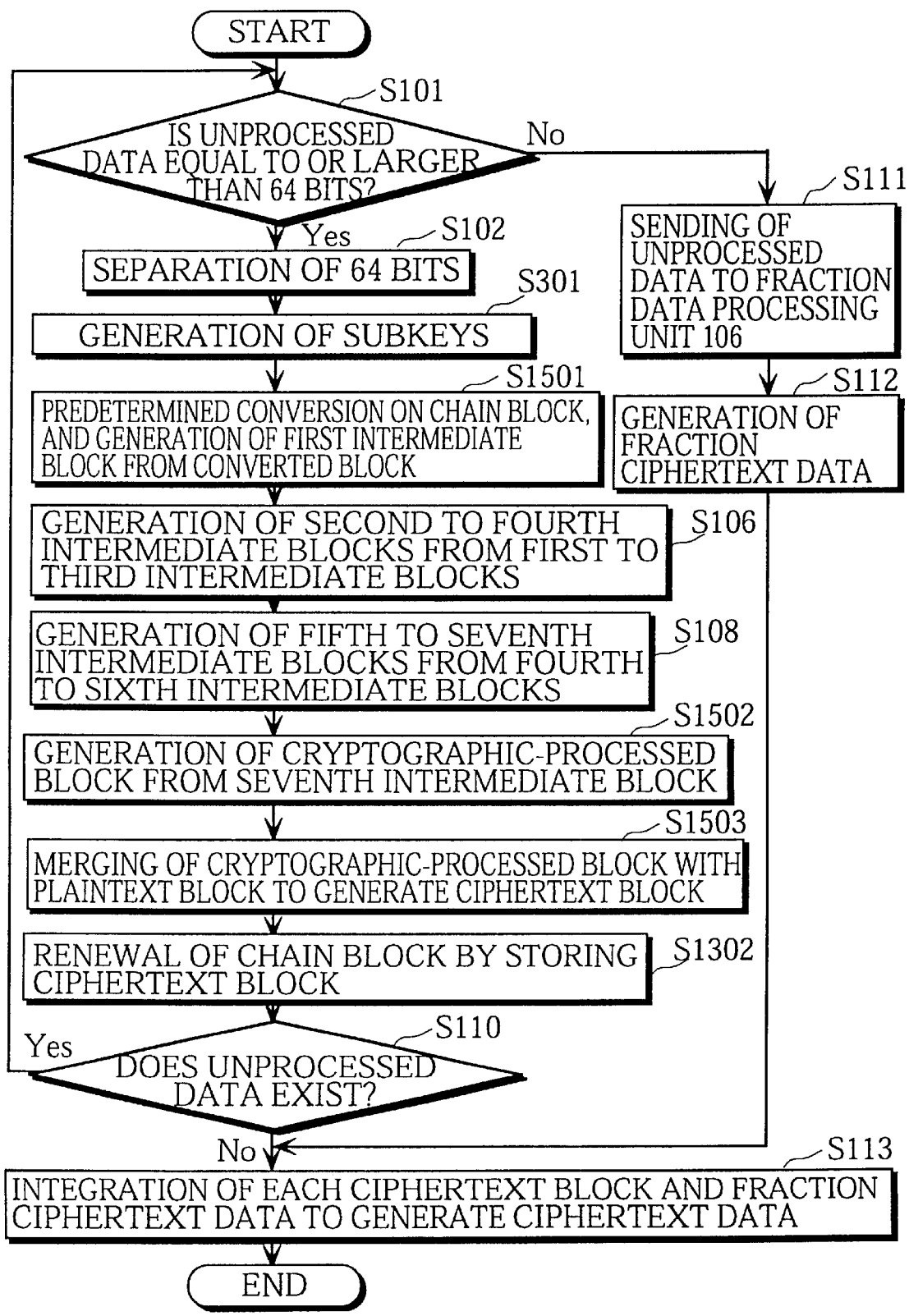
FIG. 38 is a flowchart showing the cryptographic processing of the data encryption apparatus 10 of Eighth Embodiment of the present invention.

FIG. 38 is a flowchart showing the cryptographic processing of the data encryption apparatus 10 of Eighth Embodiment of the present invention.

Here, the same example as in the First Embodiment is used, wherein the cryptographic processing is performed according to the DES algorithm in the data encryption apparatus 10 where 200-bit plaintext data is inputted and the initial value IV of the chain block is stored in the block storage unit 102 in advance.

Steps which are the same as those in the operation of the data encryption apparatus 10 of the Seventh Embodiment shown in FIG. 34 are given the same numbers, and are not explained here.

(1)–(3) The same as the Seventh Embodiment (Steps S101, S102, and S301: first time).

(4) The block conversion unit 109 performs predetermined conversion on the chain block stored in the block storage unit 102 to generate a converted block, and the first encryption unit 105a generates a first intermediate block from the converted block using the first subkey (Step S1501). In the present example, a 64-bit first converted block in generated from the initial value IV of the 64-bit chain block, and a first intermediate block is generated from the 64-bit first converted block (Step S1501; first time).

(5)–(6) The same as (6) and (7) of the Seventh Embodiment (Steps S106 and S108: first time).

(7) The eighth encryption unit 105h generates a cryptographic-processed block from the seventh intermediate block using the eighth subkey (Step S1502). In the present example, a first cryptographic-processed block is generated from the seventh intermediate block corresponding to the initial value IV of the chain block (Step S1502: first time).

(8) The block merging unit 108 merges the cryptographic-processed block with a plaintext block to generate a ciphertext block (Step S1503). In the present example, an exclusive-OR operation is performed on the 64-bit first cryptographic-processed block and the 64-bit first plaintext block for each corresponding bit to generate a 64-bit first ciphertext block (Step S1503: first time).

(9)–(13) The same as the Seventh Embodiment (Steps S1302 and S110: first time, Steps S101, S102, and S301; second time)

(14) In Step S1501, a 64-bit second converted block is generated from the 64-bit chain block generated during the processing of the first plaintext block, and a first intermediate block is generated from the 64-bit second converted block in the present example (Step S1501: second time).

(15)–(16) The same as (16) and (17) of the Seventh Embodiment (Steps S106 and S108: second time).

(17) In Step S1502, a second cryptographic-processed block is generated from the seventh intermediate block corresponding to the chain block generated during the processing of the first plaintext block in the present example (Step S1502: second time).

(18) In Step S1503, an exclusive-OR operation is performed on the 64-bit second cryptographic-processed block and the 64-bit second plaintext block for each corresponding bit to generate a 64-bit second ciphertext block in the present example (Step S1503: second time)

(19)–(23) The same as the Seventh Embodiment (Steps S1302 and S110: second time, Steps S101, S102, and S301: third time).

(24) In Step S1501, a 64-bit third converted block is generated from the 64-bit chain block generated during the processing of the second plaintext block, and a first intermediate block is generated from the 64-bit third converted block in the present example (Step S1501: third time).

(25)–(26) The same as (26) and (27) of the Seventh Embodiment (Steps S106 and S108: third time).

(27) In Step S1502, a third cryptographic-processed block is generated from the seventh intermediate block corresponding to the chain block generated during the processing of the second plaintext block in the present example (Step S1502: third time).

(28) In Step S1503, an exclusive-OP operation is performed on the 64-bit third cryptographic-processed block and the 64-bit third plaintext block for each corresponding bit to generate a 64-bit third ciphertext block in the present example (Step S1503: third time).

(29)–(34) The same as the Seventh Embodiment (Steps S1302 and S110: third time, step S101: fourth time, Steps S111–S113).

Operation of Data Decryption Apparatus 20

The operation of the data decryption apparatus 20 is inverse conversion of the operation of the data encryption apparatus 10.

The operation of the decryption apparatus 20 of Eighth Embodiment is the same as the data encryption apparatus 10 of the Eighth Embodiment except the difference in the input of the block storage unit, and is thereby not explained here.

In the cryptographic processing apparatus of Eighth Embodiment, a ciphertext block is stored as a chain block. Next time the cryptographic processing is performed, the chain block, on which the block conversion and the cryptographic processing have been performed, in then merged with a plaintext block or a ciphertext block. Thus, the chain block is renewed each time the cryptographic processing is performed.

It should be noted that while in the Eighth Embodiment the ciphertext block is stored as the new chain block, a plaintext block or one of intermediate blocks may also be stored as the new chain block.

Ninth Embodiment

The Ninth Embodiment of the present invention is different from the Eighth Embodiment only in the input of a block storage unit.

Construction

The construction of an encrypted communication system of the Ninth Embodiment is the same as that of the First Embodiment, and is thereby not explained here.

Construction of Data Encryption Apparatus 10

Figure 39:
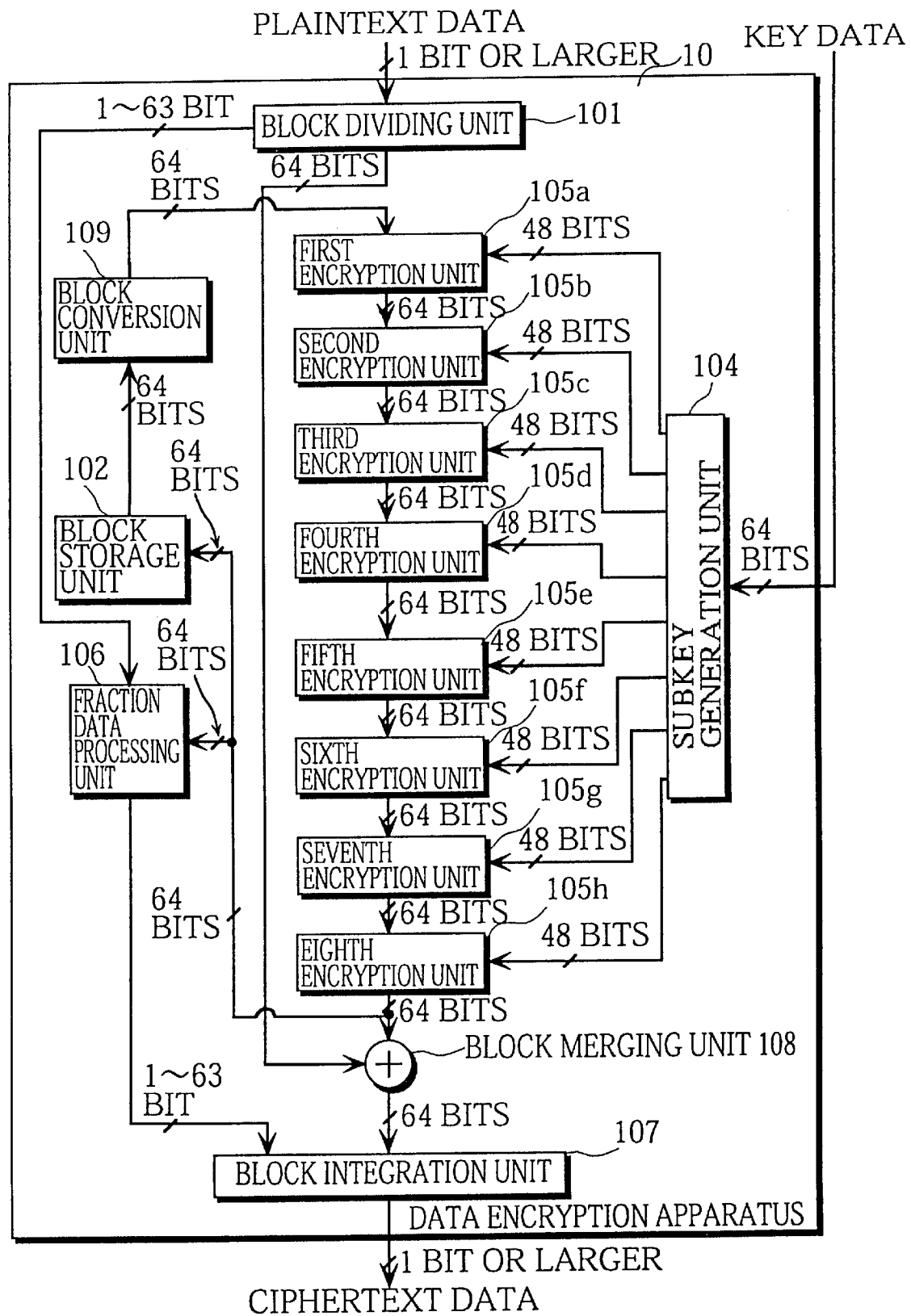
FIG. 39 shows the detailed construction of the data encryption apparatus 10 of Ninth Embodiment of the present invention.

FIG. 39 shows the detailed construction of a data encryption apparatus 10, which is shown in FIG. 2, of Ninth Embodiment of the present invention.

Components which are the same as those in the data encryption apparatus 10 of the Eighth Embodiment shown in FIG. 36 are given the same numbers. Components whose functions are the same as those in the data encryption apparatus 10 of the Eighth Embodiment are not explained here.

The construction of the data encryption apparatus 10 of Ninth Embodiment is the same as that of the Eighth Embodiment.

Here, the same example is used as in the First Embodiment where plaintext data of 200 bits is inputted in the data encryption apparatus 10.

The block storage unit 102 has a block renewal function. Each time the eighth encryption unit 105$h$ generates a cryptographic-processed block, the block storage unit 102 renews a chain block by storing the cryptographic-processed block as the new chain block, which is used for processing a next plaintext block. In the present example, a 64-bit initial value IV which has been stored in advance is used for processing a first plaintext block, and a first cryptographic processed block generated during the processing is stored as the new chain block. Next, the new chain block is used for processing a second plaintext block, and a second cryptographic-processed block generated during the processing is stored as the new chain block. Next, this new chain block is used for processing a third plaintext block, and a third cryptographic-processed block generated during the processing is stored as the new chain block. Then this new chain block is used for processing fraction plaintext data.

Construction of Data Decryption Apparatus 20

Figure 40:
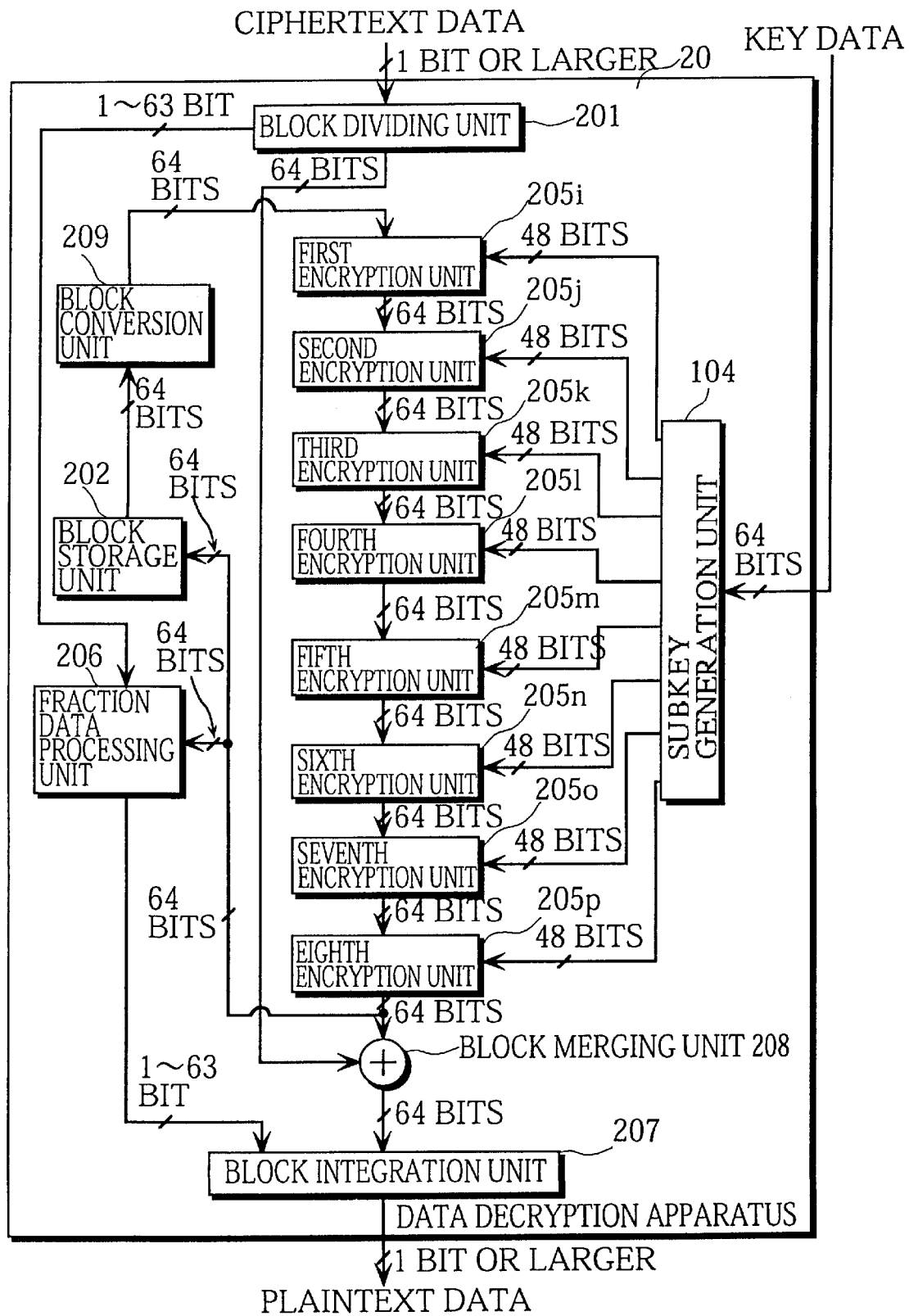
FIG. 40 shows the detailed construction of the data decryption apparatus 20 of Ninth Embodiment of the present invention.

FIG. 40 shows the detailed construction of a data decryption apparatus 20, which is shown in FIG. 2, of Ninth Embodiment of the present invention.

The construction of the data decryption apparatus 20 of Ninth Embodiment is the same as that of the Eighth Embodiment. Components whose names are the same as those of the data encryption apparatus 10 of the Ninth Embodiment shown in FIG. 39 have the same functions, and is of thereby not explained here.

Operation

Operation of Data Encryption Apparatus 10

The data encryption apparatus 10 of Ninth Embodiment of the present invention is the same as the data encryption apparatus 10 of Eighth Embodiment except the difference in the input of the block storage unit 102, so that its operation is not explained here.

Operation of Data Decryption Apparatus 20

The operation of the data decryption apparatus 20 is inverse conversion of the operation of the data encryption apparatus 10.

The operation of the data decryption apparatus 20 of Ninth Embodiment is the same as the data encryption apparatus 10 of the Ninth Embodiment, and is thereby not explained here.

In the cryptographic processing apparatus of the Ninth Embodiment, a cryptographic-processed block generated during the cryptographic processing on a present block is stored as a chain block. When the cryptographic processing is performed on a next block, the chain block, on which the block conversion and the cryptographic processing have been performed, is then merged with a plaintext block or a ciphertext block. Thus, the chain block is renewed each time the cryptographic processing is performed.

Tenth Embodiment

In the Tenth Embodiment of the present invention, a function of renewing key data each time the cryptographic processing is performed on one block is further included in the First Embodiment.

Construction

The construction of an encrypted communication system of the Tenth Embodiment is the same as that of the First Embodiment, and is thereby not explained here.

Construction of Data Encryption Apparatus 10

Figure 41:
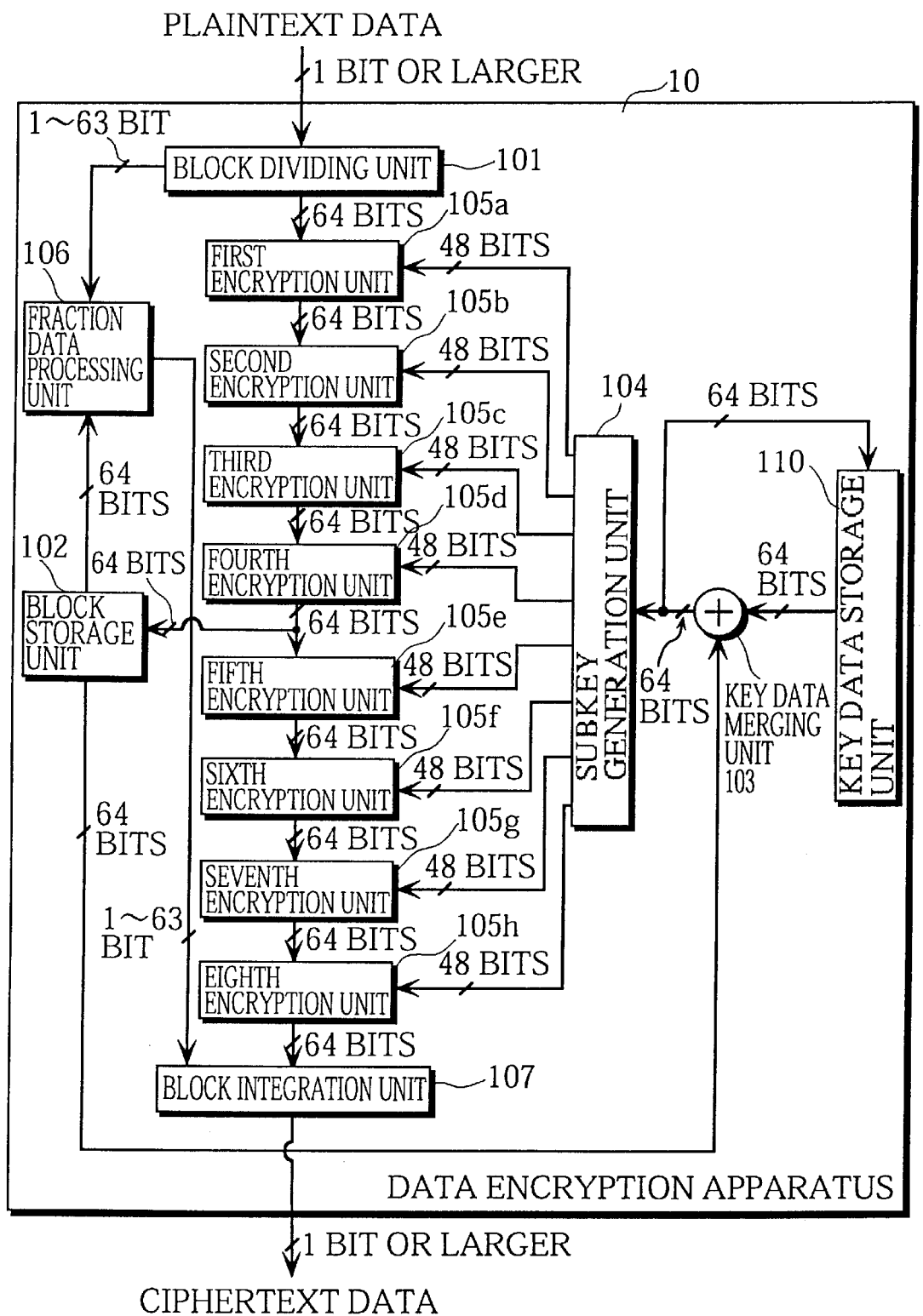
FIG. 41 shows the detailed construction of the data encryption apparatus 10 of Tenth Embodiment of the present invention.

FIG. 41 shows the detailed construction of a data encryption apparatus 10, which is shown in FIG. 2, of Tenth Embodiment of the present invention.

Components which are the same as those in the data encryption apparatus 10 of the First Embodiment shown in FIG. 3 are given the same numbers. Components whose functions are the same as those in the data encryption apparatus 10 of the First Embodiment are not explained here.

The data encryption apparatus 10 of the Tenth Embodiment includes a block dividing unit 101, a block storage unit 102, a key data merging unit 103, a subkey generation unit 104 first to eighth encryption units 105$a$–105$h$, a fraction data processing unit 106, a block integration unit 107, and key data storage unit 110.

Here, the same example is used as in the First Embodiment where plaintext data of 200 bits is inputted in the data encryption apparatus 10.

Comparison between the conventional encryption apparatus 30 shown in FIG. 1 and the data encryption apparatus 10 of the Tenth Embodiment of the present invention shown in FIG. 41 corresponds to the comparison between the conventional encryption apparatus 30 and the data encryption apparatus 10 of the First Embodiment, the only difference lying in that the key data storage unit 110 is included in the Tenth Embodiment.

The key data storage unit 110 stores key data. An initial value of the key data is stored in advance for processing a first plaintext block.

The key data merging unit 103 merges a chain block stored in the block storage unit 102 with the key data stored in the key data storage unit 110 to generate merged key data. In the present example, for processing a first plaintext block, an exclusive-OR operation is performed on an initial value IV of the 64-bit chain block and the initial value of the 64-bit key data for each corresponding bit to generate first merged key data. For processing second and third plaintext blocks, an exclusive-OR operation is performed, for each corresponding bit, on a 64-bit chain block generated during the cryptographic processing of the immediately preceding plaintext block and 64-bit key data generated during the cryptographic processing of the immediately preceding plaintext block, so as to generate second and third merged key data, respectively.

The key data storage unit 110 has a key data renewal function. Each time the key data merging unit 103 generates merged key data, the key data storage unit 110 renews the key data by storing the merged key data as the new key data, which is used for processing a next plaintext block. In the present example, the 64-bit initial value which has been stored in advance is used for processing the first plaintext block, and the first merged key data generated during the processing is stored as the new key data. Next, this new key data is used for processing the second plaintext block, and the second merged key data generated during the processing is stored as the new key data. Next, this new key data is used for processing the third plaintext block, and the third merged key data generated during the processing is stored as the new key data.

Construction of Data Decryption Apparatus 20

Figure 42:
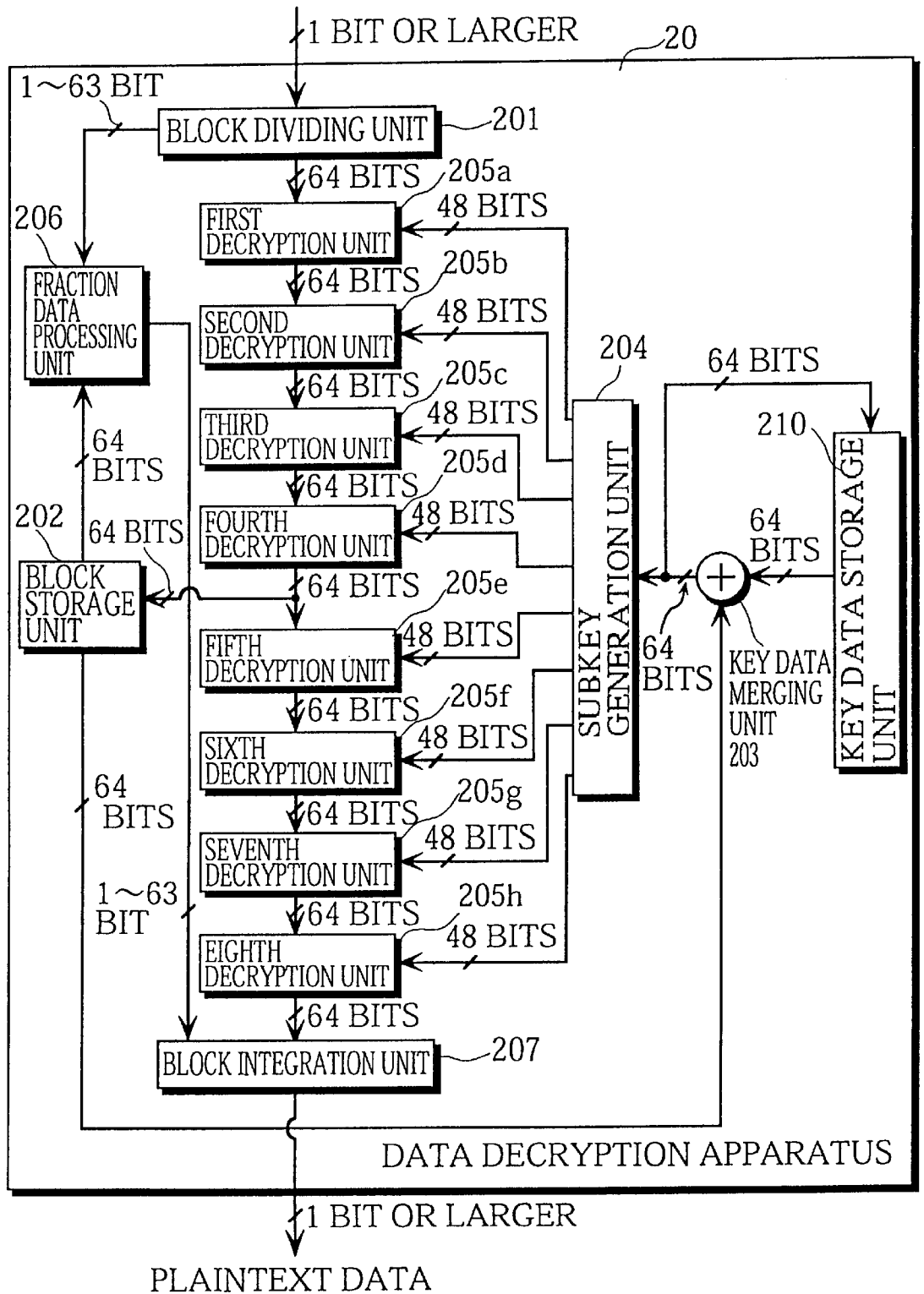
FIG. 42 shows the detailed construction of the data decryption apparatus 20 of Tenth Embodiment of the present invention.

FIG. 42 shows the detailed construction of a data decryption apparatus, which is blown in FIG. 2, of Tenth Embodiment of the present invention.

Components which are the same as those in the data decryption apparatus 20 of the First Embodiment shown in FIG. 8 are given the same numbers. Components whose functions are the same as those in the data decryption apparatus 20 of the First Embodiment are not explained here.

The data decryption apparatus 20 of the Tenth Embodiment includes a block dividing unit 201, a block storage unit 202, a key data merging unit 203, a subkey generation unit 204, first to eighth decryption units 205*a*–205*h*, a fraction data processing unit 206, a block integration unit 207, and a key data storage unit 210.

Here, the same example is used as in the First Embodiment where ciphertext data of 200 bits is inputted in the data decryption apparatus 20.

The key data storage unit 210 stores key data. An initial value of the key data is stored in advance for processing a first ciphertext block.

The key data merging unit 203 merges a chain block stored in the block storage unit 202 with the key data stored in the key data storage unit 210 to generate merged key data. In the present example, for processing a first ciphertext block, an exclusive-OR operation is performed on an initial value IV of the 64-bit chain block and the initial value of the 64-bit key data for each corresponding bit to generate first merged key data. For processing second and third ciphertext blocks, an exclusive-OR operation is performed, for each corresponding bit, on a 64-bit chain block generated during the cryptographic processing of the immediately preceding ciphertext block and 64-bit key data generated during the cryptographic processing of the immediately preceding ciphertext block, so as to generate second and third merged key data, respectively.

The key data storage unit 210 has a key data renewal function. Each time the key data merging unit 203 generates merged key data, the key data storage unit 210 renews the key data by storing the merged key data as the new key data, which is used for processing a next ciphertext block. In the present example, the 64-bit initial value which has been stored in advance is used for processing the first ciphertext block, and the first merged key data generated during the processing is stored as the new key data. Next, this new key data is used for processing the second ciphertext block, and the second merged key data generated during the processing is stored as the new key data. Next, this new key data is used for processing the third ciphertext block, and the third merged key data generated during the processing in stored as the new key data.

Operation

Operation of Data Encryption Apparatus 10

Figure 43:
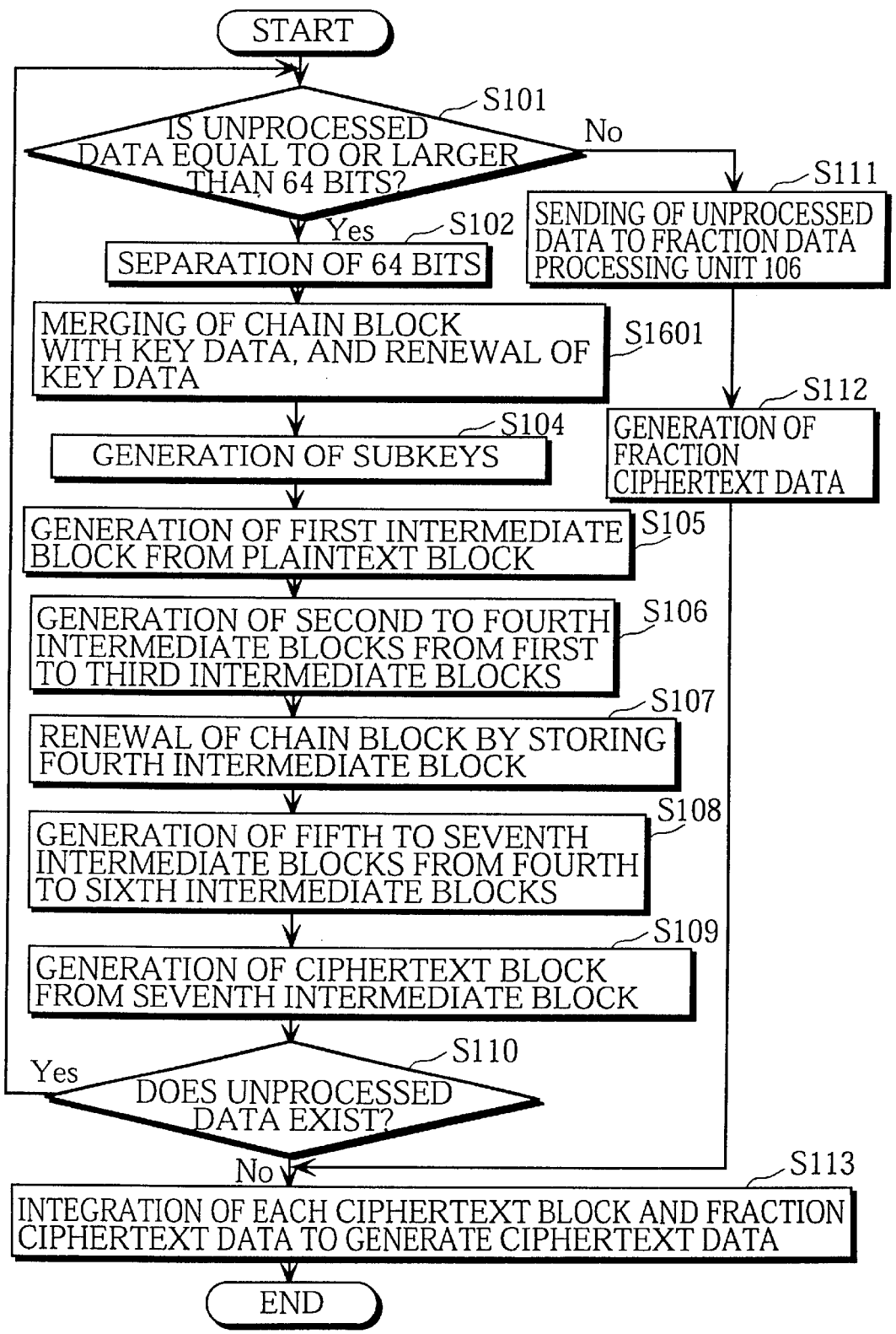
FIG. 43 is a flowchart showing the cryptographic processing of the data encryption apparatus 10 of Tenth Embodiment of the present invention.

FIG. 43 is a flowchart showing the cryptographic processing of the data encryption apparatus 10 of Tenth Embodiment of the present invention.

Steps which are the same as those in the operation of the data encryption apparatus 10 of the First Embodiment shown in FIG. 10 are given the same numbers, and are not explained here.

Here, the same example as in the First Embodiment is used, wherein the cryptographic processing is performed according to the DES algorithm in the data encryption apparatus 10 where 200-bit plaintext data is inputted and the initial value IV of the chain block is stored in the block storage unit 102 in advance. Also, the initial value of the key data is stored in the key data storage unit 110 in advance.

(1)–(2) The same as the First Embodiment (Steps S101 and S102:

first time).

(3) The key data merging unit 103 merges the chain block stored in the block storage unit 102 with the key data stored in the key data storage unit 110 to generate merged key data, and the key data storage unit 110 renews the key data by storing the merged key data as the new key data (Step S1601). In the present example, an exclusive-OR operation is performed, for each corresponding bit, on the 64-bit initial value IV of the chain block stored in the block storage unit 102 and the 64-bit initial value of the key data stored in the key data storage unit 110 so as to generate first merged key data, which is then sent to the subkey generation unit 104 and the key data storage unit 110 renews the key data by storing the first merged key data as the new key data (Step S1601: first time).

(4)–(12) The same as the First Embodiment (Steps S104–S110: first time, Steps S101 and S102: second time).

(13) In Step S1601, an exclusive-OR operation in performed, for each corresponding bit, on the 64-bit chain block generated during the processing of the first plaintext block and the 64-bit key data generated during the processing of the first plaintext block so as to generate second merged key data, which is then sent to the subkey generation unit 104 and the key data storage unit 110 renews the key data by storing the second merged key data as the new key data, in the present example (Step S1601: second time).

(14)–(22) The same as the First Embodiment (Steps S104–S110: second time, Steps S101 and S102: third time).

(23) In Step S1601, an exclusive-OR operation is performed, for each corresponding bit, on the 64-bit chain block generated during the processing of the second plaintext block and the 64-bit key data generated during the processing of the second plaintext block so as to generate third merged key data, which is then sent to the subkey generation unit 104 and the key data storage unit 110 renews the key data by storing the third merged key data as the new key data, in the present example (Step S1601: third time).

(24)–(34) The same as the First Embodiment (Steps S104–S110: third time, Step S101: fourth time, Steps S111–S113).

Operation of Data Decryption Apparatus 20

Figure 44:
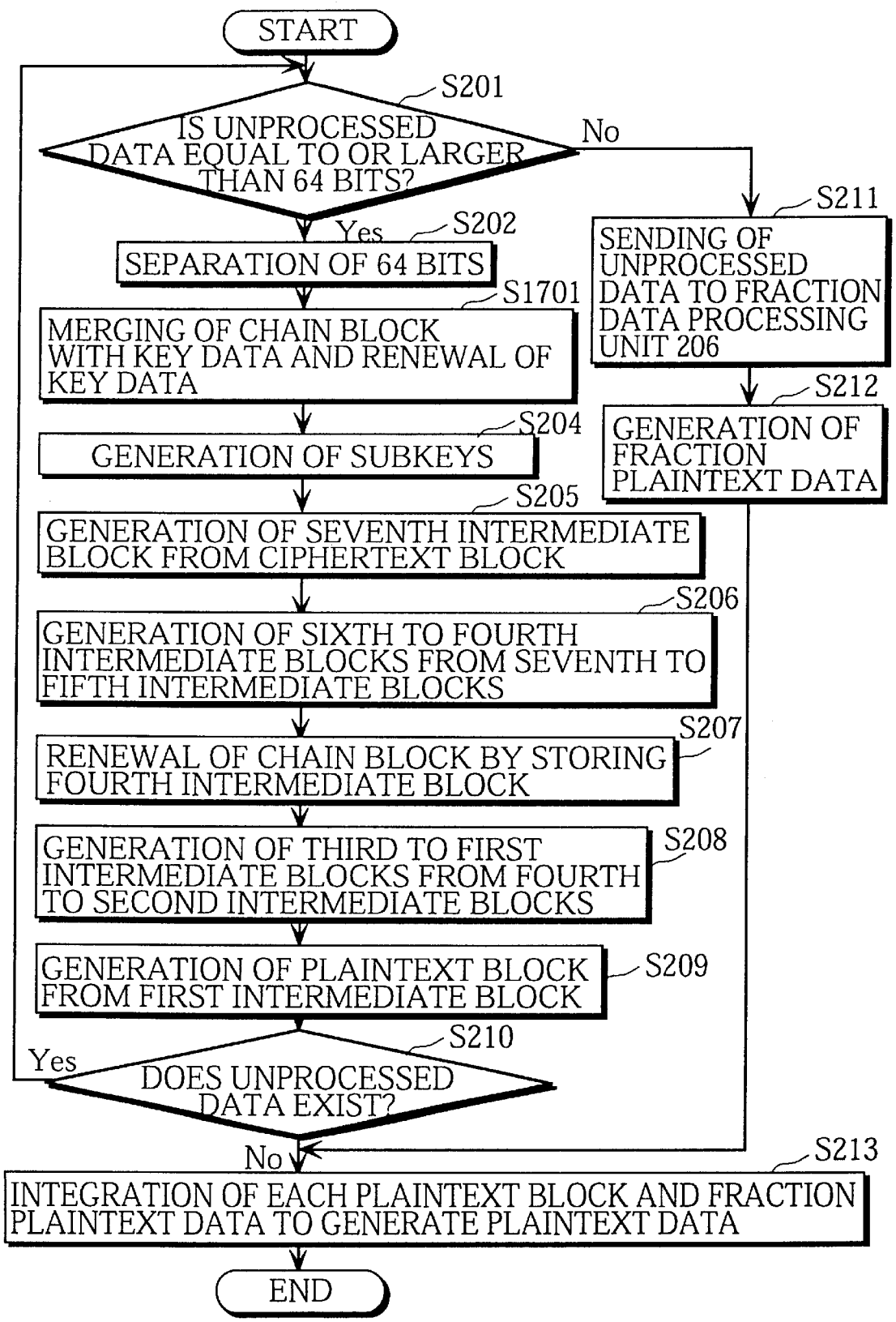
FIG. 44 is a flowchart showing the cryptographic processing of the data decryption apparatus 20 of Tenth Embodiment of the present invention.

FIG. 44 is a flowchart showing the cryptographic processing of the data decryption apparatus 20 of Tenth Embodiment of the present invention.

The operation or the data decryption apparatus 20 is inverse conversion of the operation of the data encryption apparatus 10.

Here, the same example as in the First Embodiment is used, wherein the cryptographic processing is performed according to the DES algorithm in the data decryption apparatus 20 where 200-bit ciphertext data is inputted and the initial value IV of the chain block is stored in the block storage unit 202 in advance. Also, the initial value of the key data is stored in the key data storage unit 210 in advance.

(1)–(2) The same as the First Embodiment (Steps S201 and S202: first time).

(3) The key data merging unit 203 merges the chain block stored in the block storage unit 202 with the key data stored in the key data storage unit 210 to generate merged key data, and the key data storage unit 210 renews the key data by storing the merged key data as the new key data (Step S1701). In the present example, an exclusive-OR operation is performed, for each corresponding bit, on the 64-bit initial value IV of the chain block stored in the block storage unit 202 and the 64-bit initial value of the key data stored in the key data storage unit 210 so as to generate first merged key data, which is then sent to the subkey generation unit 204, and the key data storage unit 210 renews the key data by storing the first merged key data as the new key data (Step S1701: first time).

(4)–(12) The same as the First Embodiment (Steps S204–S210: first time, Steps S201 and S202: second time).

(13) In Step S1701, an exclusive-OR operation is performed, for each corresponding bit, on the 64-bit chain block generated during the processing of the first ciphertext block and the 64-bit key data generated during the processing of the first ciphertext block so as to generate second merged key data, which is then sent to the subkey generation unit 204, and the key data storage unit 210 renews the key data by storing the second merged key data as the new key data in the present example (Step S1701: second time).

(14)–(22) The same as the First Embodiment (Steps S204–S210: second time, Steps S201 and S202: third time).

(23) In Step S1701, an exclusive-OR operation is performed, for each corresponding bit, on the 64-bit chain block generated during the processing of the second ciphertext block and the 64-bit key data generated during the processing of the second ciphertext block so as to generate third merged key data, which is then sent to the subkey generation unit 204, and the key data storage unit 210 renews the key data by storing the third merged key data as the new key data in the present example (Step S1701: third time).

(24)–(34) The same as the First Embodiment (Steps S204–S210: third time, Step S201: fourth time, Steps S211–S213).

In the cryptographic processing apparatus of Tenth Embodiment, an intermediate block and merged key data which have been generated when the cryptographic processing is performed on a present block are stored respectively as a chain block and key data. When the cryptographic processing is performed on a next block, the chain block is merged with the key data. Thus, the chain block and the key data are renewed each time the cryptographic processing is performed.

It should be noted that while in the Tenth Embodiment the key data storage unit 110 and the key data storage unit 210 are included respectively in the data encryption apparatus 10 and the data decryption apparatus 20 of the First Embodiment, the key data storage units 110 and 210 may also be included in the Second to Ninth Embodiments.

Eleventh Embodiment

In the Eleventh Embodiment of the present invention, a function of selecting one block out of blocks including an output block, a block which is to be subjected to the cryptographic processing, and intermediate blocks, based on a chain block is further included in the First Embodiment.

Construction

The construction of an encrypted communication system of the Eleventh Embodiment is the same as that of the First Embodiment, and is thereby not explained here.

Construction of Data Encryption Apparatus 10

Figure 45:
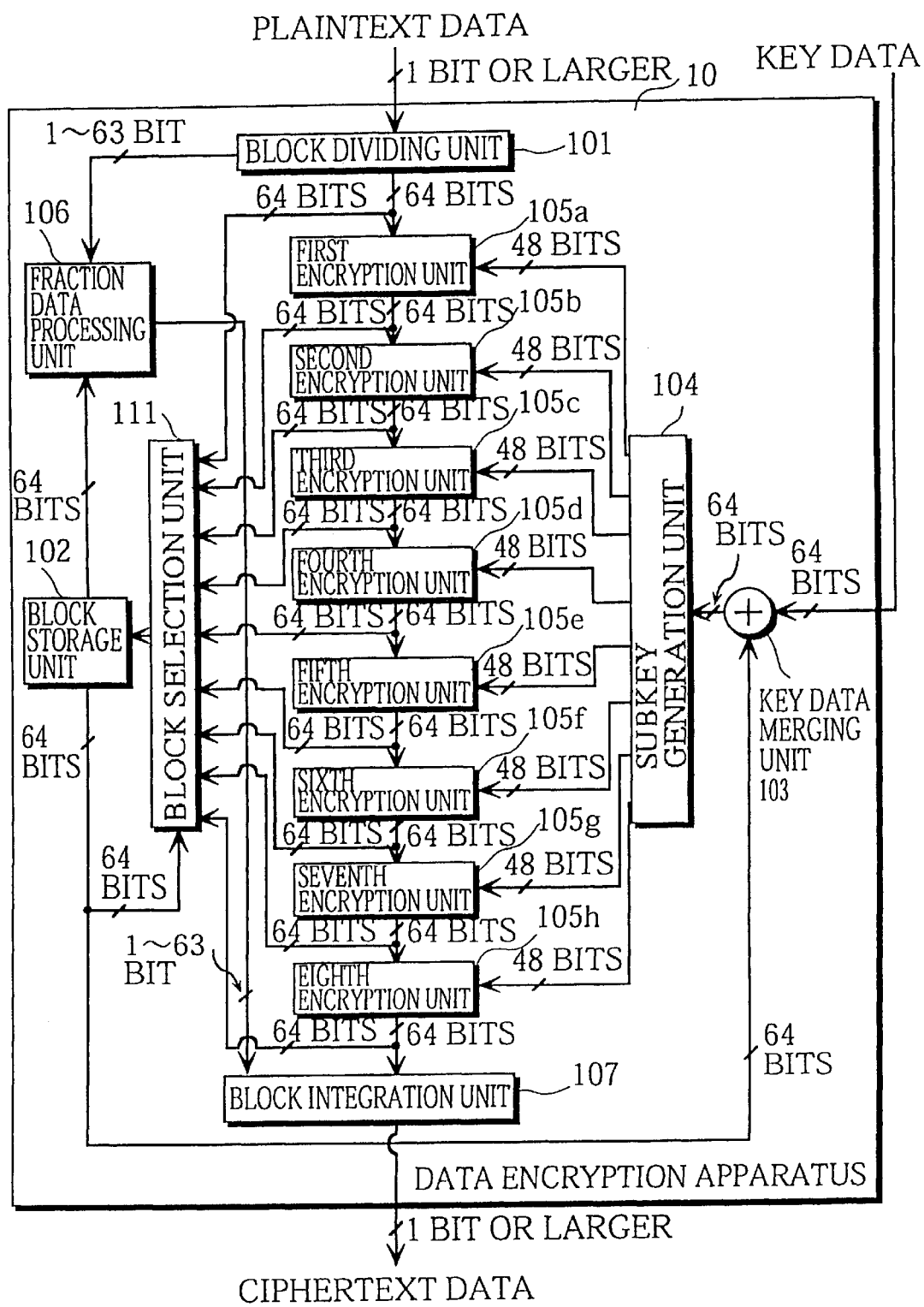
FIG. 45 shows the detailed construction of the data encryption apparatus 10 Eleventh Embodiment of the present invention.

FIG. 45 shows the detailed construction of a data encryption apparatus 10, which is shown in FIG. 2, of the Eleventh Embodiment of the present invention.

Components which are the same as these in the data encryption apparatus 10 of the First Embodiment shown in FIG. 3 are given the same numbers. Components whose functions are the same as those in the data encryption apparatus 10 of the First Embodiment are not explained here.

The data encryption apparatus 10 of the Eleventh Embodiment includes a block dividing unit 101, a block storage unit 102, a key data merging unit 103, a subkey generation unit 104 first to eighth encryption units 105a–105h, a fraction data processing unit 106, a block integration unit 107, and a block selection unit 111.

Here, the same example is used as in the First Embodiment where plaintext data of 200 bits is inputted in the data encryption apparatus 10.

Comparison between the conventional encryption apparatus 30 shown in FIG. 1 and the data encryption apparatus 10 of the Eleventh Embodiment of the present invention shown in FIG. 45 corresponds to the comparison between the conventional encryption apparatus 30 and the data encryption apparatus 10 of the First Embodiment, the only difference lying in that the block selection unit 111 is included in the Eleventh Embodiment.

The block selection unit 111 selects one block out of a plaintext block, each intermediate block, and a ciphertext block based on a chain block stored in the block storage unit 102, and sends the selected block to the block storage unit 102. For example, when lowest 3 bits of the chain block stored in the block storage unit 102 are "001", the block selection unit 111 selects a first intermediate block, while when the lowest 3 bits are "010"–"111", the block selection unit 111 selects second to seventh intermediate blocks, respectively. When the lowest 3 bits are "000" and the fourth lowest bit is "0" the block selection unit 111 selects the plaintext block, while when the lowest 3 bits are "000" and the fourth lowest bit is "1", the block selection unit 111 selects a ciphertext block.

The block storage unit 102 renews the chain block by storing the block selected by the block selection unit 111 as the new chain block, which is used for processing a next plaintext block. In the present example, a 64-bit initial value IV which has been stored in advance is used for processing a first plaintext block, and a block selected based on lowest 4 bits of the initial value IV is stored as the new chain block. Next, this new chain block is used for processing a second plaintext block, and a block selected based on lowest 4 bits of the chain block is stored as the new chain block. Next, this new chain block is used for processing a third plaintext block, and a block selected based on lowest 4 bits of the chain block is stored as the new chain block. Then this new chain block is used for processing fraction plaintext data.

Construction of Data Decryption Apparatus 20

Figure 46:
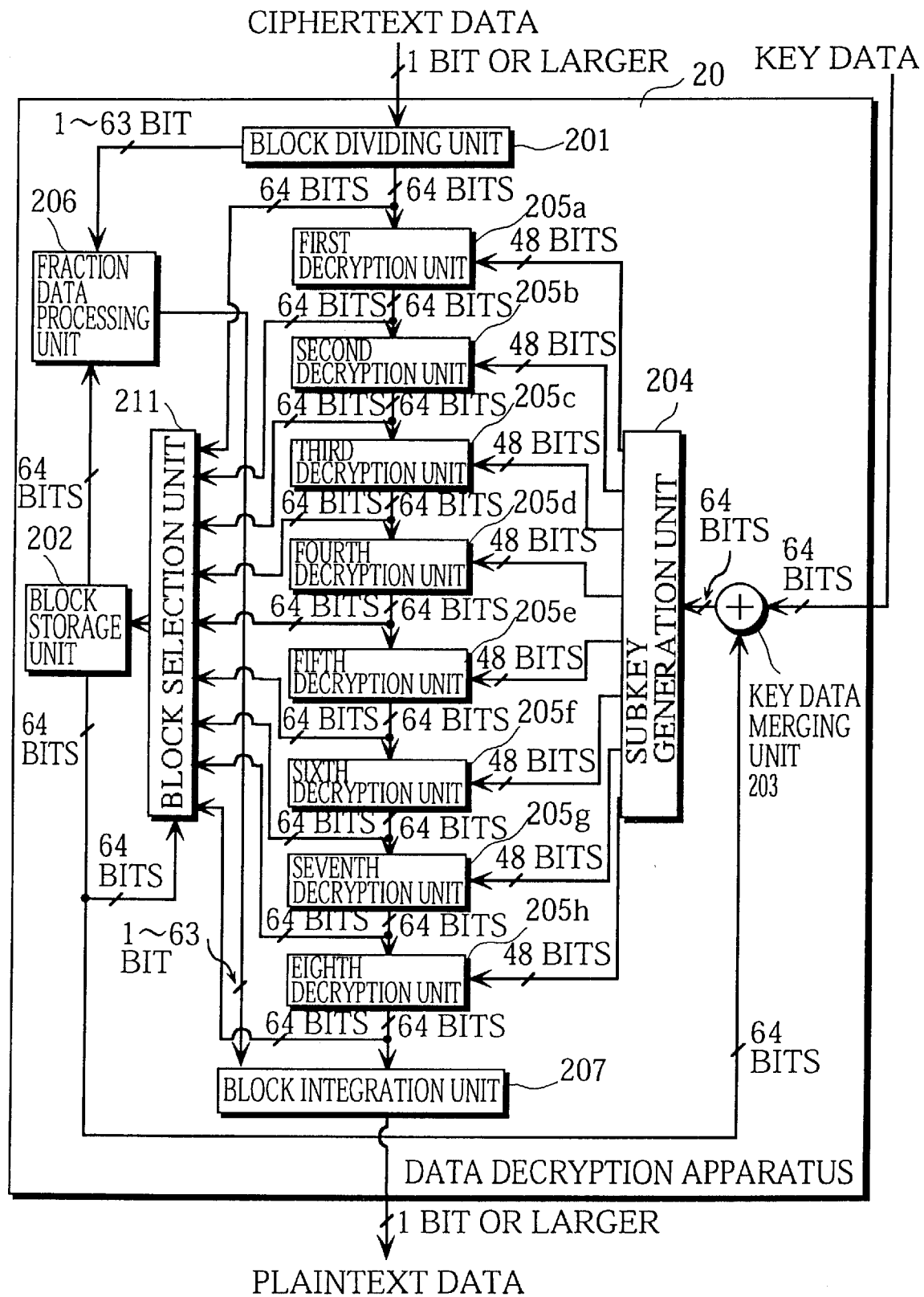
FIG. 46 shows the detailed construction of the data decryption apparatus 20 of Eleventh Embodiment of the present invention.

FIG. 46 shows the detailed construction of a data decryption apparatus, which is shown in FIG. 2, of Eleventh Embodiment of the present invention.

Components which are the same as those in the data decryption apparatus 20 of the First Embodiment shown in FIG. 8 are given the same numbers. Components whose functions are the same as those in the data decryption apparatus 20 of the First Embodiment are not explained here.

The data decryption apparatus 20 of the Eleventh Embodiment includes a block dividing unit 201, a block storage unit 202, a key data merging unit 203, a subkey generation unit 204, first to eighth decryption units 205a–205h, a fraction data processing unit 206, a block integration unit 207, and a block selection unit 211.

Here, the same example is used as in the First Embodiment where ciphertext data of 200 bits is inputted in the data decryption apparatus 20.

The block selection unit 211 selects one block out of a ciphertext block, each intermediate block, and a plaintext block based on a chain block stored in the block storage unit 202, and send the selected block to the block storage unit 202. For example, when lowest 3 bits of the chain block stored in the block storage unit 202 are "001", the block selection unit 211 selects a first intermediate block, while when the lowest 3 bits are "010"–"111", the block selection unit 211 selects second to seventh intermediate blocks, respectively. When the lowest 3 bits are "000" and the fourth lowest bit is "0", the block selection unit 211 selects the plaintext block, while when the lowest 3 bits are "000" and the fourth lowest bit is "1", the block selection unit 211 selects a ciphertext block.

The block storage unit 202 renews the chain block by storing the block selected by of the block selection unit 211 as the new chain block, which is used for processing a next ciphertext block. In the present example, a 64-bit initial value IV which has been stored in advance is used for processing a first ciphertext block, and a block selected based on lowest 4 bits of the initial value IV is stored as the new chain block. Next, this new chain block is used for processing a second ciphertext block, and a block selected based on lowest 4 bits of the chain block is stored as the new chain block. Next, this new chain block is used for processing a third ciphertext block, and a block selected based on lowest 4 bits of the chain block is stored as the new chain block. Then this new chain block is used for processing fraction ciphertext data.

Operation

Operation of Data Encryption Apparatus 10

Figure 47:
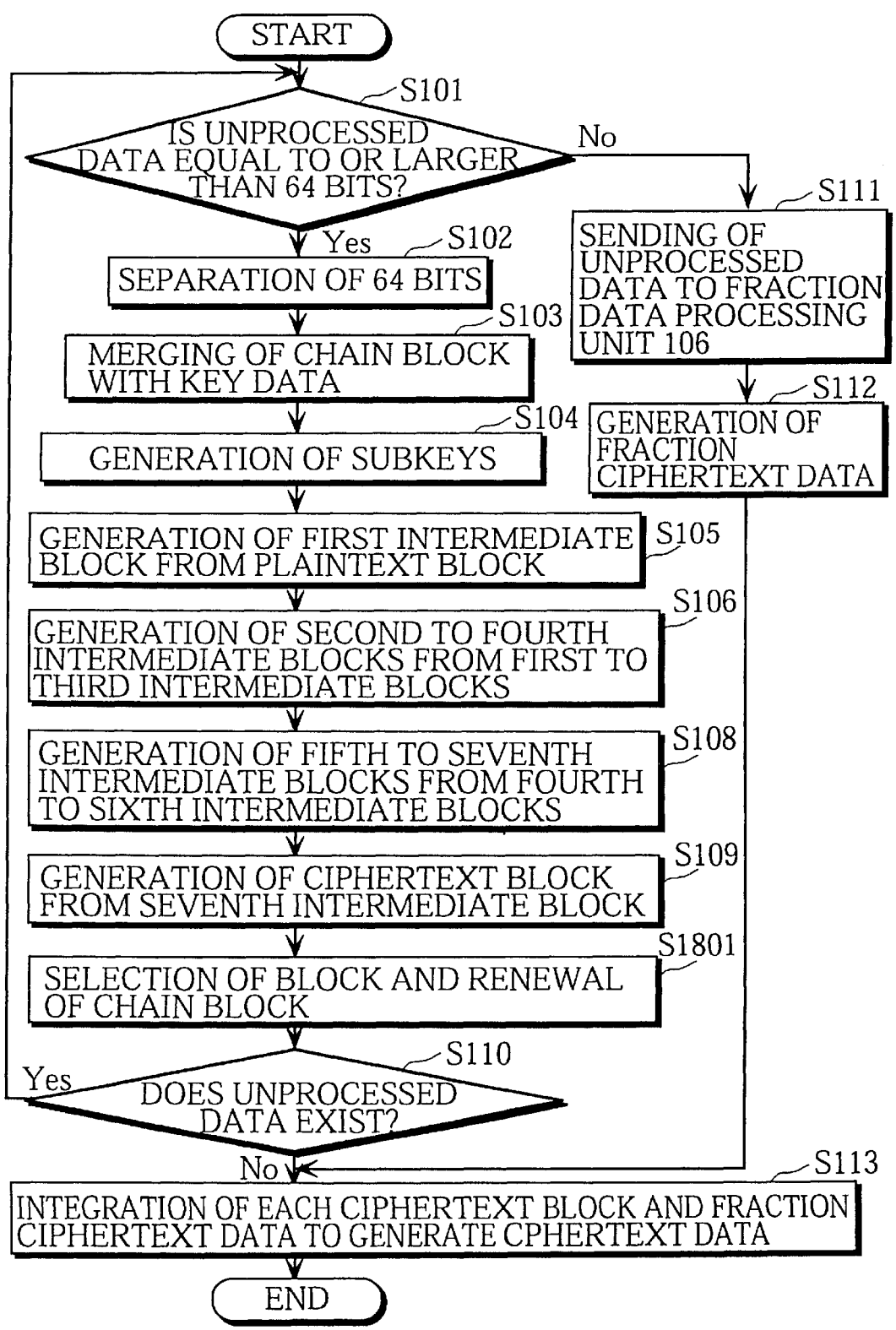
FIG. 47 is a flowchart showing the cryptographic processing of the data encryption apparatus 10 of Eleventh Embodiment of the present invention.

FIG. 47 is a flowchart showing the cryptographic processing of the data encryption apparatus 10 of Eleventh Embodiment of the present invention.

Steps which are the same as those in the operation of the data encryption apparatus 10 of the First Embodiment shown in FIG. 10 are given the same numbers, and are not explained here.

Here, the same example as in the First Embodiment is used, wherein the cryptographic processing is performed according to the DES algorithm in the data encryption apparatus 10 where 200 bit plaintext data is inputted and the initial value IV of the chain block is stored in the block storage unit 102 in advance.

(1)–(8) The same as (1)–(6), (8), and (9) of the First Embodiment (Steps S101–S106, S108, and S109: first time).

(9) The block selection unit 111 selects one block out of the plaintext block, each of the intermediate blocks, and the ciphertext block based on the chain block stored in the block storage unit 102, and the block storage unit 102 renews the chain block by storing the selected block as the new chain block (Step S1801). In the present example, when lowest 3 bits of the initial value IV of the chain block stored in the block storage unit 102 are, for example, "011", the third intermediate block corresponding to the first plaintext block is selected and stored as the new chain block (Step S1801: first time).

(10)–(18) The same as the First Embodiment (Step S110: first time, Steps S101–S106, S108, and S109: second time).

(19) In Step S1801, when lowest 4 bits of the selected chain block which was generated during the processing of the first plaintext block are, for example, "0000", the second plaintext block is selected and stored as the new chain block in the present example (Step S1801: second time).

(20)–(28) The same as the First Embodiment (Step S110: second time, Steps S101–S106, S108, and S109: third time).

(29) In Step S1801, when lowest 4 bits of the selected chain block which was generated during the processing of the second plaintext block are, for example, "1000", the third ciphertext block is selected and stored as the new chain block in the present example (Step S1801: third time).

(30)–(34) The same as the First Embodiment (Step S110: third time, Step S101: fourth time, Steps S111–S113).

Operation of Data Decryption Apparatus 20

Figure 48:
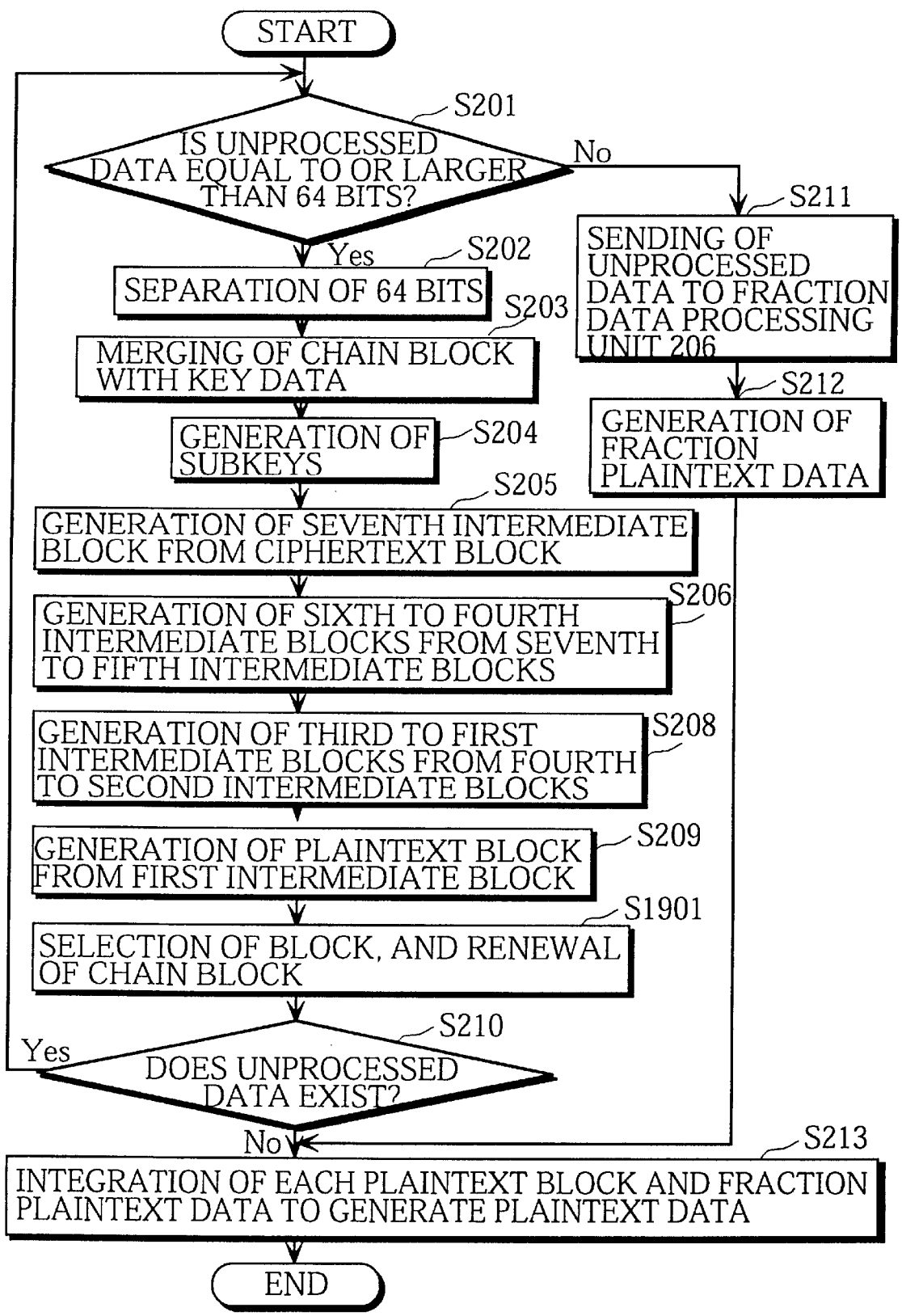
FIG. 48 is a flowchart showing the cryptographic processing of the data decryption apparatus 20 of Eleventh Embodiment of the present invention.

FIG. 48 is a flowchart showing the cryptographic processing of the data decryption apparatus 20 of Eleventh Embodiment of the present invention.

The operation of the data decryption apparatus 20 is inverse conversion of the operation of the data encryption apparatus 10.

Here, the same example as in the First Embodiment is used, wherein the cryptographic processing is performed according to the DES algorithm in the data decryption apparatus 20 where 200-bit ciphertext data is inputted and of the initial value IV of the chain block is stored in the block storage unit 202 in advance.

(1)–(8) The same as (1)–(6), (8), and (9) of the First Embodiment (Steps S201–S206, S208, and S209: first time).

(9) The block selection unit 211 selects one block out of the ciphertext block, each of the intermediate blocks, and the plaintext block based on the chain block stored in the block storage unit 202, and the block storage unit 202 renews the chain block by storing the selected block as the new chain block (Step S1901). In the present example, when lowest 3 bits of the initial value IV of the chain block stored in the block storage unit 202 are for example, "011", the third intermediate block corresponding to the first ciphertext block is selected and stored as the new chain block (Step S1901: first time).

(10)–(18) The same as the First Embodiment (Step S210: first time, Steps S201–S206, S208, and S209: second time).

(19) In Step S1901, when lowest 4 bits of the selected chain block generated during the processing of the first ciphertext block are, for example, "0000", the second plaintext block is selected and stored as the new chain block in the present example (Step S1901: second time).

(20)–(28) The same as the First Embodiment (Step S210: second time, Steps S201–S206, S208, and S209; third time).

(29) In Step S1901, when lowest 4 bits of the selected chain block generated during the processing of the second ciphertext block are for example, "1000", the third ciphertext block is selected and stored as the new chain block in the present example (Step S1901: third time).

(30)–(34) The same as the First Embodiment (Step S210: third time, Step S201: fourth time, Steps S211–S213).

In the cryptographic processing apparatus of the Eleventh Embodiment, a block, such as an intermediate block generated in present cryptographic processing, is stored as a chain block, which is then merged with key data when next cryptographic processing is performed. Thus, the chain block is renewed by selecting one out of the plurality of blocks including intermediate blocks using the chain block each time the cryptographic processing is performed.

It should be noted that while in the Eleventh Embodiment the block selection unit 111 and the block selection unit 211 are respectively included in the data encryption apparatus 10 and the data decryption apparatus 20 of the First Embodiment, the block selection units 111 and 211 may also be included in the Second to Tenth Embodiments.

Twelfth Embodiment

In the Twelfth Embodiment of the present invention, the fraction data processing performed by the fraction data processing unit 106 in the data encryption apparatus 10 of the First Embodiment is changed.

Construction

The construction of an encrypted communication system of the Twelfth Embodiment is the same as that of the First Embodiment, and is thereby not explained here.

Construction of Data Encryption Apparatus 10

The construction of a data encryption apparatus 10 of Twelfth Embodiment is the same as that of the First Embodiment.

Here, the same example is used as in the First Embodiment where plaintext data of 200 bits is inputted in the data encryption apparatus 10.

Components which have the same functions as those in the data encryption apparatus 10 of the First Embodiment shown in FIG. 3 are not explained here.

Figure 49:
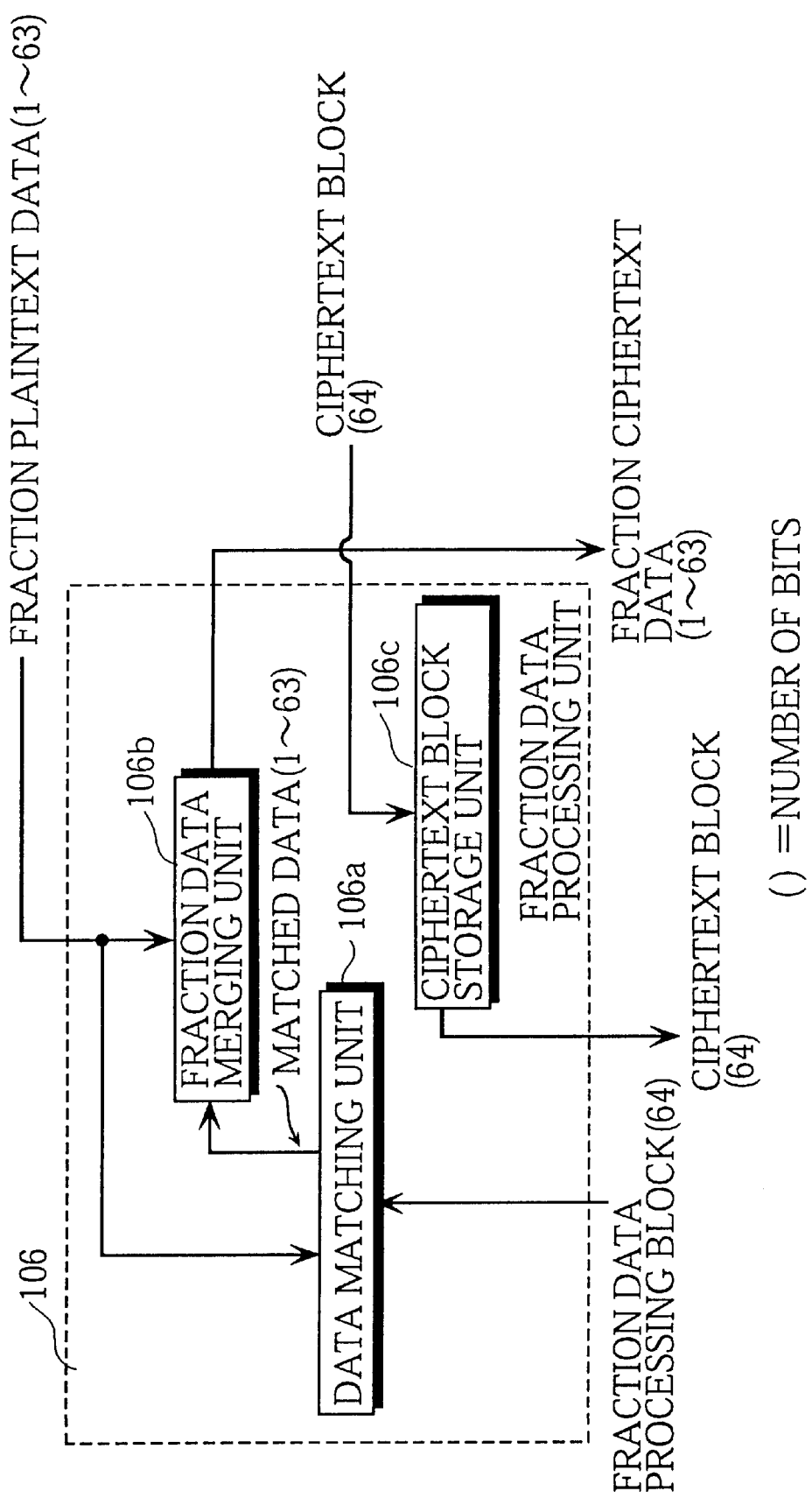
FIG. 49 shows the detailed construction of the fraction data processing unit 106 of Twelfth Embodiment of the present invention.

FIG. 49 shows the detailed construction of the fraction data processing unit 106 of Twelfth Embodiment of the present invention.

On receiving fraction plaintext data from the block dividing unit 101, the fraction data processing unit 106 has the first to eighth encryption units 105a–105h perform the cryptographic processing such as encryption on an immediately preceding ciphertext block using a chain block stored in the block storage unit 102 so as to generate a fraction data processing block, which is used to venerate fraction ciphertext data whose number of bits is the same as the fraction plaintext data from the fraction plaintext data. The fraction data processing unit 106 includes a data matching unit 106a, a fraction data merging unit 106b, and a ciphertext block storage unit 106c.

The ciphertext block storage unit 106c stores the ciphertext block generated immediately before processing the fraction plaintext data. For processing the fraction plaintext data, the ciphertext block storage unit 106c sends the stored ciphertext block to the first to eighth encryption units 105a–105h. In the present example, the ciphertext block storage unit 106c stores a third ciphertext block, which is sent to the first to eighth encryption units 105a–105h for processing the fraction plaintext data.

The first to eighth encryption units 105a–105h perform the same cryptographic processing as in the First Embodiment to generate the fraction data processing block from the ciphertext block sent from the ciphertext block storage unit 106c. In the present example, a faction data processing block is generated from the third ciphertext block.

The data matching unit 106a generates matched data whose number of bits is the same as the fraction plaintext data from the fraction data processing block generated in the above cryptographic processing. In the present example, the fraction plaintext data is 8 bits, so that matched data which is comprised of, for instance, highest 8 bits of the fraction data processing block is generated.

The fraction data merging unit 106b merges the matched data with the fraction plaintext data. In the present example, an exclusive-OR operation is performed on the 8-bit matched data and the 8-bit fraction plaintext data for each corresponding bit to generate 8-bit fraction ciphertext data.

Operation

Operation of Data Encryption Apparatus 10

Figure 50:
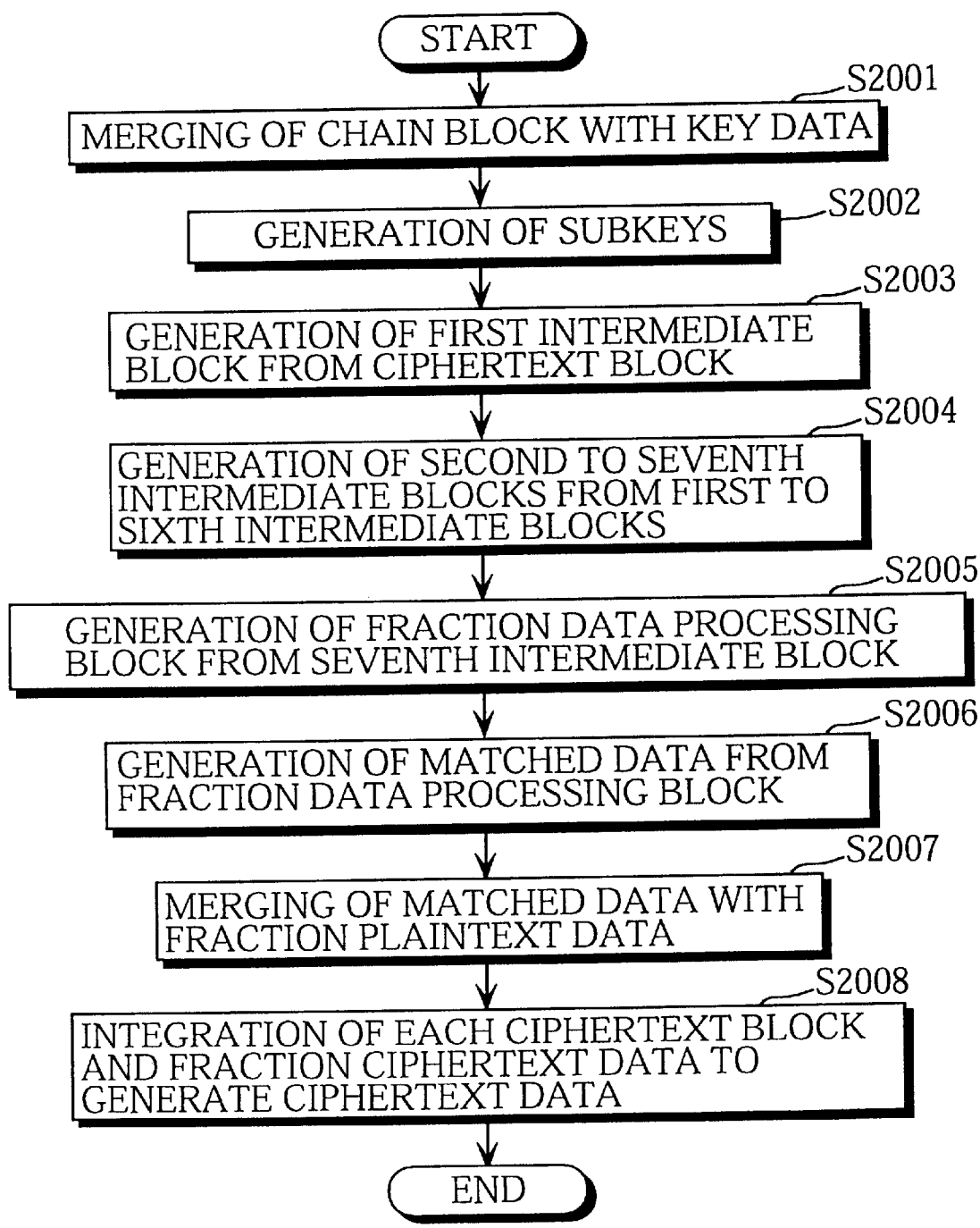
FIG. 50 is a flowchart showing the fraction data processing of the data encryption apparatus 10 of Twelfth Embodiment of the present invention.

FIG. 50 is a flowchart showing the fraction data processing of the data encryption apparatus 10 of Twelfth Embodiment of the present invention.

As one example, a case is explained when the cryptographic processing is performed according to the DES algorithm in the data encryption apparatus 10 where 200-bit plaintext data is inputted and an initial value IV of a chain block is stored in the block storage unit 102 in advance, and where a third ciphertext block is stored in the ciphertext block storage unit 106c after first to third plaintext blocks have already been encrypted, and the remaining 8 bits of the plaintext data is sent to the faction data processing unit 106 from the block dividing unit 101 as fraction plaintext data.

(1) The key data merging unit 103 merges the chain block stored in the block storage unit 102 with key data to generate merged key data (Step S2001). In the present example, an exclusive-OR operation is performed, for each corresponding bit, on a 64-bit chain block generated when processing the third plaintext block and 64-bit key data so as to generate merged key data, which is then sent to the subkey generation unit 104.

(2) The subkey generation unit 104 generates subkeys whose number corresponds to the number of encryption units from the merged key data (Step S2002). In the present example, eight 48-bit subkeys are generated from the 64 bit merged key data.

(3) The first encryption unit 105a generates a first intermediate block from an immediately preceding ciphertext block stored in the ciphertext block storage unit 106c using the first subkey (Step S2003). In the present example, a first intermediate block is generated from the third ciphertext block.

(4) The second to seventh encryption units 105b–105g generate second to seventh intermediate blocks from the first to sixth intermediate blocks using the second to seventh subkeys, respectively (Step S2004). In the present example, second to seventh intermediate blocks are generated from the first to sixth intermediate blocks corresponding to the third ciphertext block, respectively.

(5) The eighth encryption unit 105h generates a fraction data processing block from the seventh intermediate block using the eighth subkey (Step S2005). In the present example, a fraction data processing block is generated from the seventh intermediate block corresponding to the third ciphertext block.

(6) The data matching unit 106a generates matched data whose number of bits is the same as the fraction plaintext data from the fraction data processing block generated in the above cryptographic processing (Step S2006). In the present example, the fraction plaintext data is 8 bits, so that matched data which is composed of, for instance, highest 8 bits of the fraction data processing block is generated.

(7) The fraction data merging unit 106b merges the matched data with the fraction plaintext data to generate fraction ciphertext data (Step S2007). In the present example, an exclusive-OR operation is performed on the 8-bit matched data and the 8-bit fraction plaintext data for each corresponding bit to generate 8-bit fraction ciphertext data.

(8) The block integration unit 107 integrates each ciphertext block generated by the eighth encryption unit 105h and the fraction ciphertext data generated by the fraction data processing unit 106 to generate ciphertext data (Step S2008). In the present example, the first to third ciphertext blocks and the fraction ciphertext data are integrated to form 200-bit ciphertext data.

It should be noted that, corresponding to the change of the fraction data processing performed by the fraction data processing unit 106 in the data encryption apparatus 10, the fraction data processing performed by the fraction data processing unit 206 in the data decryption apparatus 20 is changed. Accordingly, in the fraction data processing of the data decryption apparatus 20, the cryptographic processing is performed on an immediately preceding ciphertext block as the new input block using a chain block so as to generate a fraction data processing block, which is used for generating fraction plaintext data whose number of bits is the same as fraction ciphertext data from the fraction ciphertext data. This change is the same as that of the fraction data processing unit 106, and is thereby not explained here.

While in the Twelfth Embodiment the fraction data processing performed by the fraction data processing units 106 and 206 of the First Embodiment is changed, the fraction data processing of the Second to Eleventh Embodiments may also be changed.

It should be noted that the original DES algorithm is such that the cryptographic processing by each cryptographic processing unit in 16 stages is performed after initial transposition and before last transposition, while in each Embodiment described above, the initial transposition, the last transposition, and the cryptographic processing units from the ninth to 16th stages are omitted in order to simplify the explanation.

The algorithm used in each Embodiment is not limited to the DES algorithm, but any algorithms can be used. Also, the stages of the cryptographic processing units are not limited to 8, but any number of stages may be applied.

While in the above Embodiments, the output of the fourth stage is mainly used as a chain block, the present invention is not limited to such, as an output of any stage may be used as the chain block.

While the number of bits of the chain block is the same as that of the key data in each Embodiment described above, this may not be necessarily the case. When the numbers of bit of the chain block and the key data are different in Embodiments in which the key data is merged with the chain block or the like, data whose number of bits is the same as the key data is generated from the block to be merged with the key data, the generated data then being merged with the key data. For example, when the number of bits of the key data is larger than 64 bits, data whose number of bits is the same as the key data is generated from the block to be merged with the key data by means of expansion or the like and then merged with the key data, while when the number of bits of the key data is smaller than 64 bits, data which is composed of highest bits of the block to be merged with the key data, the highest bits being composed of the same number of bits as the key data, is generated and merged with the key data.

While in each Embodiment described above, input plaintext data is encrypted in each data encryption apparatus 10 and ciphertext data generated by the data encryption apparatus 10 is decrypted in each data decryption apparatus 20, the decryption by the data decryption apparatus 20 is the inverse conversion of the encryption by the data encryption apparatus 10, so that each apparatus can be used as an encryption apparatus and decryption apparatus. Accordingly, in each Embodiment plaintext data may be inputted and encrypted in the data decryption apparatus 20 and ciphertext data generated by the data decryption apparatus 20 may be decrypted in the data encryption apparatus 10.

Although the present invention has been fully described by way of example with reference to the accompanying drawing, it is to be noted that various changes and modifications will be apparent to those skilled in the art. Therefore, unless such changes and modifications depart from the scope of the present invention, they should be construed as being included therein.

What is claimed is:

1. An encryption apparatus for performing encryption processing using input data that includes key data and target data which is to be encrypted, to generate output data, comprising:

storage means for storing chain data which is based on preceding encryption processing and is used to influence present encryption processing, and renewing the chain data each time encryption processing is performed;

conversion means for performing a predetermined conversion on the chain data stored in the storage means, to generate converted data;

merging means for merging the converted data with the key data included in the input data, to generate merged key data;

subkey generation means for generating a plurality of subkeys from the merged key data; and main encryption processing specified by the plurality of subkeys on the target data included in the input data, wherein the main encryption means (a) provides intermediate data generated at a stage where the target data has undergone encryption specified by at least one of the plurality of subkeys during the main encryption processing, and (b) provides output data generated when the intermediate data has undergone encryption specified by the rest of the plurality of subkeys and the main encryption processing has completed, wherein the storage means renews the chain data by storing the intermediate data as new chain data, main encryption means for performing main encryption processing on the target data included in the input data, the main encryption processing being made up of a plurality of stages which are each specified by a different one of the plurality of subkeys, wherein the main encryption means (a) performs encryption on the target data by at least one of the plurality of stages, to generate intermediate data, and (b) performs encryption on the intermediate data by the rest of the plurality of stages, to generate output data, wherein the storage means renews the chain data by storing, as new chain data, the intermediate data which is generated by the least one of the plurality of stages, the new chain data being used for the next encryption processing.

2. The encryption apparatus of claim 1, wherein the predetermined conversion performed by the conversion means is one of a bit transposition and a bit conversion.

3. The encryption apparatus of claim 1, wherein the main encryption means performs a plurality of partial processes respectively in a plurality of stages, wherein data obtained in each stage except a last stage is subjected to a partial process of a next state, wherein data obtained in the last stage is the output data, and data obtained in each stage except the last stage is intermediate data, wherein the storage means stores intermediate data which is obtained in one of the plurality of stages except the last stage and outputted by the main encryption means, as the new chain data, wherein the subkey generation means generates a subkey for use in a partial process of a separate one of the plurality of stages in the main encryption means, and supplies the generated plurality of subkeys to the main encryption means, and wherein the main encryption means generates the output data from the target data by performing the plurality of partial processes, which are specified by the respective plurality of subkeys, in the plurality of stages.

4. A decryption apparatus for performing decryption processing using input data that includes key data and target data which is to be decrypted, to generate output data, comprising:

storage means for storing chain data which is based on preceding decryption processing and is used to influence present decryption processing, and renewing the chain data each time decryption processing is performed;

conversion means for performing a predetermined conversion on the chain data stored in the storage means, to generate converted data;

merging means for merging the converted data with the key data included in the input data, to generate merged key data;

subkey generation means for generating a plurality of subkeys from the merged key data; and main decryption means for performing main decryption processing on the target data included in the input data, the main decryption processing being made up of a plurality of stages which are each specified by a different one of the plurality of subkeys, wherein the main decryption means (a) performs decryption on the target data by at least one of the plurality of stages, to generate intermediate data, and (b) performs decryption on the intermediate data by the rest of the plurality of stages, to generate output data, wherein the storage means renews the chain data by storing, as new chain data, the intermediate data which is generated by the at least one of the plurality of stages, the new chain data being used for the next decryption processing.

5. The decryption apparatus of claim 4, wherein the predetermined conversion performed by the conversion means is one of a bit transposition and a bit conversion.

6. The decryption apparatus of claim 4, wherein the main decryption means performs a plurality of partial processes respectively in a plurality of stages, wherein data obtained in each stage except a last stage is subjected to a partial process of a next stage, wherein data obtained in the last stage is the output data, and data obtained in each stage except the last stage is intermediate data, wherein the storage means stores intermediate data which is obtained in one of the plurality of stages except the last stage and outputted by the main decryption means, as the new chain data, wherein the subkey generation means generates a subkey for use in a partial process of a separate one of the plurality of stages in the main decryption means, and supplies the generated plurality of subkeys to the main decryption means, and wherein the main decryption means generates the output data from the target data by performing the plurality of partial processes, which are specified by the respective plurality of subkeys, in the plurality of stages.

7. An encryption method for performing encryption processing using input data that includes key data and target data which is to be encrypted, to generate output data, where chain data which is based on preceding encryption processing and is used to influence present encryption processing is stored in storage means, the encryption method comprising:

a conversion step for performing a predetermined conversion on the chain data stored in the storage means, to generate converted data;

a merging step for merging the converted data with the key data included in the input data, to generate merged key data;

a subkey generation step for generating a plurality of subkeys from the merged key data;

a main encryption step for performing main encryption processing on the target data included in the input data, the main encryption processing being made up of a plurality of stages which are each specified by a different one of the plurality of subkeys, wherein the main encryption step (a) performs encryption on the target data by at least one of the plurality of stages, to generate intermediate data, (b) performs encryption on the intermediate data by the rest of the plurality of stages, to generate output data, and (c) renews the chain data by storing in the storage means, as new chain data, the intermediate data which is generated by the at least one of the plurality of states, the new chain data being used for the next encryption processing.

8. The encryption method of claim 7 wherein the renewal step stores as new chain data one of the outputted intermediate data generated during the encryption processing.

9. The encryption method of claim 7 wherein the renewal state stores as new chain data the target which is to be encrypted.

10. The encryption method of claim 7 wherein the renewal step stores as new chain data the converted data.

11. The encryption method of claim 7 wherein the renewal step stores as new chain data the output data.

12. A decryption method for performing decryption processing using input data that includes key data and target data which is based on preceding decryption processing and is used to influence present decryption processing is stored in storage means, the decryption method comprising:

- a conversion step for performing a predetermined conversion on the chain data stored in the storage means, to generate converted data;
- a merging step for merging the converted data with the key data included in the input data, to generate merged key data;
- a subkey generation step for generating a plurality of subkeys from the merged key data;
- a main decryption step for performing main decryption processing on the target data included in the input data, the main decryption processing being made up of a plurality of stages which are each specified by a different one of the plurality of subkeys, wherein the main decryption step
  - (a) performs decryption on the target data by at least one of the plurality of stages, to generate intermediate data,
  - (b) performs decryption on the intermediate data by the rest of the plurality of stages, to generate output data, and
  - (c) renews the chain data by storing in the storage means, as new chain data, the intermediate data which is generated by the at least one of the plurality of stages, the new chain data being used for the next decryption processing.

13. A computer-readable storage medium storing an encryption program for performing encryption processing using input data that includes key data and target data which is to be encrypted, to generate output data, where chain data which is based on preceding encryption processing and is used to influence present encryption processing is stored in storage means, the encryption program comprising:

- a conversion step for performing a predetermined conversion on the chain data stored in the storage means, to generate converted data;
- a merging step for merging the converted data with the key data included in the input data, to generate merged key data;
- a subkey generation step for generating a plurality of subkeys from the merged key data;
- a main encryption step for performing main encryption processing on the target data included in the input data, the main encryption processing being made up of a plurality of stages which are each specified by a different one of the plurality of subkeys, wherein the main encryption step
  - (a) performs encryption on the target data by at least one of the plurality of stages, to generate intermediate data,
  - (b) performs encryption on the intermediate data by the rest of the plurality of stages, to generate output data, and
  - (c) renews the chain data by storing in the storage means, as new chain data, the intermediate data which is generated by the at least one of the plurality of stages, the new chain data being used for the next encryption processing.

14. A computer-readable storage medium storing a decryption program for performing decryption processing using input data that includes key data and target data which is to be decrypted, to generate output data, where chain data which is based on preceding decryption processing and is used to influence present decryption processing is stored in storage means, the decryption program comprising:

- a conversion step for performing a predetermined conversion on the chain data stored in the storage means, to generate converted data;
- a merging step for merging the converted data with the key data included in the input data, to generate merged key data;
- a subkey generation step for generating a plurality of subkeys from the merged key data;
- a main decryption step for performing main decryption processing on the target data included in the input data, the main decryption processing being made up of a plurality of stages which are each specified by a different one of the plurality of subkeys, wherein the main decryption step
  - (a) performs decryption on the target data by at least one of the plurality of stages, to generate intermediate data,
  - (b) performs decryption on the intermediate data by the rest of the plurality of stages, to generate output data, and
  - (c) renews the chain data by storing in the storage means, as new chain data, the intermediate data which is generated by the at least one of the plurality of stages, the new chain data being used for the next decryption processing.

* * * * *

UNITED STATES PATENT AND TRADEMARK OFFICE
CERTIFICATE OF CORRECTION

PATENT NO. : 6,459,792 B2
DATED : October 1, 2002
INVENTOR(S) : Ohmori et al.

It is certified that error appears in the above-identified patent and that said Letters Patent is hereby corrected as shown below:

Column 61,
Line 17, "state" should read -- stage --.

Column 62,
Line 62, "state" should read -- stage --.

Signed and Sealed this

Twenty-sixth Day of August, 2003

JAMES E. ROGAN
*Director of the United States Patent and Trademark Office*